(12) United States Patent
Palaskas et al.

(10) Patent No.: US 7,274,760 B2
(45) Date of Patent: Sep. 25, 2007

(54) CIRCUIT AND METHOD FOR DYNAMICALLY MODIFIABLE SIGNAL PROCESSOR

(76) Inventors: George Palaskas, 901 SW. King Ave., Apt. 710, Portland, OR (US) 97205; Yannis Tsividis, 410 Riverside Dr., New York, NY (US) 10025

( * ) Notice: Subject to any disclaimer, the term of this patent is extended or adjusted under 35 U.S.C. 154(b) by 854 days.

(21) Appl. No.: 10/398,195

(22) PCT Filed: Aug. 2, 2001

(86) PCT No.: PCT/US01/24593

§ 371 (c)(1),
(2), (4) Date: Jun. 25, 2003

(87) PCT Pub. No.: WO2004/017589

PCT Pub. Date: Feb. 26, 2004

(65) Prior Publication Data

US 2004/0042572 A1  Mar. 4, 2004

Related U.S. Application Data

(60) Provisional application No. 60/288,976, filed on May 4, 2001, provisional application No. 60/260,722, filed on Jan. 10, 2001, provisional application No. 60/237, 312, filed on Oct. 2, 2000, provisional application No. 60/222,429, filed on Aug. 1, 2000.

(51) Int. Cl.
H04B 1/10 (2006.01)
(52) U.S. Cl. .................................................. 375/349
(58) Field of Classification Search ................ 375/349, 375/346, 316, 328, 324, 322, 377; 360/55, 360/61; 370/216–218, 229, 235, 351, 352, 370/357, 360
See application file for complete search history.

(56) References Cited

U.S. PATENT DOCUMENTS 6,295,310 B1 * 9/2001 Yamauchi et al. .......... 375/133
7,120,192 B2 * 10/2006 Kumura ...................... 375/148

* cited by examiner

*Primary Examiner*—Pankaj Kumar
(74) *Attorney, Agent, or Firm*—Baker Botts LLP

(57) ABSTRACT

Techniques are provided for the implementation of a signal processing circuit which expands the dynamic range of the signal processing circuit without interrupting the output of the circuit. The techniques can receive an input signal, process the signal through one of a plurality of signal processing circuits, and switch to processing the signal through another of the plurality of signal processing circuits without disturbing the output of the system.

25 Claims, 24 Drawing Sheets

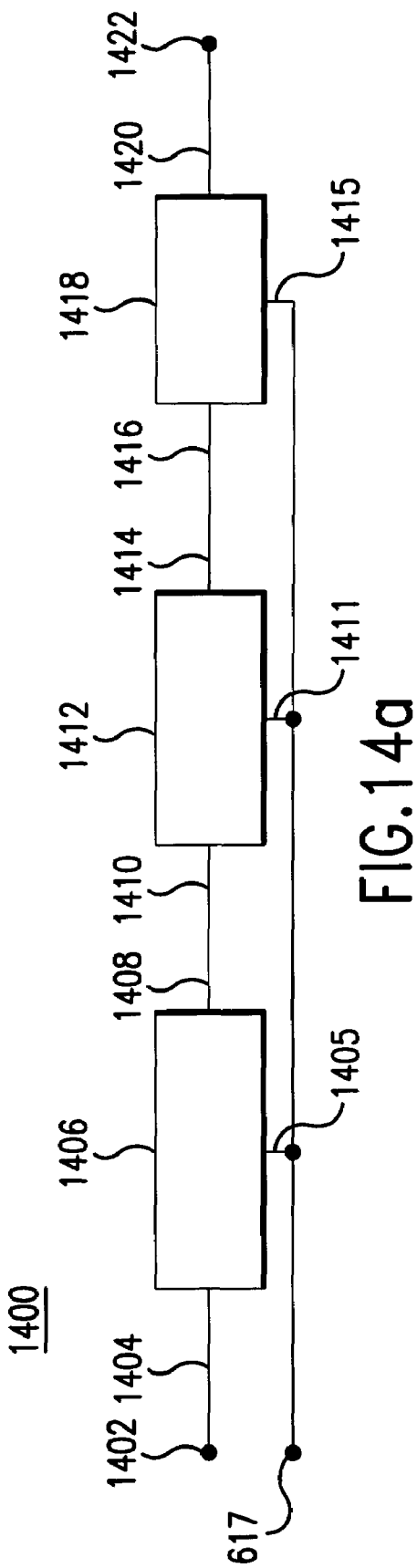
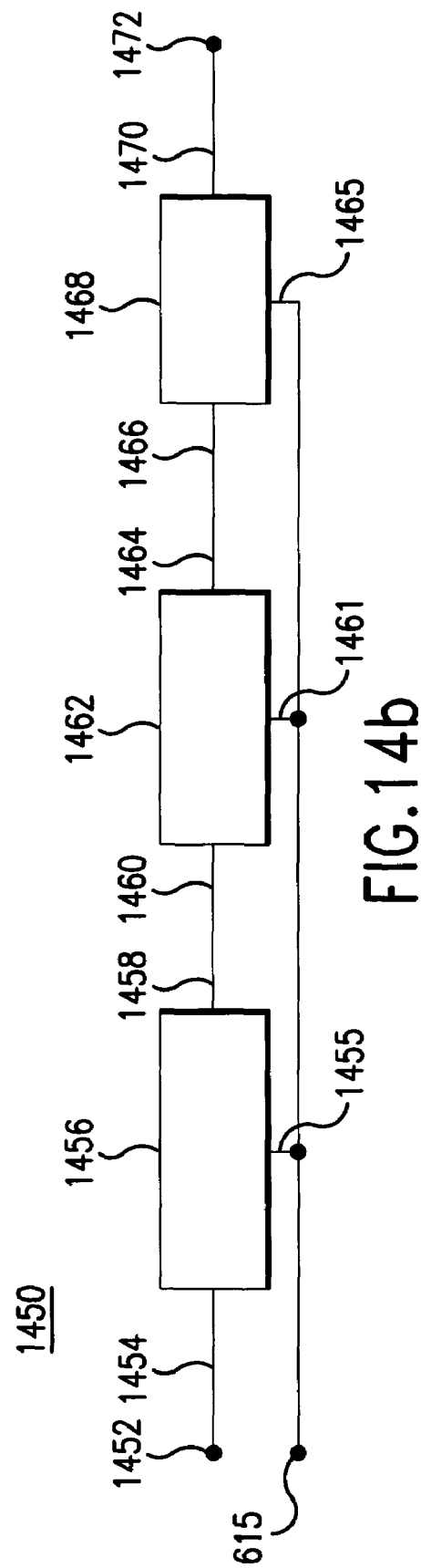
FIG.14a
FIG.14b

CIRCUIT AND METHOD FOR DYNAMICALLY MODIFIABLE SIGNAL PROCESSOR

CROSS-REFERENCE TO RELATED APPLICATIONS

This application is a national phase of International Application PCT/US01/024593, filed Aug. 2, 2001, which claims priority to U.S. Provisional Application Ser. No. 60/222,429 filed Aug. 1, 2000, U.S. Provisional Application Ser. No. 60/237,312 filed Oct. 2, 2000, U.S. Provisional Application Ser. No. 60/260,722 filed Jan. 10, 2001, and U.S. Provisional Application Ser. No. 60/288,976 filed May 4, 2001, each of which is incorporated by reference herein in its entirety.

BACKGROUND OF THE INVENTION

The present invention relates to signal processors and, more particularly, to signal processors that are dynamically modifiable for optimal performance and reduced power dissipation.

In order to expand the dynamic range of a signal processing system, companding signal processors can be used. A companding signal processor uses an input amplifier to amplify or attenuate a signal before it is provided to the signal processor, and an output amplifier is used to amplify or attenuate the signal provided by the signal processor. The gain of the output amplifier is the inverse of the gain of the input amplifier, thus conserving the linearity of the signal processor. Ideally, the gains of the input amplifier and output amplifier can be varied dynamically. A signal strength detector can be used to measure the strength of the input signal and provide a corresponding gain control signal. Y. Tsividis, "Externally linear, time-invariant systems and their application to companding signal processors," IEEE Transactions on Circuits and Systems II, Vol. 44, No. 2, February 1997. The gain signal sets the amplification factors of the input amplifier and the output amplifier. However, this approach has the problem in that because the signal processor has memory, distortion in the output of the signal processor occurs whenever the amplification factors of the input amplifier and the output amplifier are changed.

The analog floating point technique addresses the problem of distortion in the output whenever the amplification factors change. E. Blumenkrantz, "The analog floating point technique," Proc. IEEE Symposium on Low Power Electronics, p. 72-73, 1995. This technique avoids distortion by altering the state variables of the signal processor when the amplification factors change. However, implementation of the analog floating point technique is complicated to implement, and is sensitive to parasitics and component mismatch. Accordingly, there is a need for circuits which expand the dynamic range of a signal processor without interrupting the output of the system or causing distortion.

SUMMARY OF THE INVENTION

It is therefore an object of this invention to provide a circuit which has a large dynamic range and which operates in an energy-efficient manner without interrupting the output of the circuit or causing distortion.

In accordance with the present invention, there is provided a signal processing system having a system input for receiving an input signal having an in-band component and an out-band component, and a system output for providing a system output signal. The system further includes a plurality of signal processing circuits each having an input coupled to the system input and an output for providing a respective output signal, each one of the signal processing circuits being adapted for optimal processing of input signals over a different range of in-band component to out-band component ratios. Also included are a plurality of switches each having a switch input coupled to the output of a respective one of the signal processing circuits, a switch output connected to the system output and a switch control input responsive to a first switch control signal for connecting the switch input to the switch output and responsive to a second switch control signal for disconnecting the switch input from the switch output. Finally, there is provided a signal strength detector having at least one input each coupled to the output of a preselected one of the signal processing circuits and a plurality of outputs each coupled to the switch control input of a respective one of the plurality of switches. The signal strength detector is responsive to a comparison of the strength of the output signal of each one of the signal processing circuits having an output coupled to the at least one input of the signal strength detector with at least one limit for selecting a particular one of the signal processing circuits and for providing a first switch control signal to the switch control input of the switch having its switch input coupled to the output of the particular one of the signal processing circuit. The signal strength detector providing the second switch control signal to the switch control input of each one of the switches having its switch input coupled to the output of a respective one of the signal processing circuits not selected by the signal strength detector.

According to another embodiment of the invention, there is provided a signal processing system having a system input for receiving an input signal and a system output for providing a system output signal, and a plurality of signal processing circuits each having an input coupled to the system input and an output for providing a respective output signal. Each signal processor having a different saturation level and a different signal-to-noise ratio. Also included are a plurality of switches each having a switch input coupled to the output of a respective one of the signal processing circuits, a switch output coupled to the system output, and a switch control input responsive to a first switch control signal for connecting the switch input to the switch output and responsive to a second switch control signal for disconnecting the switch input from the switch output. Finally there is provided a signal strength detector having an input coupled to the system input and a plurality of outputs each corresponding to a respective one of the signal processing circuits. The signal strength detector is responsive to a comparison of the strength of the input signal received at the system input with at least one limit for selecting a particular one of the signal processing circuits having a respective saturation level and a respective signal-to-noise ratio suitable or processing the input signal and for providing the first switch control signal to the switch control input of a respective one of the plurality of switches having its switch input coupled to the output of the selected one of the signal processing circuits and for providing the second switch control signal to the switch control inputs of respective ones of the switches having the switch input coupled to the output of respective ones of the signal processing circuits not selected by the signal strength detector.

According to another embodiment of the present invention, there is provided a signal processing system having a system input for receiving an input signal, a system output for providing a system output signal, and a first and second signal processing circuit each having an input, an output, a power control input responsive to a first power control signal for causing the signal processing circuit to be in a powered up state and responsive to a second power control signal for causing the signal processing circuit to be in a powered down state, and at least one bias control input responsive to at least one bias control signal for biasing the signal processing circuit for optimal processing of the signal having a respective signal strength. Also provided are a plurality of output switches each having a switch input connected to the output of a respective one of the first and second signal processing circuits, a switch output coupled to the system output and a switch control input responsive to the first switch control signal for connecting the switch input to the switch output and being responsive to a second switch control signal for disconnecting the switch input from the switch output. At any given time one of the first or second signal processing circuits is active by being in a powered up state, receiving at least one bias control signal at its at least one bias control input and having its output connected to the system output by a respective one of the output switches, and the other one of the first and second signal processing circuits is inactive by being in a powered down state and having its output disconnected from the system output by a respective one of the output switches. Also provided is a signal strength detector having a first and second input connected to respective internal nodes of the first and second signal processing circuits and at least one input for specifying at least one bias control signal, if any, to be applied to the at least one bias control input of the inactive one of the signal processing circuits. The signal strength detector is responsive to a comparison of the strength of a signal on the respective internal node of an inactive one of the signal processing circuits with at least one limit for determining whether at least one bias control signal is to be applied to the at least one bias control input of the inactive one of the signal processing circuits for changing the bias thereto and for providing on the at least one output at least one signal specifying, if any, the at least one bias control signal to be applied to the bias control input an inactive one of the signal processing circuits. There is further provided a bias selector responsive to the at least one output signal provided on the at least one output of the signal strength detector for providing on at least one first output the at least one bias control signal specified by the at least one signal on the at least one output of the signal strength detector to the at least one bias control input of the inactive one of the signal processing circuits and providing on a second output a signal indicating that at least one bias control signal has been applied to the inactive one of the signal processing circuits. Finally there is included a timer circuit responsive to the signal on the second output of the bias selector circuit for providing the first power control signal to the power control input of the inactive one of the signal processing circuits, and after a predetermined delay for applying the first switch control signal to the switch control input of the switch having its input coupled to the output of the inactive one of the signal processing circuits and applying the second switch control signal to the switch control input of the switch having its switch input connected to the output of the active one of the signal processing circuits and applying the second power control signal to the power control input of the active one of the signal processing circuits. According to a further embodiment of the present invention, there is provided a signal processing system having a system input for receiving an input signal having an in-band component and an out-band component, and a system output for providing a system output signal. The system further includes a plurality of signal processing circuits each having an input coupled to the system output, an output for providing a respective output signal and a power control input responsive to a first power control signal for causing the signal processing circuit to be in a powered up state and responsive to a second power control signal for causing the signal processing circuit to be in a powered down state, each one of the plurality of signal processing circuits being adapted to have a different saturation level and signal-to-noise ratio for optimal processing of signals having a different range of in-band component to out-band component ratios. Also provided is a plurality of output switches each one having an input coupled to the output of a respective one of the plurality of signal processing circuits, an output connected to the system output and a switch control input responsive to a first switch control signal for connecting the input of the switch to the output of the switch and responsive to the a second switch control signal for disconnecting the input of the switch from the output of the switch. Also provided are a plurality of output switches each one having an input coupled to the output of a respective one of the plurality of signal processing circuits, an output connected to the system output and a switch control input responsive to a first switch control signal for connecting the input of the switch to the output of the switch and responsive to a second switch control signal for disconnecting the input of the switch from the output of the switch. In addition, the system includes a signal strength detector having a first input connected to the system output, at least one output for providing a signal indicating a selective one of the plurality of signal processing circuits. The signal strength detector is responsive to the comparison of the strength of an output signal with at least one limit for selecting one of the plurality of signal processing circuits for processing the input signal and providing at least one signal on the at least one output indicating the signal processing circuit selected by the signal strength detector. Finally there is included a timer circuit having at least one input each coupled to a respective one of at least one output of the signal strength detector and a first plurality of outputs each one connected to the power control input of the respective one of the plurality of signal processing circuits and a second plurality of outputs each one connected to the switch control input of a respective one of the plurality of output switches. The timer circuit is responsive to at least one signal provided by the signal strength detector for providing the first power control signal to the power control input of the signal processing circuits selected by the signal strength detector and providing after a predetermined delay the first switch control signal to the switch control input of a respective one of the plurality of output switches having its input connected to the output of the signal processing circuits selected by the signal strength detector to thereby connect the output of the signal processing circuit selected by the signal strength detector to the system output and providing after the predetermined delay the second switch control signal to the switch control input of respective ones of the plurality of output switches each having a switch input connected to the output of a respective one of the plurality of signal processing circuits not selected by the signal processing detector to thereby disconnect the output of each one of the signal processing circuits not selected by the signal strength detector from the system output. The timer circuit is responsive to at least one signal provided by the signal strength detector for providing at least the predetermined delay the second power control signal to the power control input of each one of the plurality of signal processing circuits not selected by the signal strength detector. According to another aspect of the present invention, there is provided a method for processing an input signal received by a system input to derive an output signal at a system output. The method includes providing a plurality of signal processors each having an input coupled to the system output and an output. Each one of the signal processors is adapted to process an input signal having a different range of in-band component to out-band component ratios without saturating and without having a signal-to-noise ratio approaching one. The method further includes providing a plurality of switches, each one for controllably connecting and disconnecting the output of a respective one of the signal processors to the system output terminal. The method also includes detecting the strength of the respective output signal at each one of at least one selected output of the signal processors to compare the strength of the respective output signal with at least one limit to select one of the signal processors for optimal processing of the input signal. Finally, the method includes causing a respective one of the switches to connect the output of the selected signal processors to the signal output and causing other ones of the switches to disconnect the outputs of all other signal processors from the system output.

BRIEF DESCRIPTION OF THE DRAWINGS

Further objects, features, and advantages of the invention will become apparent from the following detailed description taken in conjunction with the accompanying figures showing illustrative embodiments of the invention, in which:

FIG. 14(a) is a block diagram illustrating a further additional signal processing circuit in accordance with the present invention;

FIG. 14(b) is a block diagram illustrating a further additional signal processing circuit in accordance with the present invention;

Figure 1:
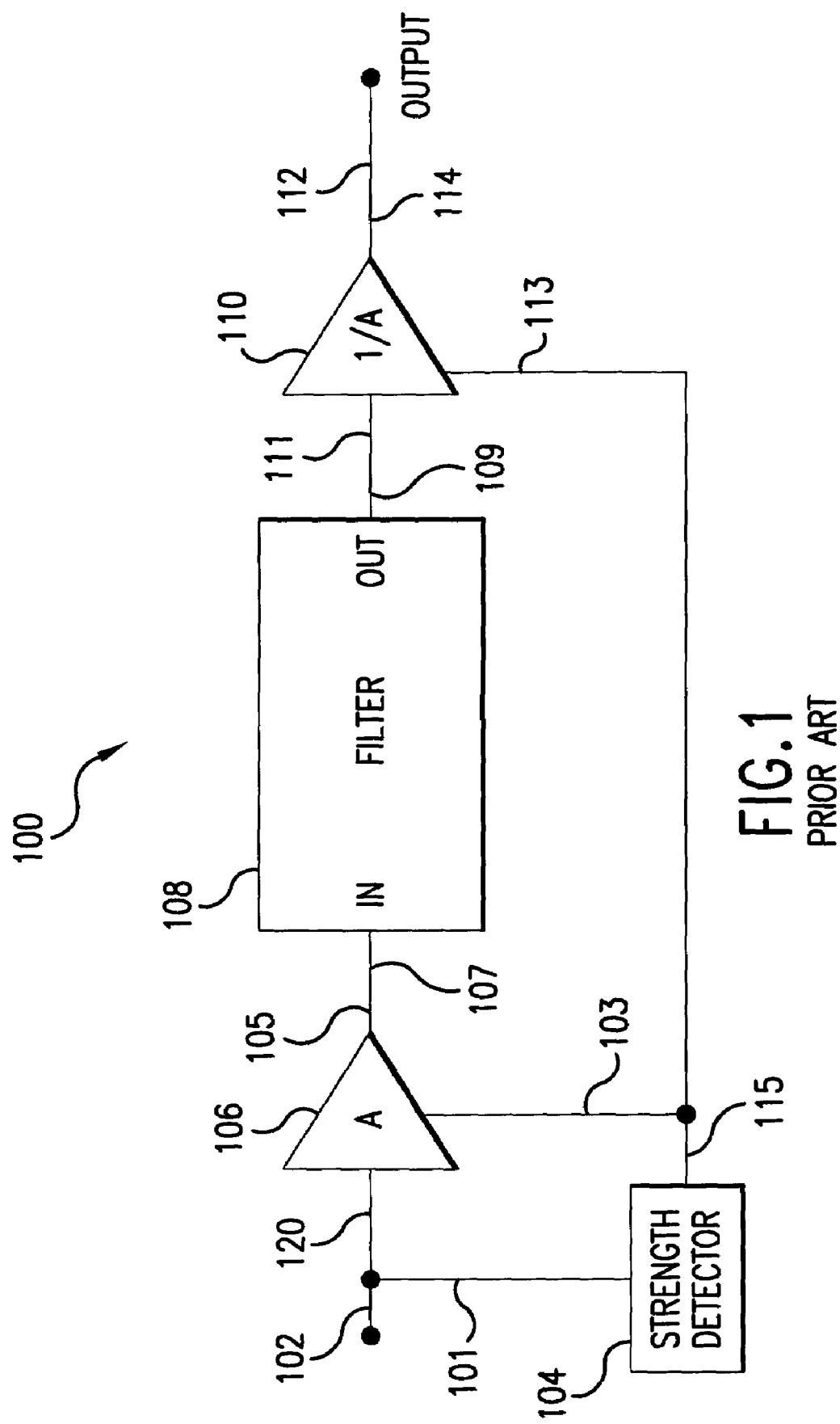
FIG. 1 is a block diagram illustrating a prior art signal processing system.

Throughout the figures, unless otherwise stated, the same reference numerals and characters are used to denote like features, elements, components, or portions of the illustrated embodiments. Moreover, while the subject invention will now be described in detail with reference to the figures, and in connection with the illustrative embodiments, changes and modifications can be made to the described embodiments without departing from the true scope and spirit of the subject invention as defined by the appended claims.

DETAILED DESCRIPTION OF THE INVENTION

FIG. 1 illustrates an example of a prior art signal processing system 100. The signal processing system 100 is a companding filter. A companding filter amplifies or attenuates an input signal that is applied to a filter circuit, and attenuates or amplifies the output signal from the circuit. The prior art companding filter 100 includes an input 102, a signal strength detector 104, an input variable gain amplifier 106, a main filter 108, an output variable gain amplifier 110, and an output 112.

The input 102 of the signal processing system 100 corresponds to input 101 of the signal strength detector 104 and an input 120 of the input variable gain amplifier 106. The input variable gain amplifier 106 amplifies or attenuates the signal received by the input 120 depending on a gain control input signal received at a gain control input 103 of the input variable gain amplifier 106 and outputs the resultant signal at its output 105. The output 105 of the input variable gain amplifier 106 corresponds to input 107 of the main filter 108. The main filter 108 processes the signal received at the input 107 and produces an output signal at its output 109. The output 109 of the main filter 108 corresponds to input 111 of the output variable gain amplifier 110. The output variable gain amplifier 110 amplifies or attenuates the signal received at the input 111 depending on a gain control signal received at a gain control input 113 of the output variable gain amplifier 110 and outputs the resultant signal at its output 112. The gain of the output variable gain amplifier 110 is the inverse of the gain of the input variable gain amplifier 106. The output 114 of the output variable gain amplifier 110 is connected to the output 112 of the signal processing system 100.

The signal strength detector 104 measures the strength (e.g., the voltage envelope) of the signal applied to the input 101 of the signal strength detector 104 and outputs a gain control signal at its output 115, which is connected to the gain control inputs 103 and 113 of the input variable gain amplifier 106 and the output variable gain amplifier 110, respectively. Depending on the strength of the signal at the input 101 of the signal strength detector 104, different gain control signals are provided at the output 115 of the signal strength detector 104. If the signal applied to the input 101 of the signal strength detector 104 is small, the gain control signal should be large causing the signal applied to the input 102 of the signal processing system 100 to be amplified before it is applied to the main filter 108, such that the signal is large compared to the filter noise, i.e. the noise generated by the filter. If the signal applied to the input 101 of the signal strength detector 104 is large, the gain control signal should be small causing the signal applied to the input 102 of the signal processing system 100 to be slightly amplified or even attenuated before it is applied to the signal processing circuit 108 to avoid saturating the main filter 108.

Figure 2:
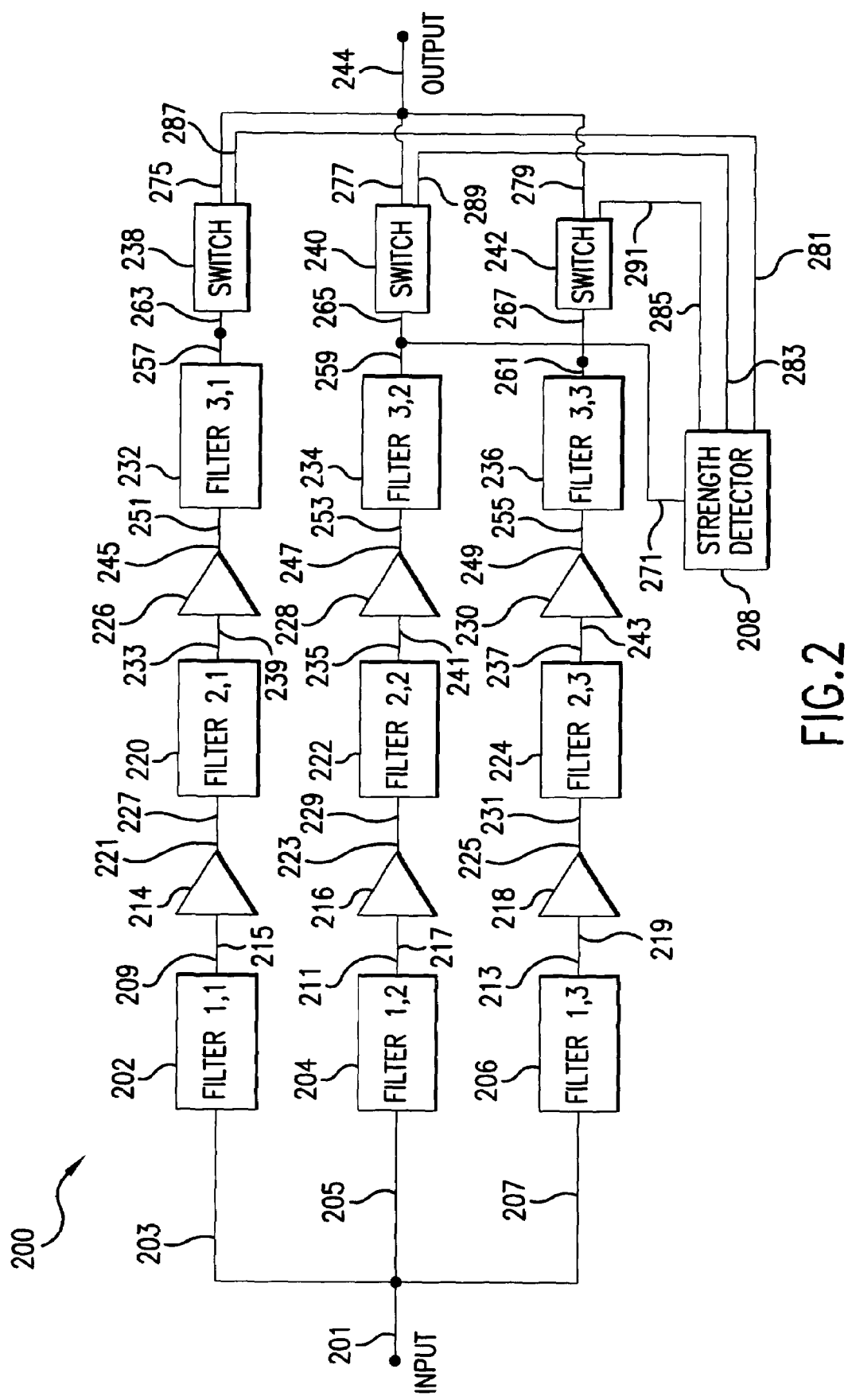
FIG. 2 is a block diagram illustrating a signal processing system in accordance with the present invention.

FIG. 2 illustrates an example of a signal processing system 200. The signal processing system 200 generates a processed signal with a strong in channel component well above the filter noise. The signal processing system 200 includes three banks of filters in parallel with each other. The first bank of filters includes a plurality of filters 202, 220, 232, a plurality of amplifiers 214, 226 and a first bank switch 238. The second bank of filters includes a plurality of filters 204, 222, 234, a plurality of amplifiers 216, 228 and a second bank switch 240. The third bank of filters includes a plurality of filters 206, 224, 236, a plurality of amplifiers 218, 230 and a third bank switch 242.

It is noted that a different number of filter banks may be used, and each one of the filter banks may have more or fewer filters and associated amplifiers.

A signal received by the input 201 of the signal processing system 200, which typically includes an in-band component and an out-band component, is conveyed to an input 203 of the filter 202 of the first filter bank. Preferably, the filter 202 has enough linear range to accommodate the in-band component and the out-band component of the signal without saturating. The filter 202 processes the signal received at its input 203 and outputs a processed signal at its output 209. The output 209 of the filter 202 corresponds to input 215 of the amplifier 214. The amplifier 214 is a fixed gain amplifier, which amplifies the signal received at its input 215 and produces an output signal at its output 221. The output 221 of the amplifier 214 corresponds to input 227 of the filter 220. The filter 220 processes the signal received at its input 227 and outputs a processed signal at its output 233. The output 233 of the filter 220 corresponds to input 239 of the amplifier 226. The amplifier 226 is a fixed gain amplifier, which amplifies the signal it receives at its input 239 and produces an output signal at its output 245. The output 245 of the amplifier 226 corresponds to input 251 of the filter 232. The filter 232 processes the signal received at its input 251 and outputs a processed signal at its output 257. The output 257 of the filter 232 corresponds to input 263 of the switch 238. An output 275 of the switch 238 is connected to the output 244 of the signal processing system 200.

The signal received by the input 201 of the signal processing system 200 is also conveyed to an input 205 of the filter 204 of the second filter bank. Preferably, the filter 204 has enough linear range to accommodate the in-band component and the out-band component of the signal without saturating. The filter 204 processes the signal received at its input 205 and provides a processed signal at its output 211. The output 211 of the filter 204 corresponds to input 217 of the amplifier 216. The amplifier 216 is a fixed gain amplifier, which amplifies the signal received at its input 217 and produces an amplified signal at its output 223. The output 223 of the amplifier 216 corresponds to input 229 of the filter 222. The filter 222 processes the signal received at its input 229 and outputs a processed signal at its output 235. The output 235 of the filter 222 corresponds to input 241 of the amplifier 228. The amplifier 228 is a fixed gain amplifier, which amplifies the signal received at its input 241 and produces an amplified signal at its output 247. The output 247 of the amplifier 228 corresponds to input 253 of the filter 234. The filter 234 processes the signal received at its input 253 and outputs a processed signal at its output 259. The output 259 of the filter 234 corresponds to input 265 of the switch 240 and to an input 271 of the signal strength detector 208. An output 277 of the switch 240 is connected to the output 244 of the signal processing system 200.

The signal received by the input 201 of the signal processing system 200 is also conveyed to an input 207 of the filter 206 of the third filter bank. Preferably, the filter 206 has enough linear range to accommodate the in-band component and the out-band component of the signal without saturating. The filter 206 processes the signal received at its input 207 and outputs a processed signal at its output 213. The output 213 of the filter 206 corresponds to input 231 of the amplifier 218. The amplifier 218 is a fixed gain amplifier, which amplifies the signal received at its input 219 and produces an amplified signal at its output 225. The output 225 of the amplifier 218 corresponds to input 231 of the filter 224. The filter 224 processes the signal received at its input 231 and provides a processed signal at its output 237. The output 237 of the filter 224 corresponds to input 243 of the amplifier 230. The amplifier 230 is a fixed gain amplifier, which amplifies the signal received at its input 243 and produces an amplified signal at its output 249. The output 249 of the amplifier 230 corresponds to input 255 of the filter 236. The filter 236 processes the signal received at its input 255 and outputs a processed signal at its output 261. The output 261 of the filter 236 corresponds to input 267 of the switch 242. The output 279 of the switch 242 is connected to the output 244 of the signal processing system 200.

Preferably, the filters 202, 204, 206 have the same transfer function; the filters 220, 222, 224 have the same transfer function; and the filters 232, 234, 236 have the same transfer function.

Each filter bank should be optimized to effectively process signals with a different in-band component/out-band component ratio. The first filter bank is optimized for input signals having a large out-band component and a relatively small in-band component. The first filter bank is optimized by having the amplifiers 214, 226 have a gain of more than one. Preferably, the amplifiers 214, 226 have gains of ten so that each amplifier provides a signal with ten times the amplitude of the input signal. The second bank is optimized for input signals having an out-band component which is slightly larger than the in-band component. The second filter bank is optimized by having the amplifier 216 have a gain of one, and having the amplifier 228 have a gain greater than one. Preferably, the amplifier 228 has a gain of ten, causing the amplifier 228 to provide a signal at its output 247 with ten times the amplitude of the signal received at its input 241. The third bank is optimized for input signals having an out-band component that is approximately equal to the in-band component. The third filter bank is optimized by having the amplifiers 218, 230 each have a gain substantially equal to one. Preferably, the amplifiers 214, 216, 218, 226, 228 and 230 are clamped such that they will not provide any of the filters 220, 222, 224, 232, 234 and 236, respectively, with an input signal that will saturate the filter.

The signal strength detector 208 selects the filter bank that is the most suitable for processing the signal received by the input 201 of the signal processing system 200. An input 271 of the signal strength detector 208 is connected to the output 259 of the filter 234, and outputs 281, 283, 285 of the signal strength detector 208 are connected to the switch control inputs 287, 289, 291 of the switches 238, 240, 242, respectively. The signal strength detector 208 can detect the voltage envelope of the signal on the output 259 of the filter 234. A low-pass-filtered rectifier, well-known for use in many other applications, is one example of a circuit which can be used as an envelope detector. The signal strength detector 208 determines if the voltage envelope of the output 259 of the filter 234 exceeds a first limit whereby the output signal of the filter is approaching the minimum tolerable signal to noise ratio of the filter, or a second limit whereby the filter is entering saturation. In the exemplary embodiment of the signal processing system 200 the first, second and third filter banks are designed such that there exists a first limit representing the point where the first filter bank is near saturation and the output signal of the second filter bank is near the minimum tolerable signal to noise ratio of the second filter bank, and a second limit representing the point where the second filter bank is near saturation and the output signal of the third filter bank is near the minimum tolerable signal to noise ratio of the third filter bank.

If the signal strength detector 208 detects that the voltage envelope of the signal at the output 259 of the filter 234 does not exceed the first limit or the second limit, the signal strength detector 208 selects the first filter bank by providing a logical one on its output 281 to cause the switch 238 to close and a logical zero on its outputs 283, 285 to cause the switches 240, 242, respectively, to open, thereby connecting the first filter bank to the output 244 of the signal processing system 200 and disconnecting the second filter bank and the third filter bank from the output 244. For purposes of the specification and claims, positive logic is assumed. If the signal strength detector 208 detects that the voltage envelope of the signal at the output 259 of the filter 234 exceeds the first limit but not the second limit, the signal strength detector 208 selects the second filter bank by providing a logical one on its output 283 to cause the switch 240 to close and a logical zero on its outputs 281, 285 to cause the switches 238, 242, respectively, to open, thereby connecting the second filter bank to the output 244 of the signal processing system 200 and disconnecting the first filter bank and the third filter bank from the output 244. If the signal strength detector 208 detects that the voltage envelope of the signal at the outputs 259 of the filter 234 exceeds the first limit and the second limit, the signal strength detector 208 selects the third filter bank by providing a logical one on its output 285 to cause the switch 242 to close and logical zero on its outputs 281, 283 to cause the switches 240, 242, respectively, to open, thereby connecting the third filter bank to the output 244 of the signal processing system 200 and disconnecting the first filter bank and the second filter bank from the output 244.

In an alternate exemplary embodiment, the signal strength detector 208 measures the strengths of the signals at other nodes in the signal processing system 200. The signal strength detector 208 may, for example, measure the voltage envelopes of the signals on outputs 233, 235, 237 of the filters 220, 222, 224, respectively.

Figure 7A:
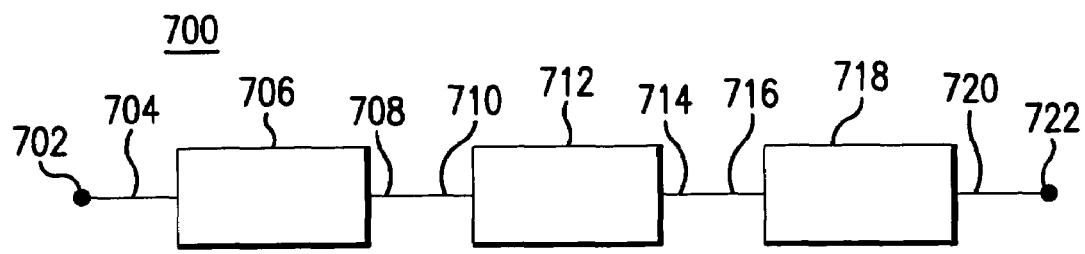
FIG. 7(a) is a block diagram illustrating a first filter bank in accordance with the present invention.
Figure 7B:
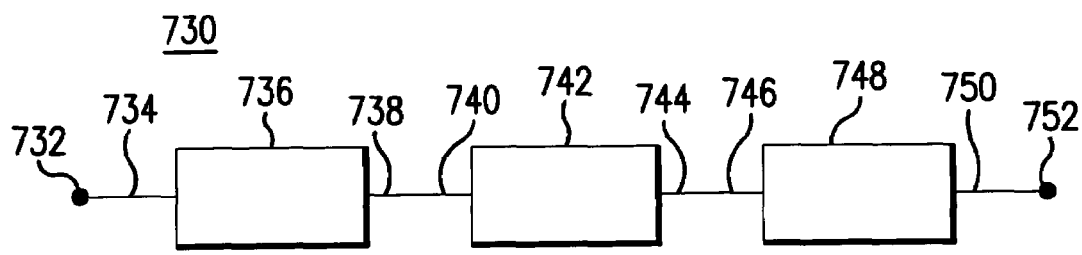
FIG. 7(b) is a block diagram illustrating a second filter bank in accordance with the present invention.
Figure 7C:
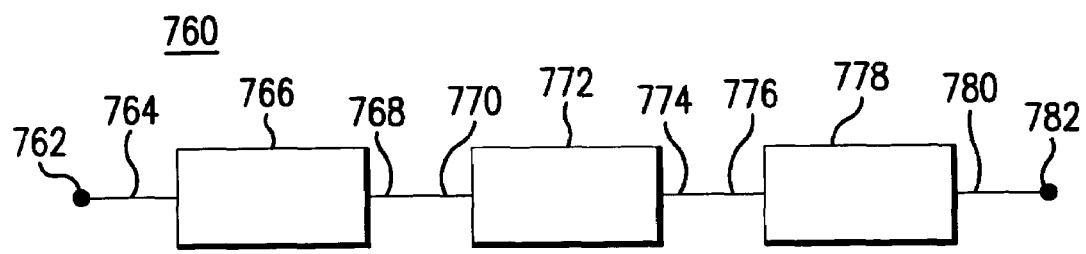
FIG. 7(c) is a block diagram illustrating a third filter bank in accordance with the present invention.

In another alternate exemplary embodiment, the first, second and third banks of filters, and associated amplifiers, shown in FIG. 2, can each be replaced by a respective sixth order bandpass Chebychev filters 700, 730, 760, shown in FIGS. 7(a), 7(b), 7(c), respectively. The sixth order bandpass Chebychev filter 700 of FIG. 7(a) advantageously has a ripple of 0.25 dB, a bandwidth of 0.5 MHz, and a center frequency of 1.25 Mhz. The sixth order bandpass Chebychev filter 730 of FIG. 7(b) advantageously has a ripple of 0.25 dB, a bandwidth of 0.5 MHz, and a center frequency of 1.25 MHz. The sixth order bandpass Chebychev filter 760 of FIG. 7(c) advantageously has a ripple of 0.25 dB, a bandwidth of 0.5 MHz, a center frequency of 1.25 MHz. Preferably, each of the sixth order bandpass Chebychev filters 700, 730, 760 can be implemented by connecting three standard Tow-Thomas biquads 800 together in series.

Figure 8:
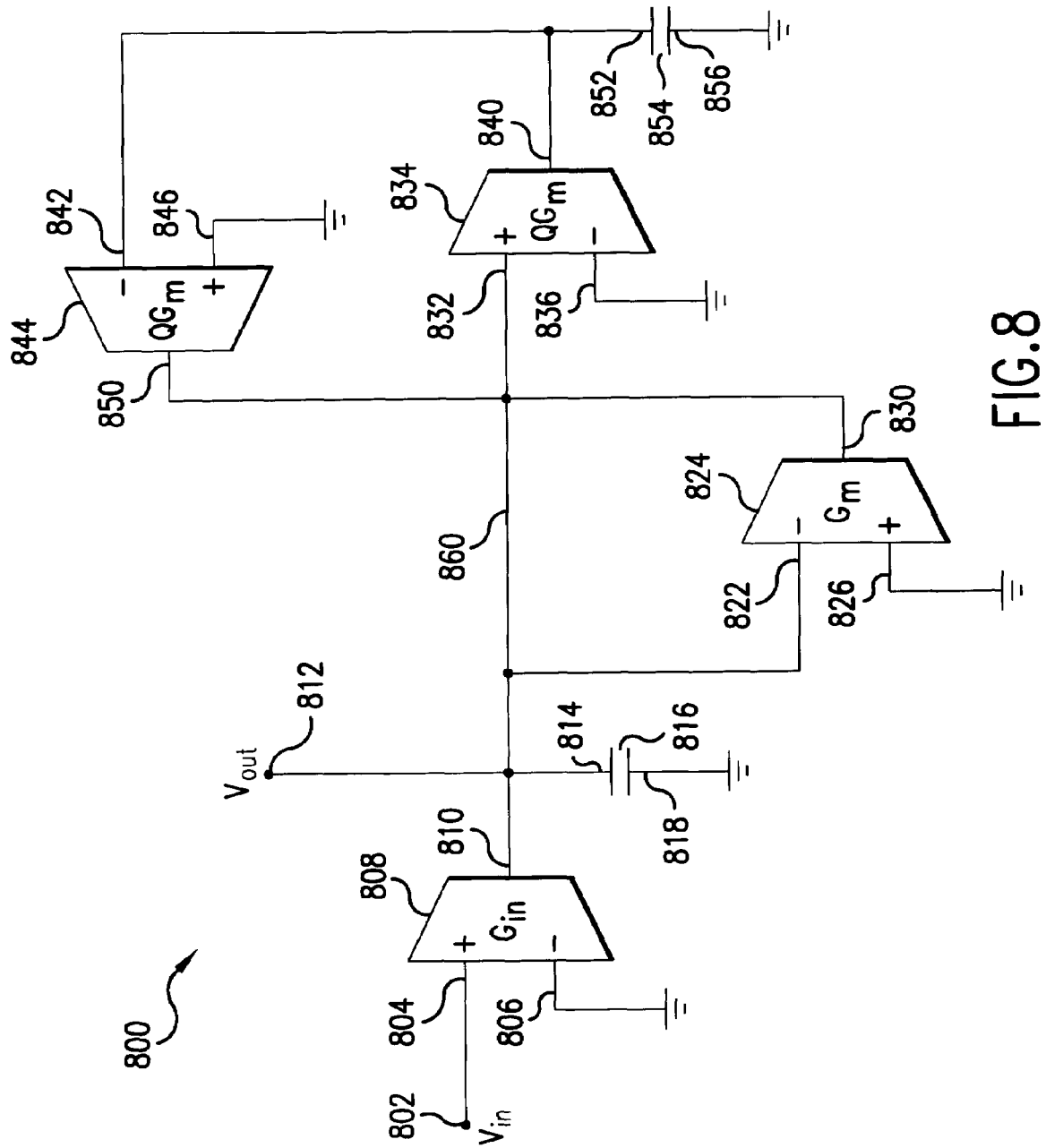
FIG. 8 is a circuit diagram illustrating a Tow-Thomas biquad in accordance with the present invention.

FIG. 8 illustrates the standard Tow-Thomas biquad circuit 800. The Tow-Thomas biquad 800 includes a transconductor 808, a transconductor 824, a transconductor 834, a transconductor 844, a capacitor 816, and a capacitor 854. The center frequency $\omega_0$ of the Tow-Thomas biquad 800 can be calculated by the equation:

$$\omega_0 = QG_m/C \qquad (1)$$

where Q is the quality factor of the Tow-Thomas biquad circuit 800. The absolute value of the transconductors and capacitors can be scaled by the same factor, i.e. impedance scaling, without affecting the transfer function of the Tow-Thomas biquad 800, since the transfer function depends on the ratios between these values. Impedance scaling does not change the transfer function of the Tow-Thomas biquad 800, however it does change the power dissipation and the noise level of the Tow-Thomas biquad 800.

A signal received by the input 802 of the Tow-Thomas biquad 800 is conveyed to a positive input 804 of a transconductor 808. The transconductor 808 processes the difference between the signal received at the positive input 804 and the signal received at a negative input 806, which is connected to ground, and provides a signal at an output 810. The signal at the output 810 is equal to the difference in the signal received by the positive input 804 and the signal received by the negative input 806 of the transconductor 808, scaled by a transconductance $G_{in}$ of the transconductor 808. The transconductance $G_{in}$ of the transconductor 808 sets the gain of the biquad 800, for example, if $G_{in}$ is ten times $G_m$, the effective input amplification for the biquad 800 is ten. The output 810 of the transconductor 808 is connected to a terminal 814 of the capacitor 816, a negative input 822 of a transconductor 824, an output 830 of the transconductor 824, a positive input 832 of the transconductor 834, an output 850 of the transconductor 844, and the output 812 of the Tow-Thomas biquad 800. These connections form a node 860. The other terminal 818 of the capacitor 816 is connected to ground. The capacitor 816 integrates the currents provided at node 860.

The transconductor 824 processes the difference between the signal received at a positive input 826, which is connected to ground, and the signal received at the negative input 822 and provides a signal at the output 830. The signal at the output 830 of the transconductor 824 is equal to the difference in the signal received by its positive input 826 and the signal received by its negative input 822, scaled by its transconductance $G_m$. The output 830 of the transconductor 824 is connected to one terminal 814 of a capacitor 816, the negative input 822 of the transconductor 824, the output 830 of the transconductor 824, the positive input 832 of the transconductor 834, the output 850 of the transconductor 844, and the output 812 of the Tow-Thomas biquad 800. The transconductor 824 forms a feedback loop with the node 860.

The transconductor 834 processes the difference between the signal received at its positive input 832 and the signal received at its negative input 836, which is connected to ground, and provides a signal at an output 840. The signal at the output 840 is equal to the difference in the signal received by the positive input 832 and the signal received by the negative input 836, scaled by a transconductance $QG_m$. The output 840 of the transconductor 834 is connected to one terminal 852 of a capacitor 854 and a negative input 842 of the transconductor 844. The other terminal 856 of the capacitor 854 is connected to ground.

The transconductor 844 processes the difference between the signal received at its positive input 846, which is connected to ground, and the signal received at its negative input 842 and provides a signal at an output 850. The signal at the output 850 is equal to the difference in the signal received by the positive input 846 and the signal received by the negative input 842 of the transconductor 844, scaled by a transconductance $QG_m$. The output 850 of the transconductor 844 is connected to on terminal 814 of the capacitor 816, the negative input 822 of the transconductor 824, the output 830 of the transconductor 824, the positive input 832 of the transconductor 834, and the output 812 of the Tow-Thomas biquad 800. The transconductors 834, 844 and the capacitor 854 form a feedback loop to the node 860.

In an exemplary embodiment of the Tow-Thomas biquad 800, a first diode and a second diode are connected to the node 860. The cathode of the first diode is connected to the node 860, and an anode of the first diode is connected to ground. The anode of the second diode is connected to the node 860, and a cathode of the second diode is connected to ground. This arrangement limits the voltage swing at the node 860 to approximately ±0.7 volts.

In another exemplary embodiment of the Tow-Thomas biquad 800, a first diode and a second diode are connected to the input 804. The cathode of the first diode is connected to the input 804, and an anode of the first diode is connected to ground. The anode of the second diode is connected to the input 804, and a cathode of the second diode is connected to ground. This arrangement limits the voltage swing at the input 804 to approximately ±0.7 volts.

In still another embodiment of the Tow-Thomas biquad 800, a first diode and a second diode are connected to the output 840. The cathode of the first diode is connected to the output 840, and an anode of the first diode is connected to ground. The anode of the second diode is connected to the output 840, and a cathode of the second diode is connected to ground. This arrangement limits the voltage swing at the output 840 to approximately ±0.7 volts.

Figure 9:
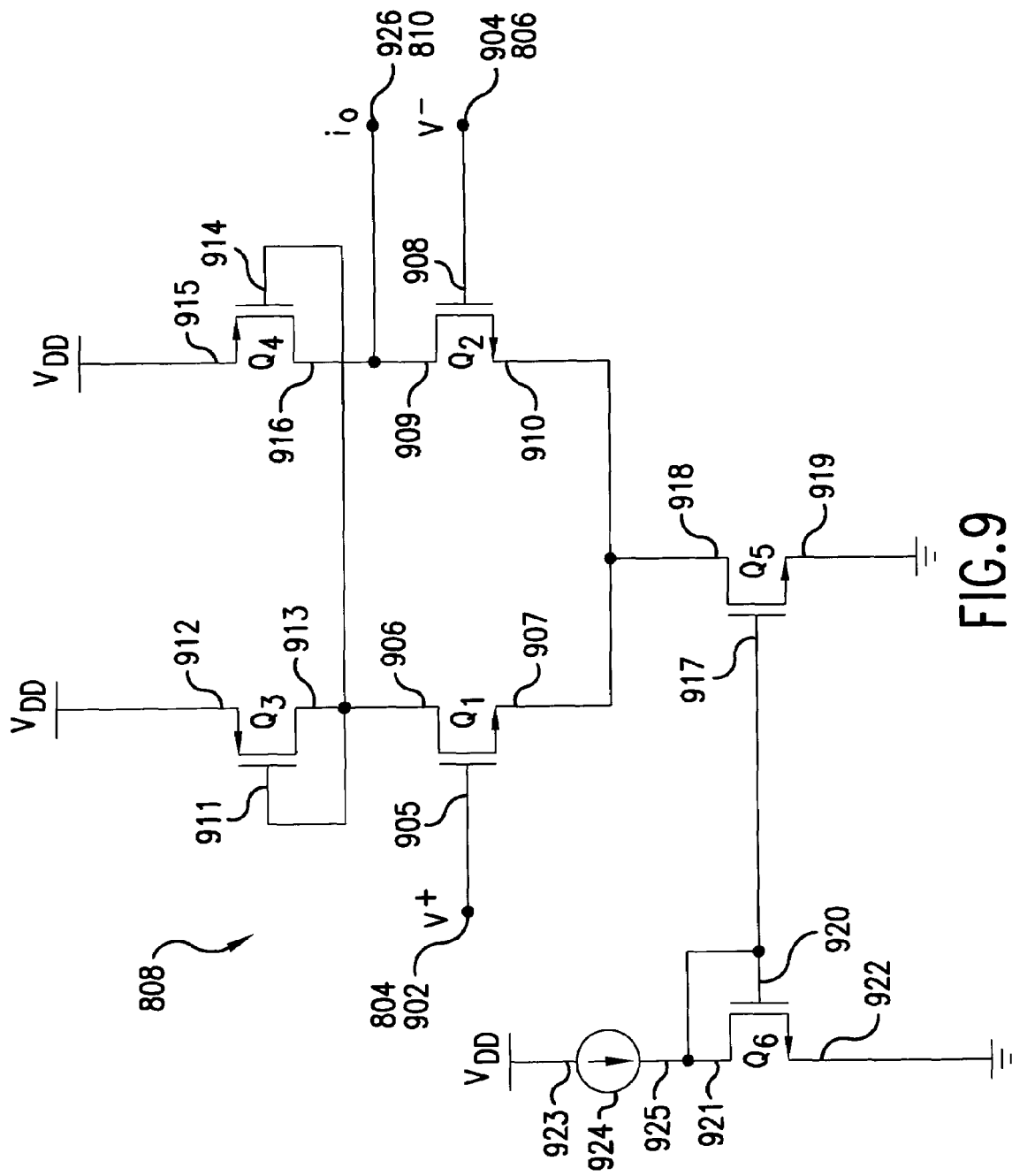
FIG. 9 is a circuit diagram illustrating a transconductor in accordance with the present invention.

FIG. 9 illustrates the transconductor 808 in greater detail. The transconductors 808, 826, 834 and 844 are similar in construction. The transconductor 808 includes an NMOS transistor Q1, an NMOS transistor Q2, a PMOS transistor Q3, a PMOS transistor Q4, an NMOS transistor Q5, an NMOS transistor Q6, and a current source 924.

A signal received by the positive input 804 of the transconductor 808 is conveyed to the gate 905 of the NMOS transistor $Q_1$. The NMOS transistor $Q_1$ allows current to flow from its source 907 to its drain 906, or vice versa, depending on the signal at the gate 905 and the relative voltages at its source 907 and at its drain 906. The drain 906 of the NMOS transistor $Q_1$ is connected to the drain 913 and the gate 911 of the PMOS transistor $Q_3$, and the gate 914 of the PMOS transistor $Q_4$. The source 907 of the NMOS transistor $Q_1$ is connected to the drain 918 of the NMOS transistor $Q_5$, and the source 910 of the NMOS transistor $Q_2$.

A signal received by the negative input 806 of the transconductor 808 is conveyed to a gate 908 of the NMOS transistor $Q_2$. The drain 909 of the NMOS transistor $Q_2$ is connected to the drain 916 of the PMOS transistor $Q_4$ and is the output 810 of the transconductor 808. The source 910 of the NMOS transistor $Q_2$ is connected to the drain 918 of the NMOS transistor $Q_5$, and the source 907 of the NMOS transistor $Q_1$.

The drain 913 of the PMOS transistor $Q_3$ is connected to the drain 906 of the NMOS transistor $Q_1$, the gate 911 of the PMOS transistor $Q_3$, and the gate 914 of the PMOS transistor $Q_4$. The source 912 of the PMOS transistor $Q_3$ is connected to supply voltage $V_{dd}$. The gate 911 of the PMOS transistor $Q_3$ is connected to the drain 906 of the NMOS transistor $Q_1$, the drain 913 of the PMOS transistor $Q_3$, and the gate 914 of the PMOS transistor $Q_4$.

The drain 916 of the PMOS transistor $Q_4$ is connected to the drain 909 of the NMOS transistor $Q_2$, and the output 810 of the transconductor 808. The source 912 of the PMOS transistor $Q_3$ is connected to supply voltage $V_{dd}$. The gate 914 of the PMOS transistor $Q_4$ is connected to the drain 906 of the NMOS transistor $Q_1$, the drain 913 and the gate 911 of the PMOS transistor $Q_3$.

The drain 918 of the NMOS transistor $Q_5$ is connected to the source 907 of the NMOS transistor $Q_1$ and the source 910 of the NMOS transistor $Q_2$. The source 919 of the NMOS transistor $Q_5$ is connected to supply voltage $V_{ss}$. The gate 917 of the NMOS transistor $Q_5$ is connected to the gate 920 and the drain 921 of the NMOS transistor $Q_6$, and the positive terminal 925 of the current source 924.

The drain 921 of the NMOS transistor $Q_6$ is connected to the gate 920 of the NMOS transistor $Q_6$, the gate 917 of the NMOS transistor $Q_5$, and the positive terminal 925 of the current source 924. The source 922 of the NMOS transistor $Q_6$ is connected to supply voltage $V_{ss}$. The gate 920 of the NMOS transistor $Q_6$ is connected to the gate 917 of the NMOS transistor $Q_5$, the drain 921 of the NMOS transistor $Q_6$, and the negative terminal 925 of the current source 924.

The current source 924 produces a bias current $I_{bias}$ for the transconductor 808. The bias current $I_{bias}$ produced by the current source 924 controls the center frequency of the filter. The bias current $I_{bias}$ of the transconductor 808 is adjusted to give a stable center frequency in the presence of fabrication tolerances and temperature variations. The bias current $I_{bias}$ can be any value, for example 100 micro-amperes, and the transistors $Q_1$, $Q_2$, $Q_3$, $Q_4$, $Q_5$, $Q_6$ of the transconductor 808 are scaled to yield the desired transconductances. The transconductance for the transconductors is calculated using the equation:

$$G_m = I_{tail}/(V_{GS}-V_T), \qquad (2)$$

where $I_{tail}$ is the current passing through the transistor $Q_5$ of the transconductor 808, $V_T$ is the threshold voltage of the two transistors $Q_5$, $Q_6$, and $V_{GS}$ is the gate-source voltage of the transistors $Q_5$, $Q_6$. The linear range of the transconductor is related to the quantity $V_{GS}-V_T$. Once the bias current $I_{bias}$ has been set, the transistors $Q_5$, $Q_6$ are scaled such that, the following equation is satisfied:

$$(W_{Q5}/L_{Q5})/(W_{Q6}/L_{Q6})=I_{tail}/I_{bias}. \quad (3)$$

The negative terminal 925 of the current source 924 is connected to the drain 921 and the gate 920 of the transistor $Q_6$, and the gate 917 of the transistor $Q_5$. The positive terminal of the current source 924 is connected to supply voltage $V_{dd}$. The preferred form of the current source 924 is a resistor connected to the between the supply voltage $V_{dd}$ and the drain 921 and the gate 920 of the NMOS transistor $Q_6$.

Referring to FIG. 7(a), a signal received by the input 702 of the sixth order bandpass Chebychev filter 700 of the first filter bank is conveyed to an input 704 of a Tow-Thomas biquad 706. The Tow-Thomas biquad 706 processes the signal received at its input 704 and provides a signal at its output 708. Advantageously, the Tow-Thomas biquad 706 has a transconductance $G_{in}$ for transconductor 808 of 771 micro-amperes per volt, transconductance $G_m$ for a transconductor 824 of 185 micro-amperes per volt, a transconductance $QG_m$ for transconductors 834 and 844 of 591 micro-amperes per volt, and a capacitance for capacitors 816, 854 of 77 picofarads. The output 708 of the Tow-Thomas biquad 706 corresponds to input 710 of a Tow-Thomas biquad 712.

In the alternative, the Tow-Thomas biquad 706 can be optimized to use less power. To optimize the Tow-Thomas biquad 706 to use less power, the transconductance $G_{in}$ for the transconductor 808 can be 979 micro-amperes per volt, the transconductance $G_m$ for the transconductor 824 can be 235 micro-amperes per volt, the transconductance $QG_m$ for transconductors 834 and 844 can be 750 micro-amperes per volt, and the capacitance for capacitors 816, 854 can be 97.5 picofarads.

The Tow-Thomas biquad 712 processes the signal received at its input 710 and provides a signal at its output 714. Advantageously, the Tow-Thomas biquad 712 has a transconductance $G_{in}$ for the transconductor 808 of 2312 micro-amperes per volt, a transconductance $G_m$ for the transconductor 824 of 185 micro-amperes per volt, a transconductance $QG_m$ for the transconductors 834 and 844 of 1210 micro-amperes per volt, and a capacitance for the capacitors 816, 854 of 196 picofarads. The output 714 of the Tow-Thomas biquad 712 corresponds to input 716 of a Tow-Thomas biquad 718.

In the alternative, the Tow-Thomas biquad 712 can be optimized to use less power. To optimize the Tow-Thomas biquad 712 to use less power, the transconductance $G_{in}$ for the transconductor 808 can be 294 micro-amperes per volt, the transconductance $G_m$ for the transconductor 824 can be 23.5 micro-amperes per volt, the transconductance $QG_m$ for the transconductors 834 and 844 can be 154 micro-amperes per volt, and the capacitance for the capacitors 816, 854 can be 25 picofarads.

The Tow-Thomas biquad 718 processes the signal received at its input 716 and provides a signal at its output 720. The Tow-Thomas biquad 718 has a transconductance $G_{in}$ for the transconductor 808 of 971 micro-amperes per volt, a transconductance $G_m$ for the transconductor 824 of 185 micro-amperes per volt, a transconductance $QG_m$ for the transconductors 834 and 844 of 1210 micro-amperes per volt, and a capacitance for the capacitors 816, 854 of 126 picofarads. The output 720 of the Tow-Thomas biquad 718 corresponds to output 722 of the sixth order bandpass Chebychev filter 700.

In the alternative, the Tow-Thomas biquad 718 can be optimized to use less power. To optimize the Tow-Thomas biquad 718, the transconductance $G_{in}$ for the transconductor 808 can be 123 micro-amperes per volt, the transconductance $G_m$ for the transconductor 824 can be 23.5 micro-amperes per volt, the transconductance $QG_m$ for the transconductors 834 and 844 can be 154 micro-amperes per volt, and the capacitance for the capacitors 816, 854 can be 16 picofarads.

Referring to FIG. 7(b), a signal received by the input 732 of the sixth order bandpass Chebychev filter 730 of the second filter bank is conveyed to an input 734 of a Tow-Thomas biquad 736. The Tow-Thomas biquad 736 processes the signal received at its input 734 and provides a signal at its output 738. Advantageously, the Tow-Thomas biquad 736 has a transconductance $G_{in}$ for the transconductor 808 of 9.29 micro-amperes per volt, a transconductance $G_m$ for the transconductor 824 of 2.23 micro-amperes per volt, a transconductance $QG_m$ for the transconductors 834 and 844 of 7.12 micro-amperes per volt, and a capacitance for the capacitors 816, 854 of 0.9252 picofarads. The output 738 of the Tow-Thomas biquad 736 corresponds to input 740 of a Tow-Thomas biquad 742.

The Tow-Thomas biquad 742 processes the signal received at its input 740 and provides a signal at its output 744. Advantageously, the Tow-Thomas biquad 742 has a transconductance $G_{in}$ for the transconductor 808 of 9.29 micro-amperes per volt, a transconductance $G_m$ for the transconductor 824 of 2.23 micro-amperes per volt, a transconductance $QG_m$ for the transconductors 834 and 844 of 14.59 micro-amperes per volt, and a capacitance for the capacitors 816, 854 of 2.3664 picofarads. The output 744 of the Tow-Thomas biquad 742 corresponds to input 746 of a Tow-Thomas biquad 748.

The Tow-Thomas biquad 748 processes the signal received at its input 746 and provides a signal at its output 750. Advantageously, the Tow-Thomas biquad 748 has a transconductance $G_{in}$ for the transconductor 808 of 9 micro-amperes per volt, a transconductance $G_m$ for the transconductor 824 of 2.23 micro-amperes per volt, a transconductance $QG_m$ for the transconductors 834 and 844 of 14.59 micro-amperes per volt, and a capacitance for the capacitors 816, 854 of 1.5191 picofarads. The output 750 of the Tow-Thomas biquad 748 corresponds to output 752 of the sixth order bandpass Chebychev filter 730.

Referring to FIG. 7(c), a signal received by the input 762 of the sixth order bandpass Chebychev filter 760 of the third filter bank is conveyed to an input 764 of a Tow-Thomas biquad 766. The Tow-Thomas biquad 766 processes the signal received at its input 764 and provides a signal at its output 768. The Tow-Thomas biquad 766 includes a transconductance $G_{in}$ for the transconductor 808 of 0.7292 micro-amperes per volt, a transconductance $G_m$ for the transconductor 824 of 0.7 micro-amperes per volt, a transconductance $QG_m$ for the transconductors 834 and 844 of 2.2349 micro-amperes per volt, and a capacitance for the capacitors 816, 854 of 0.2904 picofarads. The output 768 of the Tow-Thomas biquad 766 corresponds to input 770 of a Tow-Thomas biquad 772.

The Tow-Thomas biquad 772 processes the signal received at its input 770 and provides a signal at its output 774. The Tow-Thomas biquad 772 includes a transconductance $G_{in}$ for the transconductor 808 of 1.1438 micro-amperes per volt, a transconductance $G_m$ for the transconductor 824 of 0.7 micro-amperes per volt, a transconductance $QG_m$ for the transconductors 834 and 844 of 4.58 micro-amperes per volt, and a capacitance for the capacitors 816, 854 of 0.7428 picofarads. The output 74 of the Tow-Thomas biquad 772 corresponds to input 776 of a Tow-Thomas biquad 778.

The Tow-Thomas biquad 778 processes the signal received at its input 776 and provides a signal at its output 780. The Tow-Thomas biquad 778 includes a transconductance $G_{i_n}$ for the transconductor 808 of 2.8269 micro-amperes per volt, a transconductance $G_m$ for the transconductor 824 of 0.7 micro-amperes per volt, a transconductance $QG_m$ for the transconductors 834 and 844 of 4.58 micro-amperes per volt, and a capacitance for the capacitors 816, 854 of 0.4769 picofarads. The output 780 of the Tow-Thomas biquad 778 corresponds to output 782 of the sixth order bandpass Chebychev filter 760.

Figure 12A:
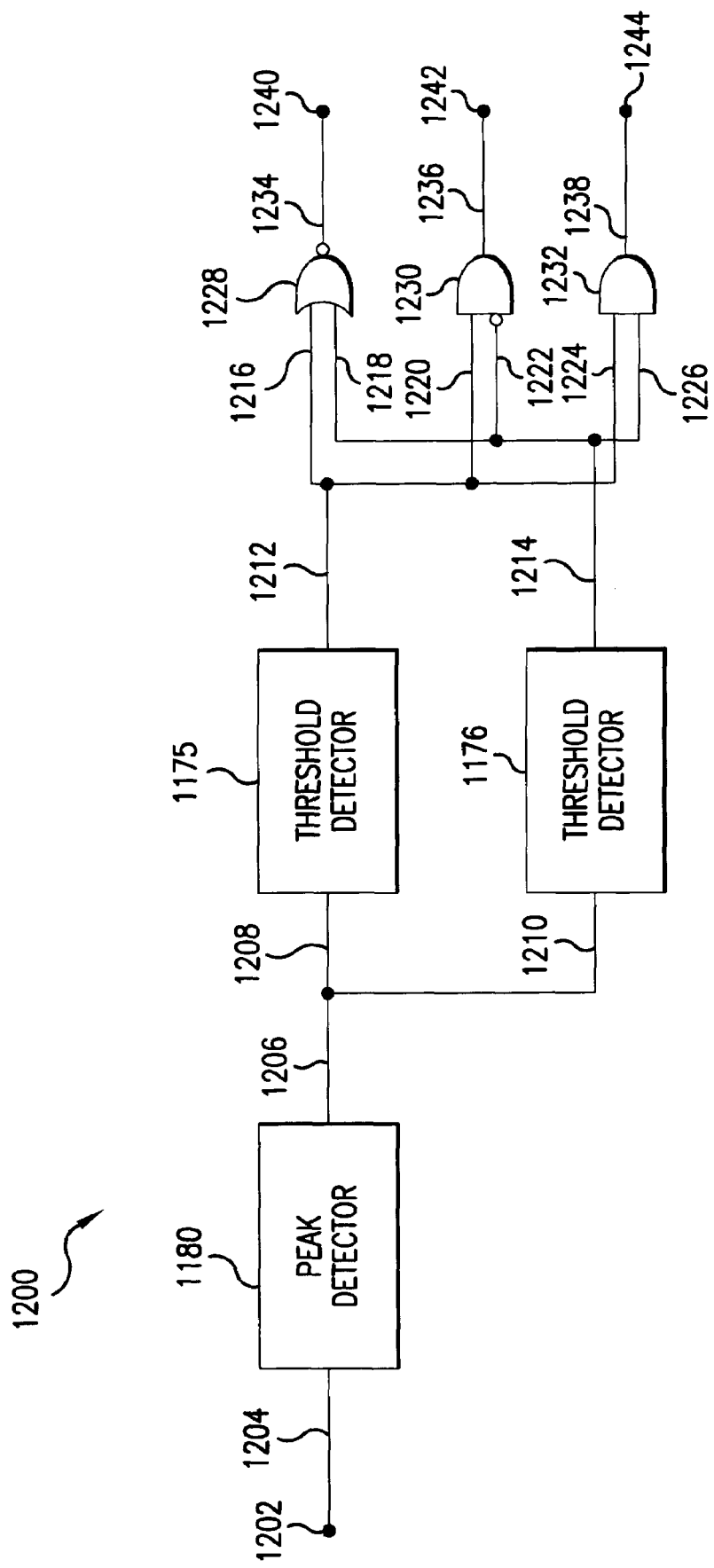
FIG. 12(a) is a block diagram illustrating an additional signal strength detector in accordance with the present invention.

Referring to FIG. 12(a), there is shown an exemplary embodiment of a signal strength detector 1200, which may be used as the signal strength detector 208 in the signal processing circuit 200 illustrated in FIG. 2. The signal strength detector 1200 has an input 1202 corresponding to the input 271 of the signal strength detector 208, and the outputs 1240, 1242, 1244, corresponding to the outputs 281, 283, 285 of the signal strength detector 208, respectively.

The signal strength detector 1200 senses the voltage envelope of the input signals received at the input 1202, and selects an appropriate signal processing circuit given two threshold limits. The first threshold limit represents a point at which the first filter bank is near saturation and the output signal of the second filter bank is near its minimum tolerable signal to noise ratio. The second threshold limit represents the point at which the second filter bank is near saturation and the output signal of the third filter bank is near its minimum tolerable signal to noise ratio. The signal strength detector 1200 includes a peak detector 1180, a first threshold detector 1175, a second threshold detector 1176, a two input NOR gate 1228, a two input AND gate 1230, and a two input AND gate 1232. The peak detector 1180 and the first threshold detector 1175 are described in more detail below in relation to FIG. 11.

A signal received at the input 1202 of the signal strength detector 1200 is conveyed to an input 1204 of the peak detector 1180. The peak detector 1180 processes the signal received at the input 1204 and provides a signal at an output 1206 of the peak detector 1180. The signal output at the output 1206 is conveyed to an input 1208 of the first threshold detector 1175 and an input 1210 of the second threshold detector 1176. The first threshold detector 1175 processes the signal received at its input 1208 and provides a signal at an output 1212. The first threshold detector 1175 transmits a logical one on the output 1212 if the signal at the input 1208 exceeds the first threshold limit, and a logical zero on the output 1212 if the signal at the input 1208 does not exceed the first threshold limit. The signal output at the output 1212 of the first threshold detector 1175 is conveyed to an input 1216 of the two input NOR gate 1228, an input 1220 of the two input AND gate 1230, and an input 1224 of the two input AND gate 1232. The second threshold detector 1176 processes the signal received at its input 1210 and provides a signal at an output 1214. The second threshold detector 1176 transmits a logical one on the output 1212 if the signal at the input 1208 exceeds the second threshold limit, and a logical zero on the output 1212 if the signal at the input 1208 does not exceed the second threshold limit. The signal output at the output 1214 of the second threshold detector 1176 is conveyed to the other input 1218 of the two input NOR gate 1228, an inverted input 1222 of the two input AND gate 1230, and the other input 1226 of the two input AND gate 1232.

The two input NOR gate 1228 processes the signals received at its input 1216 and its input 1218, and provides a signal at the output 1234. The output 1234 is connected to the output 1240 of the signal strength detector 1200. The two input AND gate 1230 processes the signals received at its input 1220 and its inverted input 1222, and provides a signal at the output 1236. The output 1236 is connected to the output 1242 of the signal strength detector 1200. The two input AND gate 1232 processes the signals received at its input 1224 and its input 1226, and provides a signal at the output 1238. The output 1238 is connected to the output 1244 of the signal strength detector 1200.

Figure 11:
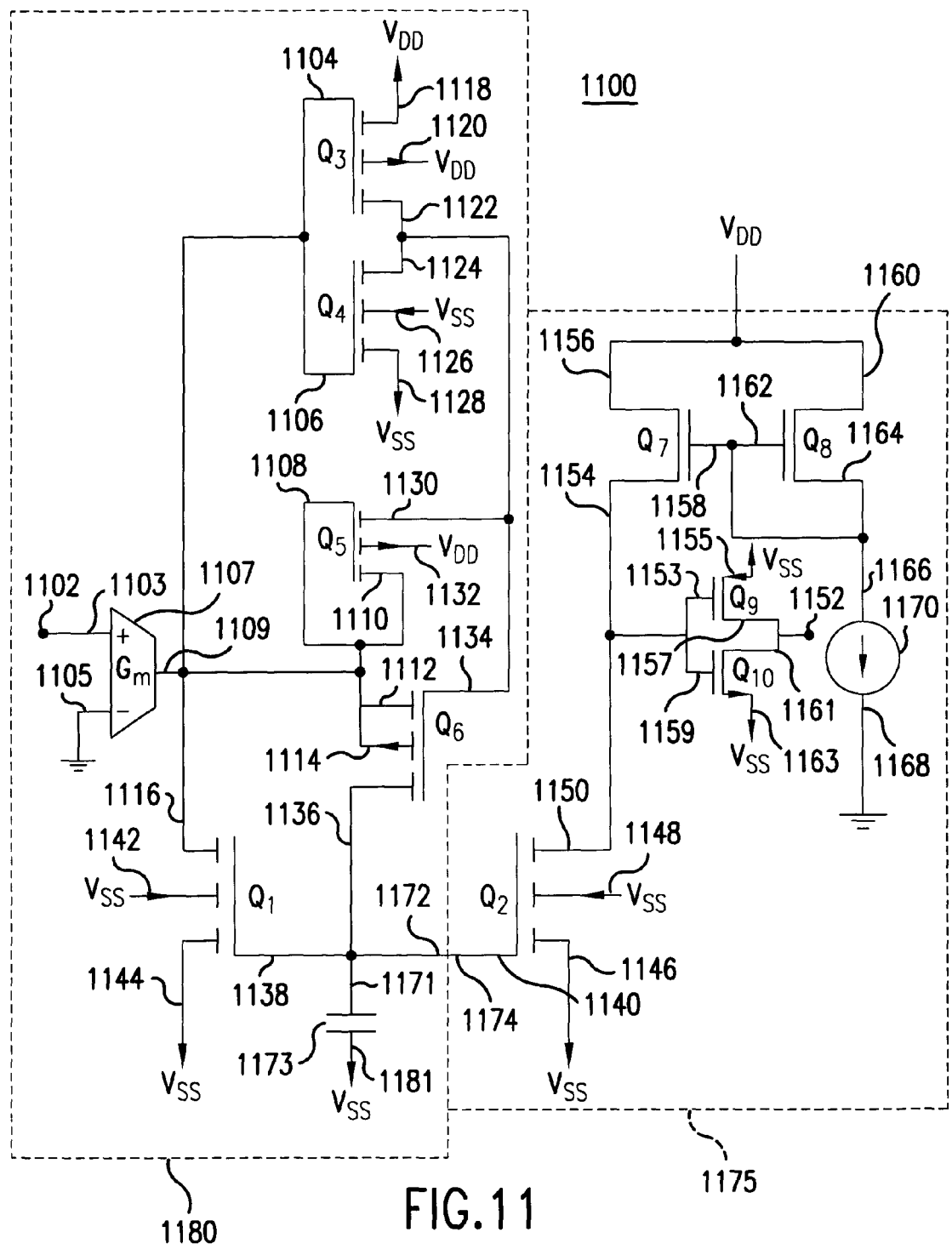
FIG. 11 is a circuit diagram illustrating a peak detector and a threshold detector in accordance with the present invention.
Figure 12B:
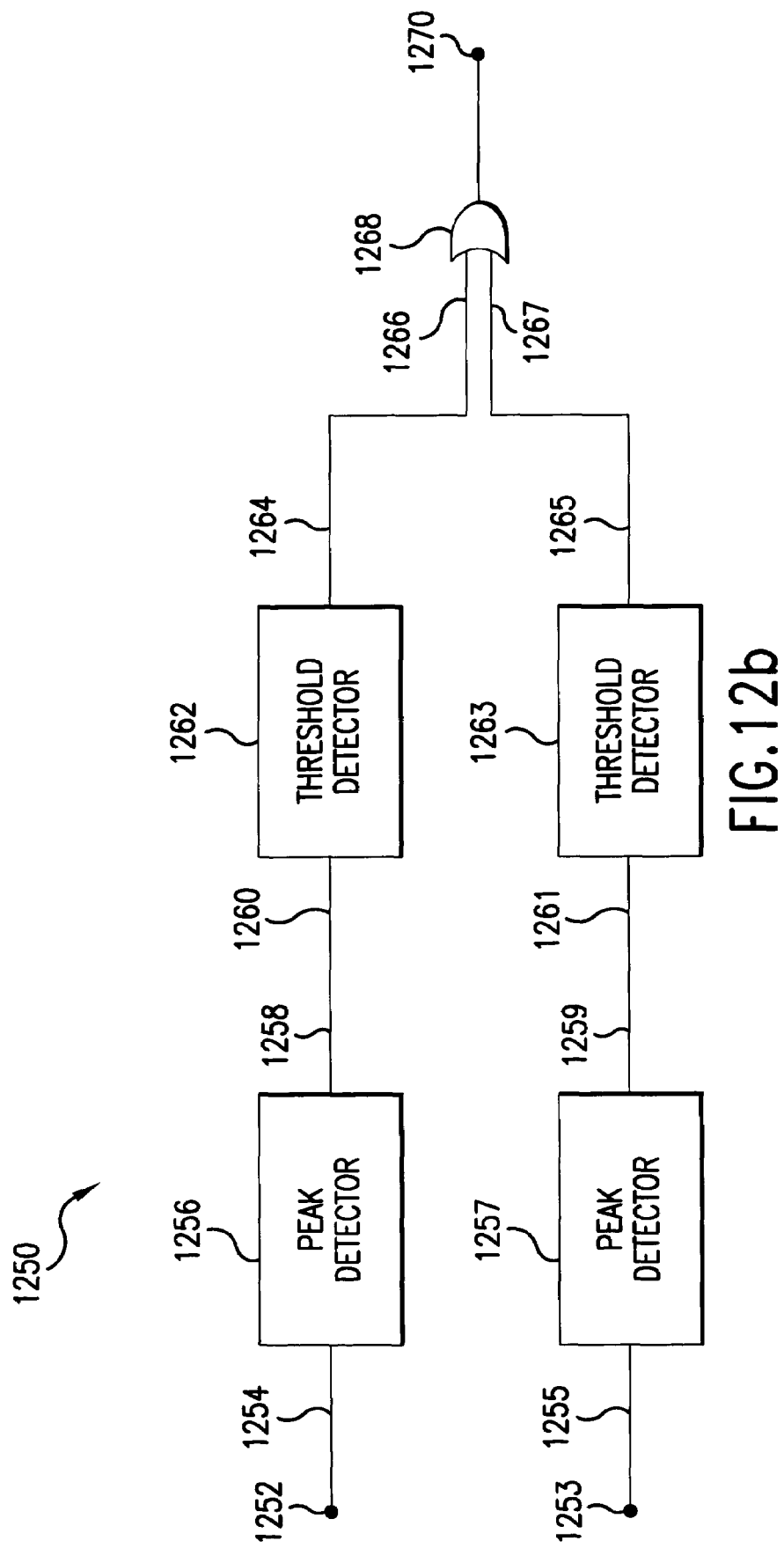
FIG. 12(b) is a block diagram illustrating an additional signal strength detector in accordance with the present invention.

FIG. 11 illustrates a portion 1100 of the signal strength detector 1200 of FIG. 12 in greater detail. The signal strength detector portion 1100 includes the peak detector 1180 and the first threshold detector 1175. The peak detector 1180 includes an NMOS transistor $Q_1$, a PMOS transistor $Q_3$, an NMOS transistor $Q_4$, a PMOS transistor $Q_5$, a PMOS transistor $Q_6$, a capacitor 1173, and a transconductor 1107.

A signal received by the input 1102 of the peak detector 1180 is conveyed to a positive input 1103 of the transconductor 1107. The transconductor 1107 processes the difference between the signal received at its positive input 1103 and a signal received at its negative input 1105, which is connected to ground, and provides a signal at an output 1109. The signal at the output 1109 is equal to the difference in the signal received by the positive input 1103 and the signal received by the negative input 1105, scaled by a transconductance $G_{in}$ of the transconductor 1107. The transconductor 1107 has a transconductance $G_m$ of 1 milli-ampere per volt. The signal provided at the output 1109 of the transconductor 1107 is conveyed the gate 1104 of the PMOS transistor $Q_3$, the gate 1106 of the NMOS transistor $Q_4$, the gate 1108 of the PMOS transistor $Q_5$, the drain 1110 of the PMOS transistor $Q_5$, the source 1112 of the PMOS transistor $Q_6$, the backgate 1114 of the PMOS transistor $Q_6$, and a drain 1116 of the NMOS transistor $Q_1$. The PMOS transistor $Q_3$ and the NMOS transistor $Q_4$ form an inverter receiving the signal received by the input 1102. The source 1118 of the PMOS transistor $Q_3$ is connected to supply voltage $V_{dd}$. The gate 1104 of the PMOS transistor $Q_3$ is connected to the input 1102, the gate 1106 of the NMOS transistor $Q_4$, the gate 1108 of the PMOS transistor $Q_5$, the drain 1110 of the PMOS transistor $Q_5$, the source 1112 of the PMOS transistor $Q_6$, the backgate 1114 of the PMOS transistor $Q_6$, and the drain 1116 of the NMOS transistor $Q_1$. The backgate 1120 of the PMOS transistor $Q_3$ is connected to supply voltage $V_{dd}$, and the drain 1122 of the PMOS transistor $Q_3$ is connected to the drain 1124 of the NMOS transistor $Q_4$, the source 1130 of the PMOS transistor $Q_5$ and the gate 1134 of the PMOS transistor $Q_6$. The source 1128 of the NMOS transistor $Q_4$ is connected to supply voltage $V_{ss}$. The gate 1106 of PMOS transistor $Q_4$ is connected to the input 1102, the gate 1104 of the PMOS transistor $Q_3$, the gate 1108 of the PMOS transistor $Q_5$, the drain 1110 of the PMOS transistor $Q_5$, the source 1112 of the PMOS transistor $Q_6$, the backgate 1114 of the PMOS transistor $Q_6$, and the drain 1116 of the NMOS transistor $Q_1$. The backgate 1126 of the NMOS transistor $Q_4$ is connected to supply voltage $V_{ss}$. The drain 1124 of the NMOS transistor $Q_4$ is connected to the drain 1122 of the PMOS transistor $Q_3$, the source 1130 of the PMOS transistor $Q_5$ and the gate 1134 of the PMOS transistor $Q_6$.

The PMOS transistor $Q_5$ is connected to act as a diode for the signal received at the input 1102 of the peak detector 1180. The gate 1108 and the drain 1110 of the PMOS transistor $Q_5$ are connected to each other, the input 1102, the gate 1104 of the PMOS transistor $Q_3$, the gate 1106 of the NMOS transistor $Q_4$, the source 1112 of the PMOS transistor $Q_6$, the backgate 1114 of the PMOS transistor $Q_6$, and the drain 1116 of the NMOS transistor $Q_1$. The backgate 1132 of the PMOS transistor $Q_5$ is connected to supply voltage $V_{dd}$. The source 1130 of the PMOS transistor $Q_5$ is connected to the drain 1122 of the PMOS transistor $Q_3$, the drain 1124 of the NMOS transistor $Q_4$ and the gate 1134 of the PMOS transistor $Q_6$.

The PMOS transistor $Q_6$ acts as a PMOS switch for the signal at the input 1102 of the peak detector 1180. The gate 1134 of the PMOS transistor Q6 is connected to the source 1130 of the PMOS transistor $Q_5$, the drain 1122 of the PMOS transistor $Q_3$, and the drain 1124 of the NMOS transistor $Q_4$. The source 1112 and the backgate 1114 of the PMOS transistor $Q_6$ are connected to each other, the input 1102, the gate 1108 of the PMOS transistor $Q_5$, the drain 1110 of the PMOS transistor $Q_5$, the gate 1104 of the PMOS transistor $Q_3$, the gate 1106 of the NMOS transistor $Q_4$, and the drain 1116 of the NMOS transistor $Q_1$. The drain 1136 of the PMOS transistor $Q_6$ is connected to a gate 1138 of the NMOS transistor $Q_1$, an output 1172 of the peak detector 1180, and a terminal 1171 of the capacitor 1173. A terminal 1181 of the capacitor 1173 is connected to supply voltage $V_{ss}$.

The NMOS transistor $Q_1$ of the peak detector 1180 forms half of an NMOS current mirror that acts as a current memory which stores the peak current of the signal received at the input 1102 of the peak detector 1180. The other half of the NMOS current mirror that acts as a current memory is the NMOS transistor $Q_2$ of a threshold detector 1175 connected to the output 1172 of the peak detector 1180. The source 1144 of the NMOS transistor $Q_1$ is connected to supply voltage $V_{ss}$. The gate of the NMOS transistor $Q_1$ is connected to the output 1172 of the peak detector 1180 and the drain 1136 of the PMOS transistor $Q_6$. The backgate 1142 of the NMOS transistor $Q_1$ is connected to supply voltage $V_{ss}$. And the drain 1116 of the NMOS transistor $Q_1$ is connected to the input 1102, the source 1112 of the PMOS transistor $Q_6$, the backgate 1114 of the PMOS transistor $Q_6$, the gate 1108 and drain 1110 of the PMOS transistor $Q_5$, the gate 1104 of the PMOS transistor $Q_3$, and the gate 1106 of the NMOS transistor $Q_4$.

The first threshold detector 1175 compares the voltage envelope of a signal received at the input 1102 of the peak detector 1180 to a reference current supplied by a current source 1170. The first threshold detector 1175 includes an NMOS transistor $Q_2$, a PMOS transistor $Q_7$, a PMOS transistor $Q_8$, the current source 1170, a PMOS transistor $Q_9$, and an NMOS transistor $Q_{10}$. Any number of threshold detectors can be connected to the peak detector 1180 to derive a corresponding number of signal strength detector outputs. A signal received by the input 1174 of the first threshold detector 1175 is conveyed to the gate 1140 of the NMOS transistor $Q_2$.

The NMOS transistor $Q_2$ of the first threshold detector 1175 forms half of an NMOS current mirror that acts as a current memory which stores the peak current corresponding to the voltage signal received at the input 1102 of the peak detector 1180. The other half of the NMOS current mirror that acts as a current memory consists of the NMOS transistor $Q_1$ of the peak detector 1180 connected to the input 1174 of the first threshold detector 1175. The source 1146 of the NMOS transistor $Q_2$ is connected to supply voltage $V_{ss}$. The drain 1150 of the NMOS transistor $Q_2$ is connected to the gate 1153 of the PMOS transistor $Q_9$, the gate 1159 of the NMOS transistor $Q_{10}$, and the drain 1154 of a PMOS transistor $Q_7$. The gate 1140 of the NMOS transistor $Q_2$ is connected to the input 1174 of the first threshold detector 1175. The backgate 1148 of the NMOS transistor $Q_2$ is connected to supply voltage $V_{ss}$.

The NMOS transistor $Q_9$ and the NMOS transistor $Q_{10}$ form an inverter. The gate 1153 of the PMOS transistor $Q_9$ is connected to the gate 1159 of the NMOS transistor $Q_{10}$, the drain 1154 of the NMOS transistor $Q_7$, and the drain 1150 of the NMOS transistor $Q_2$. The source 1155 of the PMOS transistor $Q_9$ is connected to supply voltage $V_{dd}$. The drain 1157 of the PMOS transistor $Q_9$ is connected to the drain 1161 of the NMOS transistor $Q_{10}$ and the output 1152 of the first threshold detector 1175. The source 1163 of the NMOS transistor $Q_{10}$ is connected to supply voltage $V_{ss}$. The drain 1161 of the NMOS transistor $Q_{10}$ is connected to the drain 1157 of the PMOS transistor $Q_9$ and the output 1152 of the first threshold detector 1175.

The NMOS transistor $Q_7$, an NMOS transistor $Q_8$ and the current source 1170 form a current mirror that causes a current to flow through the NMOS transistor $Q_7$ that mirrors the current of the current source 1170. The gate 1158 of the NMOS transistor $Q_7$ is connected to the gate 1162 of the NMOS transistor $Q_8$, the drain 1164 of the NMOS transistor $Q_8$, and the positive terminal 1166 of the current source 1170. The source 1156 of the NMOS transistor $Q_7$ is connected to supply voltage $V_{dd}$ and the source 1160 of the NMOS transistor $Q_8$. The drain 1154 of the NMOS transistor $Q_7$ is connected to the gate 1153 of the PMOS transistor $Q_9$, the gate 1159 of the NMOS transistor $Q_{10}$, and the drain 1150 of the NMOS transistor $Q_2$. The gate 1162 and the drain 1164 of the NMOS transistor $Q_8$ are connected to each other, the gate of the NMOS transistor $Q_7$ and the positive terminal 1166 of the current source 1170. The source 1160 of the NMOS transistor $Q_8$ is connected to the source 1156 of the NMOS transistor $Q_7$ and supply voltage $V_{dd}$. The current source 1170 includes a positive terminal 1166 and a negative terminal 1168. The positive terminal 1166 of the current source 1170 is connected to the gate 1158 of the NMOS transistor $Q_7$, the gate 1162 of the NMOS transistor $Q_8$, and the drain 1164 of the NMOS transistor $Q_8$. The negative terminal 1168 of the current source 1170 is connected to ground.

The current source 1170 produces a reference current that represents the threshold voltage of the first threshold detector 1175. The current can be any value, for example 100 uA, and the transistors $Q_7$, $Q_8$ of the first threshold detector 1175 are scaled to yield the desired current through the transistor $Q_7$. The preferred form of a current source is a resistance connected between the drain of NMOS transistor $Q_8$ and ground. In the present example the reference current generated by the current source in the first threshold detector 1175 is 7.7 micro-amperes.

The output 1152 of the first threshold detector 1175 indicates which filter bank should be used given the voltage envelope of the signal received at the input 1102 of the peak detector 1180. If the current flowing through the transistor $Q_2$, which represents the voltage envelope of the signal received at the input 1102 of the peak detector 1180, exceeds the current flowing through the transistor $Q_7$, which is related to the reference current of the current source 1170, the output 1152 of the first threshold detector 1175 would be a logical one. If the current flowing through the transistor $Q_2$ does not exceed the current flowing through the transistor $Q_7$, the output 1152 of the first threshold detector 1175 would be a logical zero. In this manner, the first threshold limit of the signal strength detector 1200 is current generated by the current source 1170.

The second threshold detector 1176 (not shown in FIG. 11) may be similar to the first threshold detector 1175 as shown in FIG. 11. It would have a counterpart to NMOS transistor $Q_2$ of the first threshold detector 1175, with the gate of the counterpart transistor connected to the output 1172 of the peak detector 1180. The second threshold detector 1176 would also have its counterpart to the current mirror, which in the first threshold detector 1175 consists of NMOS transistors $Q_7$ and $Q_8$, and reference current source 1170. The counterpart to the current source 1170 of the second threshold detector 1176 would produce a reference current that represents the second threshold limit. In the present example, the counterpart to the current source 1170 would generate 77 micro-amperes.

Referring to FIG. 2, the signal processing system 200 can have more than three filter banks. If the filter system 200 includes more than three filter banks, the signal strength detector 208 must be adapted to select an appropriate filter bank from the more than three filter banks. In order to select the appropriate filter bank from a signal processing system with more than three filter banks, the signal strength detector may be modified to have a group of peak detectors, each similar to the peak detector 1180 shown in FIG. 11, to sense the voltage envelope of the output signal provided by each of the filter banks of the system 200, except for the filter bank configured to process the largest input signal range and the filter bank configured to process the smallest input signal range. For example, if the filter system 200 has five filter banks, a filter bank configured to process the largest input signals, a filter bank configured to process the smallest input signals, and a group of three filter banks configured to process intermediate input signals, the voltage envelopes of the output signals produced by the group of three intermediate signal filter banks are measured by the signal strength detector. Assuming that the filter banks are designed such that the saturation level of each filter bank, except the largest signal filter bank, overlaps the minimum tolerable signal to noise ratio of another filter bank, the signal strength detector has three threshold detectors, preferably similar to the first threshold detector 1175 shown in FIG. 11, to compare the voltage envelope of the output signal of each one of the three intermediate signal filter banks with a corresponding first threshold limit. Each first threshold limit indicates when the corresponding filter bank is approaching saturation. For example, if the signal strength detector measures the voltage envelopes of the signals of the three intermediate signal filter banks, three threshold detectors are needed to compare the detected envelopes with three different first threshold limits. The strength detector also uses an additional threshold detector, preferably similar to the first threshold detector 1175 shown in FIG. 11, to compare the voltage envelope of the output signal from the filter bank configured to process the smallest input signals with a second threshold limit. The second threshold limit indicates when the output signal of the smallest signal filter bank is approaching its saturation point. Once the voltage envelopes of the output signals the three intermediate signal filter banks and the smallest signal filter bank are compared to respective first and second threshold limits, the strength detector selects the filter bank that is configured to process the smallest input signal without saturating.

Figure 3:
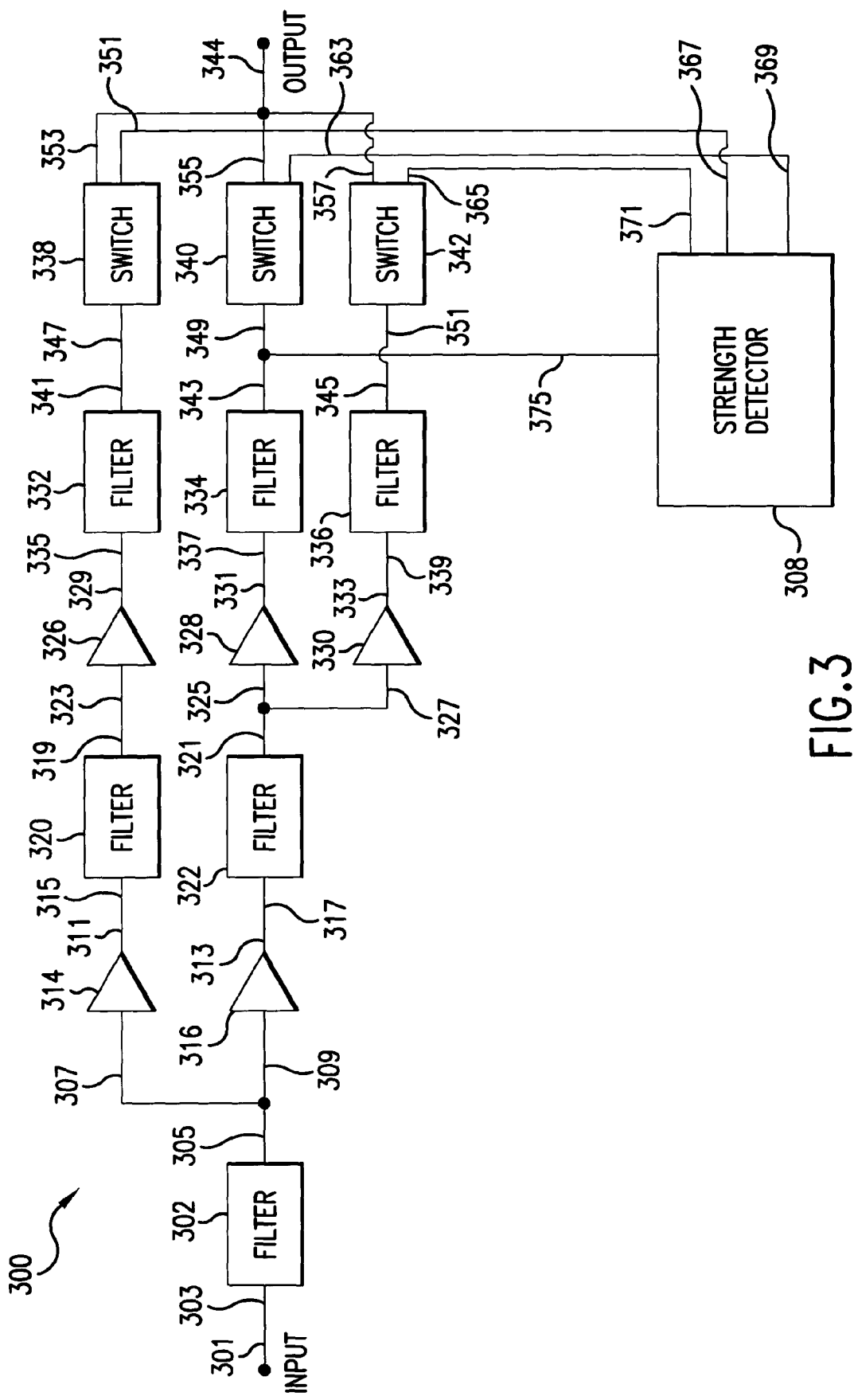
FIG. 3 is a block diagram illustrating still another signal processing system in accordance with the present invention.

In an alternate embodiment of the signal processing system 200 of FIG. 2, the respective gains of amplifiers 216, 218, 230 each have a first selected value and the respective gains of amplifiers 214, 226, 228 each have a second selected value. The filters 202, 204, 206 each have the same transfer function; and the filters 222, 224 each have the same transfer function. This allows the signal processing system 200 to have an alternate structure shown in FIG. 3.

A signal received by the input 301 of the signal processing system 300, which include an in-band component and an out-band component, is conveyed to an input 303 of a filter 302. Preferably, the filter 302 has enough linear range to accommodate the signal on the input 301 of the signal processing system 300 without saturating. The filter 302 processes the signal received at its input 303 and produces a processed signal at its output 305. The output 305 of the filter 302 corresponds to input 307 of an amplifier 314 and an input 309 of an amplifier 316. The amplifier 314 amplifies or attenuates the signal received at its input 307 and provides an amplified signal at its output 311. The output 311 of the amplifier 314 corresponds to input 315 of a filter 320. The filter 320 processes the signal received at its input 315 and produces a processed signal at its output 319. The output 319 of the filter 320 corresponds to input 323 of an amplifier 326. The amplifier 326 amplifies or attenuates the signal received at its input 323 and outputs an amplified signal at its output 329. The output 329 of the amplifier 326 corresponds to input 335 of a filter 332. The filter 332 processes the signal received at its input 335 and produces a processed signal at its output 341. The output 341 of the filter 332 corresponds to input 347 of a switch 338. The switch 338 outputs the signal received at its input 347 on its output 353 when the signal received at its switch control input 361 is a logical one, and isolates its input 347 from its output 353 when the signal received at its switch control input 361 is a logical zero. The output 353 of the switch 338 is connected to the output 344 of the signal processing system 300.

The amplifier 316 amplifies or attenuates the signal received at its input 309 and outputs an amplified signal at its output 313. The output 313 of the amplifier 316 corresponds to input 317 of a filter 322. The filter 322 processes the signal received at its input 317 and produces a processed signal at its output 321. The output 321 of the filter 322 corresponds to input 325 of an amplifier 328 and an input 327 of an amplifier 330. The amplifier 328 amplifies or attenuates the signal received at its input 325 and provides an amplified signal at its output 331. The output 331 of the amplifier 328 corresponds to input 337 of a filter 334. The filter 334 processes the signal received at its input 337 and produces a processed signal at its output 343. The output 343 of the filter 334 corresponds to input 349 of a switch 340 and an input 375 of the signal strength detector 308. The switch 340 outputs the signal received at its input 349 on its output 355 when the signal received at its switch control input 363 is a logical one, and does not output the signal received at its input 349 on its output 355 when the signal received at its switch control input 363 is a logical zero. The output 355 of the switch 340 is connected to the output 344 of the signal processing system 300.

The amplifier 330 amplifies or attenuates the signal received at its input 327 and outputs an amplified signal at its output 333. The output 333 of the amplifier 330 corresponds to input 339 of a filter 336. The filter 336 processes the signal received at its input 339 and produces a processed signal at its output 345. The output 345 of the filter 336 corresponds to input 351 of a switch 342. The switch 342 outputs the signal received at its input 351 on its output 357 when the signal received at its switch control input 365 is a logical one, and does not output the signal received at its input 351 on its output 357 when the signal received at its switch control input 365 is a logical zero. The output 357 of the switch 342 is connected to the output 344 of the signal processing system 300.

Preferably, the signal processing system 300 is optimized such that the signal processing pathways that terminate at outputs 341, 343, 345 of the filters 332, 334, 336, respectively, are each adapted for a different in-band component/out-band component ratio. The signal processing pathways that terminate at the output 341 of the filter 332 is adapted for processing an input signal that has a large out-band component and a relatively small in-band component. This signal processing path is so adapted by having the respective gains of amplifiers 314, 326 to be greater than one. Preferably, the amplifiers 314, 326 have respective gains of ten so that each amplifier provides a signal with ten times the amplitude of the signal at its input. The signal processing path that terminates at the output 343 of the filter 334 is adapted for processing an input signal that has an out-band component which is slightly larger than the in-band component. This signal processing path is so adapted by having the gains of the amplifier 316 equal to one, and having the gain of amplifier 328 greater than one. Preferably, the amplifier 328 has a gain of ten, causing the amplifier 328 to provide a signal at its output 331 with ten times the amplitude of the signal received at its input 325. The signal processing path that terminates at the output 345 of the filter 336 is adapted to process an input signal that has an out-band component that is approximately equal to the in-band component. This signal processing path is so adapted by having the respective gains of amplifiers 316, 330 each equal to one. Preferably, the amplifiers 314, 316, 326, 328 and 330 are clamped such that they will not provide any of the filters 320, 322, 332, 334 and 336 with an input signal that will saturate the filter.

The signal strength detector 308 analyzes the voltage envelope of the signal received on its input 375 to determine if the voltage envelope of the signal received on the input 375 exceeds or is below respective limits whereby the filter 334 is entering saturation or the signal received at the input 375 is approaching the minimum tolerable signal to noise ratio of the filter 334. For the filter system 300, there can be two limits. A first limit represents the point where the filter 332 is near saturation and the filter 334 is near the minimum tolerable signal to noise ratio. A second limit represents the point where the filter 334 is near saturation and the filter 336 is near the minimum tolerable signal to noise ratio.

If the signal strength detector 308 detects that the voltage envelope of the signal received at its input 375 does not exceed the first limit or the second limit, the signal strength detector 308 selects the signal that was processed by the filter 332 by providing a logical one on its output 367 to close the switch 338 and a logical zero on its outputs 369, 371 to open the switches 340, 342, respectively. In this manner, the signal from the output 341 of the filter 332 is provided to the output 344 of the signal processing system 300, and the outputs 343, 345 of the filters 334, 336, respectively, are disconnected from the output 344 of the signal processing system 300. If the signal strength detector 308 detects that the voltage envelope of the signal received at the input 375 of the signal strength detector 308 falls below the second limit, but exceeds the first limit, the signal strength detector 308 selects the signal that was processed by the filter 334 by providing a logical one on its output 369 to close the switch 340 and a logical zero on its outputs 367, 371 to open the switches 338, 342, respectively, thereby connecting the signal from the output 343 of the filter 334 to the output 344 of the signal processing system 300 and disconnecting the outputs 341, 345 of the filters 332, 336 from the output 344 of the signal processing system 300. If the signal strength detector 308 detects that the voltage envelope of the signal received at the input 375 of the signal strength detector 308 exceeds the first limit and the second limit, the signal strength detector 308 selects the signal that was processed by the filter 336 by providing a logical one on its output 371 to close the switch 342 and a logical zero on its outputs 367, 369 to open the switches 338, 340, respectively, thereby connecting the signal from the output 345 of the filter 336 to the output 344 of the signal processing system 300 and disconnecting the outputs 341, 343 of the filters 332, 334 from the output 344 of the signal processing system 300.

In an exemplary embodiment, the signal strength detector 1200 of FIG. 12(a) may be used as the signal strength detector 308. Referring the FIG. 12(a), the input 1202 of the signal strength detector 1200 may serve as input 375 of the signal strength detector 308 in FIG. 3, and the outputs 1240, 1242, 1244 of the signal strength detector 1200 may serve as outputs 367, 369 and 371 of the signal strength detector 308 of FIG. 3, respectively. In addition, the threshold detector 1175 may be adjusted to reflect the first limit, while the threshold detector 1176 may be adjusted to reflect the second limit.

Figure 4:
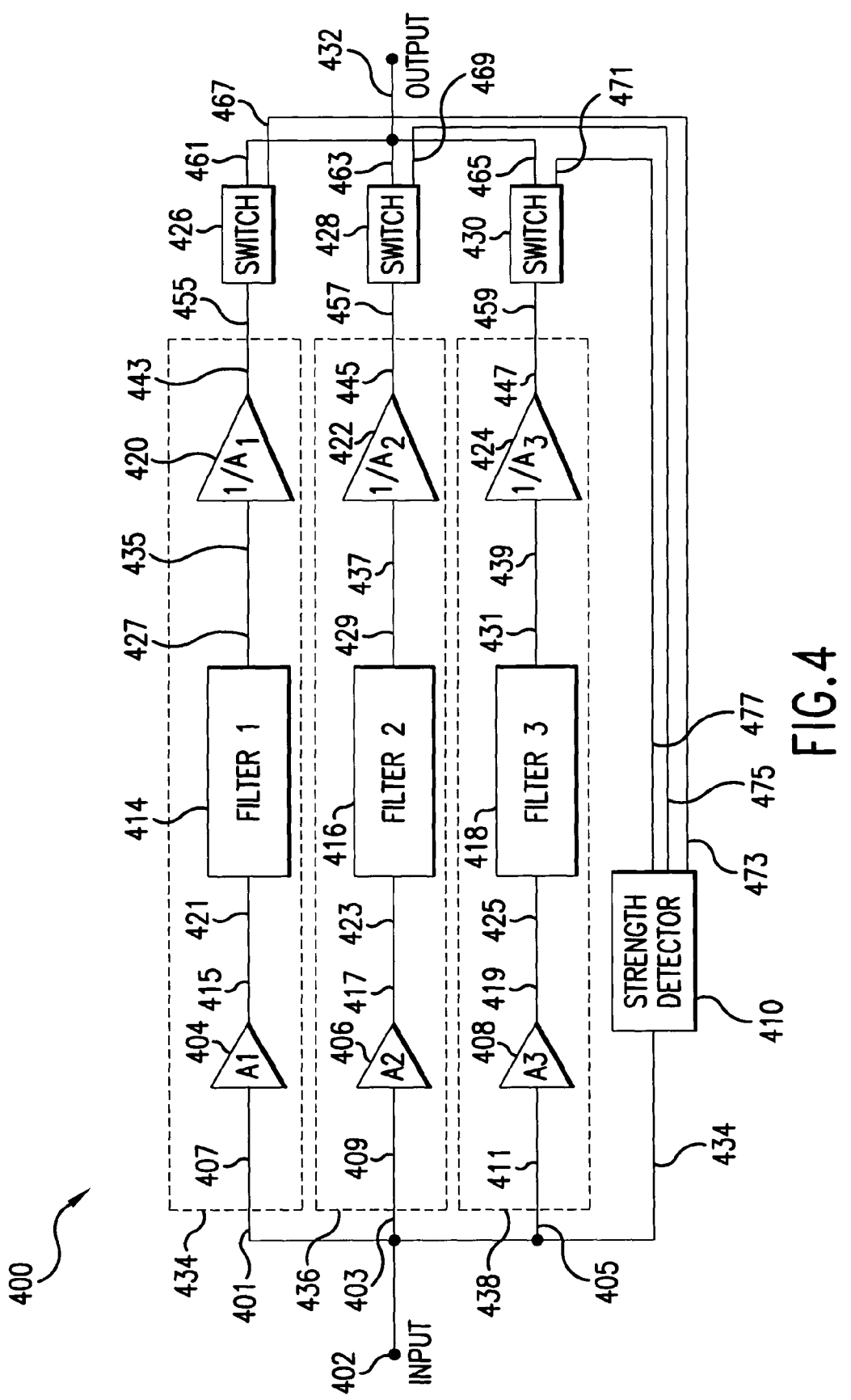
FIG. 4 is a block diagram illustrating yet another signal processing system in accordance with the present invention.

FIG. 4 illustrates another exemplary signal processing system 400 according to the present invention. The signal processing system 400 includes multiple companding signal processors 434, 436, 438 with different fixed input and output gains configured in parallel with each other. A signal received by an input 402 of the signal processing system 400 is conveyed to an input 401 of the companding signal processor 434, an input 403 of the companding signal processor 436, an input 405 of the companding signal processor 438, and an input 452 of a signal strength detector 410.

The signal received by the input 401 of the companding signal processor 434 corresponds to input 407 of an amplifier 404. The amplifier 404 amplifies or attenuates the signal received at its input 407 and produces an output signal at its output 415. The gain of the amplifier 404 is fixed at a first amplification level. The output 415 of the amplifier 404 corresponds to input 421 of the filter 414. The filter 414 processes the signal received at its input 421 and outputs a processed signal at its output 427. The output 427 of the filter 414 corresponds to input 435 of the amplifier 420. The amplifier 420 amplifies or attenuates the signal received at its input 435 and produces an output signal at its output 443. The gain of the amplifier 420 is fixed at an inverse of the first amplification level. The output 443 of the amplifier 420 is connected to the input 455 of a switch 426. The switch 426 outputs the signal received at its input 455 on its output 461 when a signal received at its switch control input 467 is a logical one, and does not output the signal received at its input 455 on its output 461 when the signal received at its switch control input 467 is a logical zero. The output 461 of the switch 426 is connected to the output 432 of the signal processing system 400.

The signal received by the input 403 of the companding signal processor 436 corresponds to input 409 of an amplifier 406. The amplifier 406 amplifies or attenuates the signal received at its input 409 and produces an output signal at its output 417. The gain of the amplifier 406 is fixed at a second amplification level. The output 417 of the amplifier 406 corresponds to input 423 of a filter 416. The filter 416 processes the signal received at its input 423 and provides a processed signal at its output 429. The output 429 of the filter 416 is connected to the input 437 of an amplifier 422. The amplifier 422 amplifies or attenuates the signal received at its input 437 and produces an output signal at its output

445. The gain of the amplifier 422 is fixed at an inverse of the second amplification level. The output 445 of the amplifier 422 corresponds to input 457 of the switch 428. The switch 428 outputs the signal received at its input 457 on its output 463 when the signal received at its switch control input 469 is a logical one, and does not output the signal received at its input 457 on its output 463 when the signal received at its switch control input 469 is a logical zero. The output 463 of the switch 428 is connected to the output 432 of the signal processing system 400.

The signal received by the input 405 of the companding signal processor 438 corresponds to input 411 of an amplifier 408. The amplifier 408 amplifies or attenuates the signal received at its input 411 and produces an output signal at its output 419. The gain of the amplifier 408 is fixed at a third amplification level. The output 419 of the amplifier 408 corresponds to input 425 of the filter 418. The filter 418 processes the signal received at its input 425 and outputs a processed signal at its output 431. The output 431 of the filter 418 corresponds to input 439 of the amplifier 424. The amplifier 424 amplifies or attenuates the signal received at its input 439 and produces an output signal at its output 447. The gain of the amplifier 424 is fixed at an inverse of the third amplification level. The output 447 of the amplifier 424 is connected to the input 459 of a switch 430. The switch 430 outputs the signal received at its input 459 on its output 465 when a signal received at its switch control input 471 is a logical one, and does not output the signal received at its input 459 on its output 465 when the signal received at its switch control input 471 is a logical zero. The output 465 of the switch 430 is connected to the output 432 of the signal processing system 400.

The first companding signal processor 434 is configured to process signals with a larger signal voltage envelope than the second companding signal processor 436 and the third companding signal processor 438. Moreover, the corresponding signal processors are advantageously designed such that the saturation level of each companding signal processor except for the one designed to process the largest signals, overlaps the minimum tolerable signal to noise ratio of another one of the companding signal processors. The second companding signal processor 436 is configured to process signals with a smaller signal voltage envelope than the first companding signal processor 434 and a larger signal voltage envelope than the third companding signal processor 438. The third companding signal processor 438 is configured to process signals with a smaller signal voltage envelope than the first companding signal processor 434 and the second companding signal processor 436. Preferably, the first companding signal processor 434, the second companding signal processor 436, and the third companding signal processor 438 are each adapted to effectively process a signal over a different signal amplitude range. In one exemplary embodiment, the transfer functions of the filter 414, 416, 418 are the same, and the first amplification level, the second amplification level and the third amplification level are different. Preferably, the first amplification level is greater than the second amplification level which is greater than the third amplification level.

The signal strength detector 410 selects the one of the companding signal processors 434, 436, 438 that has the most suitable saturation level and minimum tolerable signal to noise ratio for processing the signal received by the input 402 of the signal processing system 400, which is connected to the input 452 of the signal strength detector 410. Only one of the companding filters 434, 436, 438 is selected by the signal strength detector 410 at any one time. The signal strength detector 410 analyzes the signal received at the input 402 to determine if the voltage envelope of the signal received at the input 402 exceeds a first limit whereby the signal received at the input 402 is approaching the minimum tolerable signal to noise ratio of the companding signal processor 436 and a second limit whereby the companding signal processor 436 is entering saturation. The first limit representing the point where the signal received at the input 402 is near the minimum tolerable signal to noise ratio of the companding filter 436 and the companding filter 434 is near saturation, and the second limit representing the point where the companding filter 436 is near saturation and the signal received at the input 402 is near its minimum tolerable signal to noise ratio. A low-pass-filtered rectifier, well-known for use in many other applications, is one example of a circuit which can be used as an envelope detector.

The signal strength detector 410 selects the first companding signal processor 434 if the voltage envelope of the signal received by the input 402 does not exceed the first limit or the second limit. The signal strength detector 410 selects the first companding signal processor 434 by providing a logical one on an output 473 of the signal strength detector 410, and a logical zero on outputs 475, 477 of the signal strength detector 410. The signal strength detector 410 selects the second companding signal processor 436 if the voltage envelope of the signal received by the input 402 is above the first limit but below the second limit. The signal strength detector 410 selects the second companding signal processor 436 by providing a logical one on an output 475 of the signal strength detector 410, and a logical zero on the outputs 473, 477 of the signal strength detector 410. The signal strength detector 410 selects the third companding signal processor 438 if the voltage envelope of the signal received by the input 402 is above the first limit and the second limit. The signal strength detector 410 selects the third companding signal processor 438 by providing a logical one on an output 477 of the signal strength detector 410, and a logical zero on the outputs 473, 475 of the signal strength detector 410. The outputs 473, 475, 477 of the signal strength detector 410 are connected to the switch control inputs 467, 469, 471, respectively, of the switches 426, 428, 430.

In an alternate exemplary embodiment, the amplifiers 404, 406, 408 are clamped such that they will not provide any of the filters 414, 416, 418 with an input signal that will saturate the filter.

Figure 10:
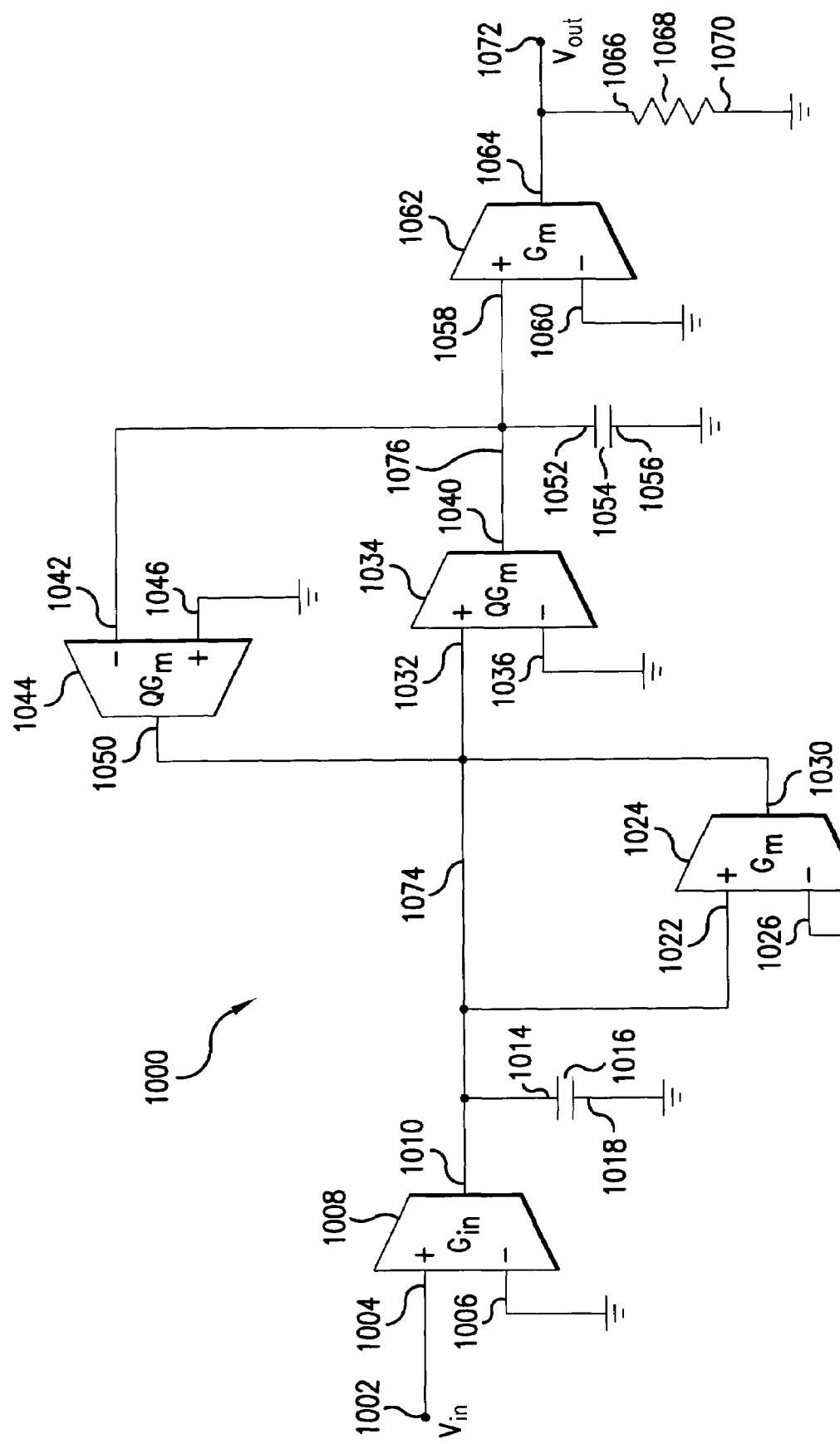
FIG. 10 is a circuit diagram illustrating an additional biquad in accordance with the present invention.

In an exemplary embodiment, the companding signal processor 434 of the filter 400 of FIG. 4 may be implemented as a biquad 1000, shown in FIG. 10, with a bandwidth of 100 kHz. The biquad 1000 can have a center frequency of 2 MHz and a quality factor of 20. The biquad 1000 can be optimized for relatively small input signals by having a relatively large effective amplification at the input of the biquad and a commensurately large effective attenuation at the output of the biquad 1000. The biquad 1000 processes the signal received at the input 401 and provides a signal at the output 455. Referring to FIG. 10, the biquad 1000 may advantageously have a transconductance $G_{in}$ for a transconductor 1008 of 500 micro-amperes per volt, a transconductance $G_m$ for a transconductors 1024 and 1062 of 50 micro-amperes per volt, a transconductance $QG_m$ for transconductors 1034 and 1044 of 1000 micro-amperes per volt, a capacitance for capacitors 1016, 1054 of 80 picofarads, and a resistance for a resistor 1068 of 2 KΩ or $1/G_{in}$.

In the exemplary embodiment, the companding signal processor 436 of the filter 400 of FIG. 4 may be implemented as a biquad 1000, shown in FIG. 10, advantageously having a bandwidth of 100 kHz. The biquad 1000 can advantageously have a center frequency of 2 MHz and a quality factor of 20. The biquad 1000 can advantageously be optimized for average input signals by having little or no effective amplification at the input of the biquad and a commensurate effective attenuation at the output of the biquad 1000. The biquad 1000 processes the signal received at the input 403 and provides a signal at the output 457. Referring to FIG. 10, the biquad 1000 may advantageously have a transconductance $G_{in}$ for the first transconductor 1008 of 50 micro-amperes per volt, a transconductance $G_m$ for the transconductors 1024 and 1062 of 50 micro-amperes per volt, a transconductance $QG_m$ for the transconductors 1034 and 1044 of 1000 micro-amperes per volt, a capacitance for the capacitors 1016, 1054 of 80 picofarads, and a resistance for the resistor 1068 of 20 KΩ or $1/G_{in}$.

In the exemplary embodiment, the companding signal processor 438 of the filter 400 of FIG. 4 can be implemented as a biquad 1000, shown in FIG. 10, advantageously having a bandwidth of 100 kHz. The biquad 1000 can advantageously have a center frequency of 2 MHz and a quality factor of 20. The biquad 1000 can advantageously be optimized for relatively large input signals by having relatively large attenuation at the input of the biquad and a commensurate effective amplification at the output of the biquad 1000. The biquad 1000 processes the signal received at the input 405 and provides a signal at the output 459. Referring to FIG. 10, the biquad 1000 advantageously has a transconductance $G_{in}$ for the first transconductor 1008 of 5 micro-amperes per volt, a transconductance $G_m$ for the transconductors 1024 and 1062 of 50 micro-amperes per volt, a transconductance $QG_m$ for the transconductors 1034 and 1044 of 1000 micro-amperes per volt, a capacitance for the capacitors 1016, 1054 of 80 picofarads, and a resistance for the resistor 1068 of 200 KΩ or $1/G_{in}$.

FIG. 10 illustrates an exemplary biquad 1000 suitable for implementing the companding filter 434, 436 and 438 of the signal processor 400 of FIG. 4. The biquad 1000 includes a first transconductor 1008, a second transconductor 1024, a third transconductor 1034, a fourth transconductor 1044, a fifth transconductor 1062, a first capacitor 1016, a second capacitor 1054, and a resistor 1068. The center frequency of the biquad 1000 can be calculated by equation (1). The absolute value of the transconductors and capacitors can be scaled by the same factor, i.e. impedance scaling, without affecting the transfer function of the biquad 1000, since the transfer function depends on the ratios between these values. Impedance scaling does not change the transfer function of the biquad 1000, however it does change the power dissipation and the noise level of the biquad 1000.

A signal received by the input 1002 of the biquad 1000 is conveyed to a positive input 1004 of the first transconductor 1008 of the biquad 1000. The first transconductor 1008 processes the difference between the signal received at its positive input 1004 and a signal received at its negative input 1006, which is connected to ground, and provides a signal at an output 1010. The signal at the output 1010 is equal to the difference in the signal received by the positive input 1004 and the signal received by the negative input 1006, scaled by a transconductance $G_{in}$ of the first transconductor 1008. The first transconductance $G_{in}$ of the first transconductor 1008 sets the gain of the biquad, for example, if $G_{in}$ is ten times $G_m$ the effective input amplification for the biquad 1000 is ten. The output 1010 of the first transconductor 1008 is connected to one terminal 1014 of the first capacitor 1016, a negative input 1022 of the second transconductor 1024, an output 1030 of the second transconductor 1024, a positive input 1032 of the third transconductor 1034, and an output 1050 of the fourth transconductor 1044. These connections form a first node 1074. The other terminal of the first capacitor 1016 is connected to ground. The first capacitor 1016 integrates the signals provided at the first node 1074.

The second transconductor 1024 processes the difference between the signal received at its positive input 1026, which is connected to ground, and the signal received at its negative input 1022 and provides a signal at its output 1030. The signal at the output 1030 is equal to the difference in the signal received by the positive input 1026 and the signal received at the negative input 1022, scaled by a transconductance $G_m$ of the second transconductor 1024. The output 1030 of the second transconductor 1024 is connected to one terminal 1014 of the first capacitor 1016, the negative input 1022 of the second transconductor 1024, the output 1030 of the second transconductor 1024, the positive input 1032 of the third transconductor 1034, and the output 1050 of the fourth transconductor 1044. The second transconductor 1024 forms a feedback loop with the first node 1074.

The third transconductor 1034 processes the difference between the signal received at the positive input 1032 and the signal received at its negative input 1036, which is connected to ground, and provides a signal at an output 1040. The signal at the output 1040 is equal to the difference in the signal received by its positive input 1032 and the signal received by its negative input 1036, scaled by a transconductance $QG_m$ of the third transconductor 1034. The output 1040 of the third transconductor 1034 is connected to one terminal 1052 of the second capacitor 1054, a negative input 1042 of the fourth transconductor 1044, and a positive input 1058 of the fifth transconductor 1062. These connections form a second node 1076. The other terminal 1056 of the second capacitor 1054 is connected to ground.

The fourth transconductor 1044 processes the difference between the signal received at its positive input 1046, which is connected to ground, and the signal received at its negative input 1042 and provides a signal at the output 1050. The signal at its output 1050 is equal to the difference in the signal received by the positive input 1046 and the signal received by the negative input 1042, scaled by a transconductance $QG_m$ of the fourth transconductor 1044. The output 1050 of the fourth transconductor 1044 is connected to one terminal 1014 of the first capacitor 1016, the negative input 1022 of the second transconductor 1024, the output 1030 of the second transconductor 1024, and the positive input 1032 of the third transconductor 1034. The third and fourth transconductors 1034, 1044 and the second capacitor 1054 form a feedback loop with the second node 1076.

The fifth transconductor 1062 processes the difference between the signal received at its positive input 1058, and the signal received at its negative input 1060, which is connected to ground, and provides a signal at an output 1064. The signal at the output 1064 is equal to the difference in the signal received by the positive input 1058 and the signal received by the negative input 1060 of the fifth transconductor 1062, scaled by a transconductance $QG_m$ of the fifth transconductor 1062. The output 1064 of the fifth transconductor 1062 is connected to one terminal 1066 of the resistor 1068 and the output 1072 of the biquad 1000. An other terminal 1070 of the resistor 1068 is connected to ground. The resistor 1068, together with the transconductor 1062, creates an amplifier at the output of the biquad 1000 resulting in an effective output amplification or attenuation.

In another exemplary embodiment, a first diode and a second diode are connected to the first node 1074. The cathode of the first diode is connected to the first node 1074, and an anode of the first diode is connected to ground. The anode of the second diode is connected to the first node 1074, and a cathode of the second diode is connected to ground. This arrangement limits the voltage swing at the first node 1074 to approximately ±0.7 volts.

In further exemplary embodiment, a first diode and a second diode are connected to the second node 1076. The cathode of the first diode is connected to the second node 1076, and an anode of the first diode is connected to ground. The anode of the second diode is connected to the second node 1076, and a cathode of the second diode is connected to ground. This arrangement limits the voltage swing at the second node 1076 to approximately ±0.7 volts.

In another embodiment, a first diode and a second diode are connected to the input 1004. The cathode of the first diode is connected to the input 1004, and an anode of the first diode is connected to ground. The anode of the second diode is connected to the input 1004, and a cathode of the second diode is connected to ground. This arrangement limits the voltage swing at the input 1004 to approximately ±0.7 volts.

In an exemplary embodiment of the signal processing system 400 of FIG. 4, the signal strength detector 410 can be implemented by using the signal strength detector 1200 shown in FIG. 12. Referring to FIG. 12(*a*), the input 1202 of the signal strength detector 1200 may serve as the input 434 of the signal strength detector 410 and the outputs 1240, 1242, 1244 of the signal strength detector 1200 mat serve as the outputs 477, 475, 473 of the signal strength detector 410, respectively. Also, the first threshold detector 1175 may be adjusted to reflect the first limit, and the second threshold detector 1176 may be adjusted to reflect the second limit. The reference current of the current source 1170 of the first threshold detector 1175 can be 11 micro-amperes, and the reference current of the current source 1170 of the second threshold detector 1176 can be 110 micro-amperes.

Figure 5A:
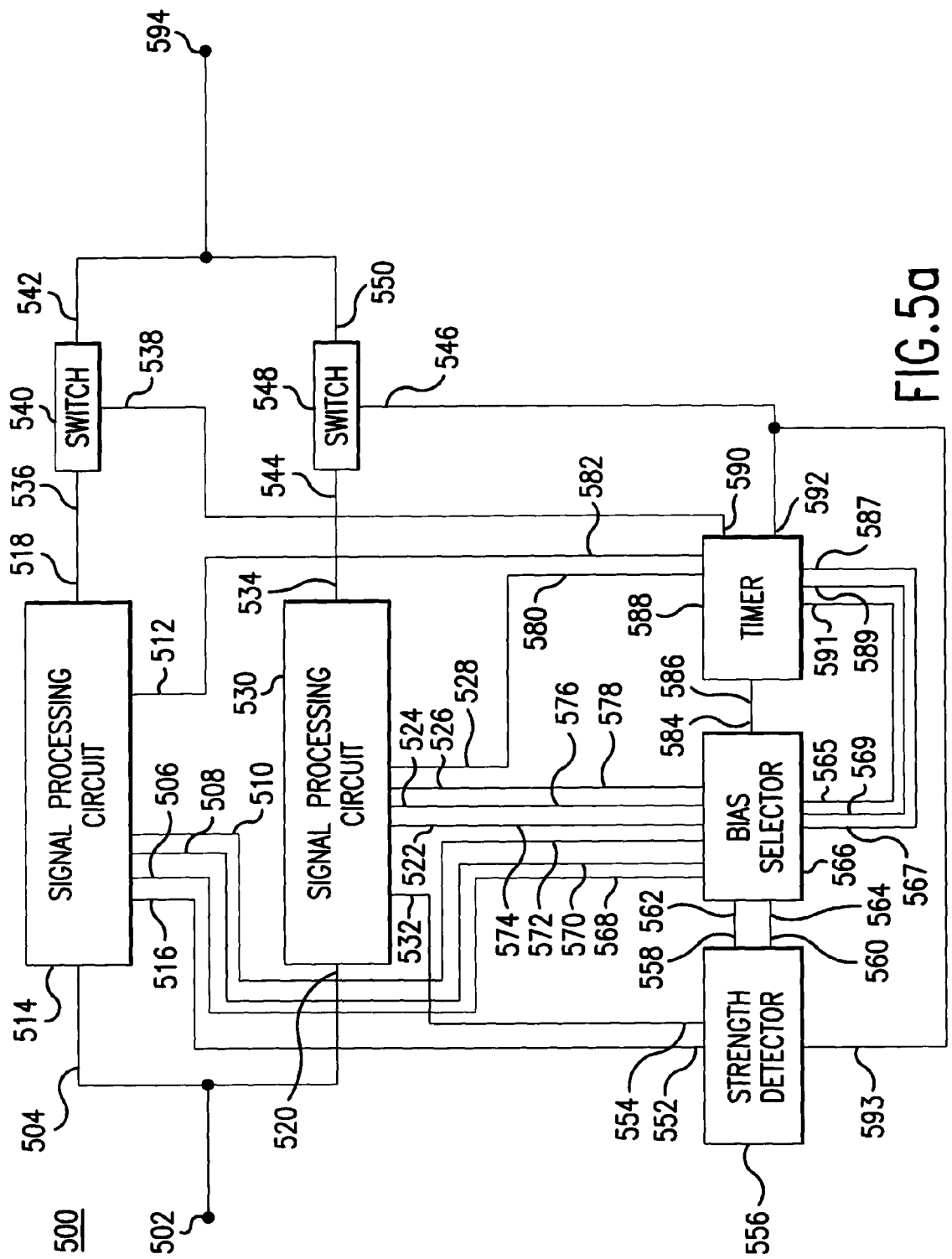
FIG. 5(a) is a block diagram illustrating a still further signal processing system in accordance with the present invention.

FIG. 5(*a*) illustrates a signal processing system 500 according to another exemplary embodiment of the present invention. The characteristics of the signal processing system 500 can be changed dynamically. The signal processing system 500 includes an input 502, a first signal processing circuit 514, a second signal processing circuit 530, a signal strength detector 556, a bias selector 566, a timer 588, a first switch 540, a second switch 548 and an output 594.

A signal received by the input 502 of the signal processing system 500 is conveyed to an input 504 of the first signal processing circuit 514, and an input 520 of the second signal processing circuit 530. The first signal processing circuit 514 includes the input 504, an input 506, an input 508, an input 510, a power input 512, an output 516 and an output 518. The first signal processing circuit 514 processes the signal received at its input 504 based on respective signals received at the inputs 506, 508, 510, 512, and outputs processed signals at its outputs 516, 518. The signal processing circuit 514 can be turned on and off by a signal applied to its power input 512. If a logical high signal is received at the power input 512, the first signal processing circuit 514 is turned on. Conversely, if a logical zero signal is received at the power input 512, the first signal processing circuit 514 is turned off. The output 516 of the first signal processing circuit 514 corresponds to input 552 of the signal strength detector 556. The output 518 of the first signal processing circuit 514 corresponds to input 536 of the first switch 540. The first switch 540 outputs the signal received at its input 536 on its output 542 when the signal received at its switch control input 538 is a logical one, and isolates its input 536 from its output 542 when the signal received at its switch control input 538 is a logical zero. The output 542 of the first switch 540 is connected to the output 594 of the signal processing system 500.

The second signal processing circuit 530 includes the input 520, an input 522, an input 524, an input 526, a power input 528, an output 532 and an output 534. The second signal processing circuit 530 processes the signal received at its input 520 based on respective signals received at the inputs 522, 524, 526, 528, and outputs processed signals at its outputs 532, 534. The second signal processing circuit 530 can be turned on and off by a signal applied to the input 528. If a logical high signal is received at the power input 528, the second signal processing circuit 530 is turned on. Conversely, if a logical zero signal is received at the power input 528, the second signal processing circuit 530 is turned off. The output 532 of the second signal processing circuit 530 corresponds to input 554 of the signal strength detector 556. The output 534 of the second signal processing circuit 530 corresponds to input 544 of the second switch 548. The second switch 548 outputs the signal received at its input 544 on its output 550 when the signal received at its switch control input 546 is a logical one, and isolates its input 544 from its output 550 when the signal received at its switch control input 546 is a logical zero. The output 550 of the second switch 548 is connected to the output 594 of the signal processing system 500.

The signal strength detector 556 selects the most suitable bias for the inactive signal processing circuit 514 or 530 (i.e., the one of the first and second signal processing circuits 514, 530 that does not have its output 518, 534 connected to the system output 594) for processing the signal received from an internal node of the active signal processing circuit (i.e., the one of the first and second signal processing circuits 514, 530 having its output 518, 534 connected to the system output 594) of the signal processing circuits 514, 530 at the inputs 552, 554 of the signal strength detector 556 based on the voltage envelope of the signal received from the active signal processing circuit 514 or 530. The amplitude or envelope signal can be derived using an envelope detector. A low-pass-filtered rectifier, well-known for use in many other applications, is one example of a circuit which can be used as an envelope detector. The first and second signal processing circuits 514 and 530 can be biased so that the signal processing circuits 514, 530 have a high effective range, (i.e., the filter works in a satisfactory way for a range of large signals between saturation and the noise floor of the filter) with a third bias, a medium effective range (i.e., the filter works in a satisfactory way for a range of medium signals between saturation and the noise floor of the filter), with a second bias, and a low effective range (i.e., the filter works in a satisfactory way for a range of small signals between saturation and the noise floor of the filter), with a first bias. The signal strength detector 556 selects the appropriate bias based upon a first limit and a second limit. The second limit indicates the onset of saturation of the active signal processing circuit. The first limit indicates that the signal from the internal node of the active signal processing circuit 514 or 530 is approaching the minimum tolerable signal to noise ratio of the active signal processing circuit 514 or 530. The outputs 558, 560 the signal strength detector 556 indicate the appropriate bias as determined by the strength detector 556. The signal strength detector 556 drives the output 558 to a logical zero and the output 560 to a logical zero if the voltage envelope of the signal received from the active signal processing circuit 514 or 530 does not exceed the first limit or the second limit. The signal strength detector 556 drives the output 558 to a logical zero and the output 560 to a logical one if the voltage envelope of the signal received from the active signal processing circuit 514 or 530 exceeds the first limit but does not exceed the second limit. And, the strength detector 556 drives the output 558 to a logical one and the output 560 to a logical one if the voltage envelope of the signal received from the active signal processing circuit 514 or 530 exceeds the first limit and the second limit. The outputs 558, 560 of the signal strength detector 556 are connected to inputs 562, 564 of a bias selector 566.

The bias selector 566 provides signals that indicate the bias setting for each of the first and second signal processing circuits 514, 530. The bias selector includes the input 562, the input 564, an input 565, an input 567, an input 569, an output 568, an output 570, an output 572, an output 574, an output 576, an output 578, and an output 584. The outputs 568, 670, 572 of the bias selector 566 are connected to the inputs 506, 508, 510, respectively, of the first signal processing circuit 514. The outputs 574, 576, 578 of the bias selector 566 are connected to the inputs 522, 524, 526, respectively, of the second signal processing circuit 530, and the output 584 of the bias selector 566 corresponds to input 586 of a timer 588. The outputs 568, 570, 572 of the bias selector 566 indicate the bias setting for the first signal processing circuit 514, and the outputs 574, 576, 578 of the bias selector 566 indicate the bias setting for the second signal processing circuit 530. The input 565 indicates when the timer 588 has completed the transition from one of the first and second signal processing circuits 514, 530 to the other of the first and second signal processing circuits 514, 530. The inputs 567, 569 indicate the current state of the timer 588.

The bias selector 566 transmits the bias setting for the active signal processing circuit 514 or 530 to the active signal processing circuit 514 or 530. If the strength detector 556 indicates that the appropriate bias setting is different than the bias setting of the active signal processing circuit 514 or 530, the bias selector 566 transmits the appropriate bias setting to the inactive signal processing circuit (i.e., the one of the first and second signal processing circuits 514, 430 not having its output 518, 534 connected to the system output 594). The timer 588 eventually changes the inactive signal processing circuit into the active signal processing circuit, and the active signal processing circuit into the inactive signal processing circuit. Once the timer 588 completes this transition, the bias selector 566 discontinues providing the inactive signal processing circuit with a bias setting.

The timer 588 provides signals that selectively connect and disconnect the first and second signal processing circuits 514, 530 to and from the system output 594 of the signal processing system 500, and selectively turn the first and second signal processing circuits 514, 530 on and off. The timer 588 includes the input 586, an output 580, an output 582, an output 590, an output 592, an output 587, an output 589 and an output 591. The outputs 580, 582 of the timer 588 are connected to the inputs 528, 512, of the first and second signal processing circuits 530, 514, respectively. The outputs 590, 592 of the timer 588 are connected to the switch control inputs 538, 546, of the first and second switches 540, 548, respectively. The timer 588 provides signals that cause only one of the outputs 518, 534 of one of the first and second signal processing circuits 514, 530, to be connected to the system output 594 of the signal processing system 500 at any one time.

The timer 588 provides signals to the first and second switches 540, 548 and the first and second signal processing circuits 514, 530 that allow the system output 594 to switch between output 518, 534 of the first signal processing circuit 514 and the second signal processing circuit 530 without causing transients to appear at the system output 594 of the signal processing system 500. To switch from the output of one signal processing circuit to the output of the other signal processing circuit, the timer 558 provides a signal at the output 580, 582 to turn on the first or second signal processing circuit 530, 514 selected by the bias selector 566. If the bias selector 566 selected the first signal processing circuit 514, and the second signal processing circuit 530 is connected to the system output 594, the timer 588 turns on the first signal processing circuit 514 by providing first a logical one on its output 582. If the bias selector 566 selected the signal processing circuit 530, and the signal processing circuit 514 is connected to the system output 594, the timer 588 turns on the second signal processing circuit 530 by providing a logical one on the output 580.

After the first or second signal processing circuit 514, 530 selected by the signal strength detector 588 is turned on, the timer 588 waits a length of time sufficient for transients at the outputs 518, 534 of the first and second signal processing circuits 514, 530, to die out. After the length of time elapses, the timer 588 connects the output 518, 534 of the first or second signal processing circuit 514, 530, indicated by the bias selector 566, to the system output 594 of the signal processing system 500. If the bias selector 566 selected the first signal processing circuit 514, the timer 588 closes the first switch 540 by providing a logical one on the output 590, and opens the second switch 548 by providing a logical zero on the output 592. If the bias selector 566 selected the second signal processing circuit 530, the timer 588 closes the second switch 548 by providing a logical one on its output 592, and opens the first switch 540 by providing a logical zero on its output 590.

In an alternate exemplary embodiment, more than two signal processor circuits are provided for selective connection between the system input 502 and the system output 594 of the signal processing system 500 with appropriate modifications to the signal strength detector 556, the bias selector 566, and the timer 588.

In another alternate exemplary embodiment, the first and second signal processing circuits 514, 530 are not turned off, but are placed in a standby mode whereby they consume less power than when they are fully on. Placing the first and second signal processing circuits 514, 530 in a standby mode reduces the length of time the timer 588 has to wait before the transients at the outputs 518, 534, of the first and second signal processing circuits 514, 530 die out, therefore speeding up switching time.

Figure 15:
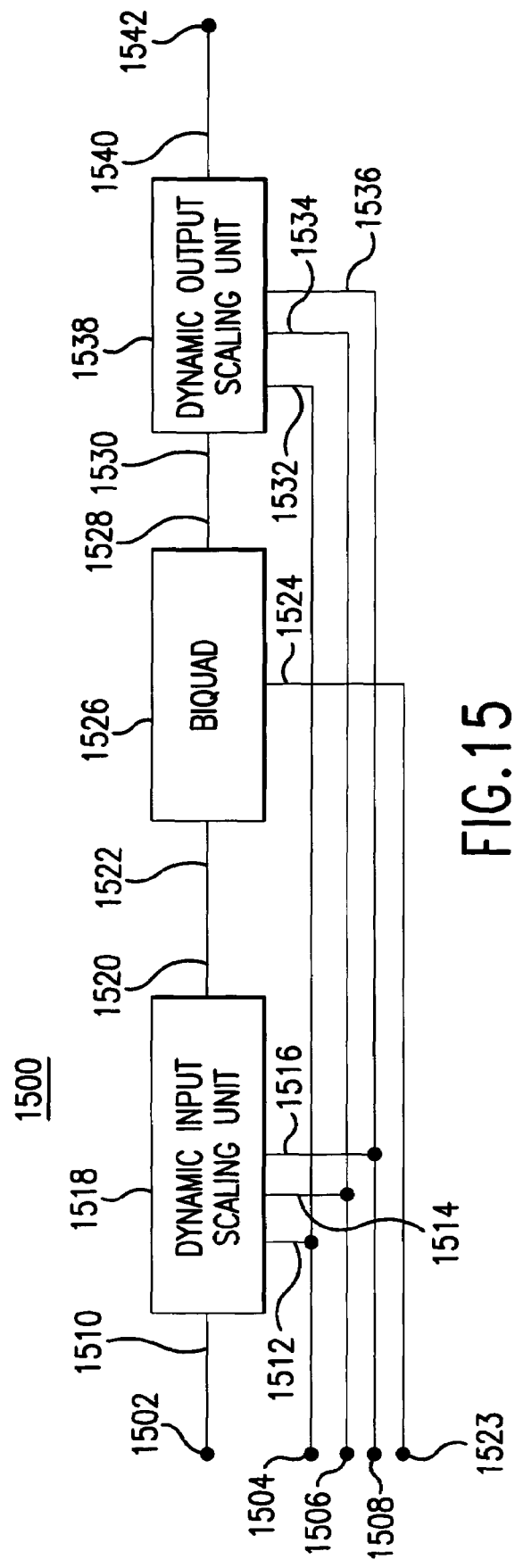
FIG. 15 is a block diagram illustrating a further additional signal processing circuit in accordance with the present invention.

In an exemplary embodiment, the first signal processing circuit 514 can be the signal processing circuit 1500 illustrated in FIG. 15. The input 504 of the first signal processing circuit 514 becomes an input 1502 of the signal processing circuit 1500, the input 506 becomes an input 1504, the input 508 becomes an input 1506, the input 510 becomes an input 1508, the input 512 becomes an input 1523, and the output 518 becomes an output 1520. The signal processing circuit 1500 includes a dynamic input scaling unit 1518, a biquad 1526, and a dynamic output scaling unit 1538.

A signal received at the input 1502 of the signal processing circuit 1500 is conveyed to an input 1510 of the dynamic input scaling unit 1518; a signal received at the input 1504 is conveyed to an input 1512 of the dynamic scaling unit 1518 and an input 1532 of the dynamic output scaling unit 1538; a signal received at the input 1506 is conveyed to an input 1514 of the dynamic input scaling unit 1518 and an input 1534 of the dynamic output scaling unit 1538; a signal received at the input 1508 is conveyed to an input 1516 of the dynamic input scaling unit 1518 and an input 1536 of the dynamic output scaling unit 1538; and a signal received at the input 1523 is conveyed to an input 1524 of the biquad 1526. The dynamic input scaling unit 1518 processes the signal received at the input 1510 and provides a signal at an output 1520 of the dynamic input scaling unit 1518 based on the signal received at the input 1510 and the signals received at the inputs 1504, 1506, 1508. The output 1520 corresponds to input 1522 of the biquad 1526.

The biquad 1526 processes the signal received at its input 1522 and produces a signal at its output 1528 if the signal received at the input 1524 is a logical one. If the signal received at the input 1524 is a logical zero, the biquad 1526 does not produce a signal at the output 1528. The output 1528 of the biquad 1526 is connected to the input 1530 of the dynamic output scaling unit 1538.

The dynamic output scaling unit 1538 processes the signal received at the input 1530 and provides a signal at its output 1540 based on the signal received at the input 1530 and the signals received at inputs 1532, 1534, 1536. The output 1540 is connected to the output 1542 of the signal processing circuit 1500.

Figure 17:
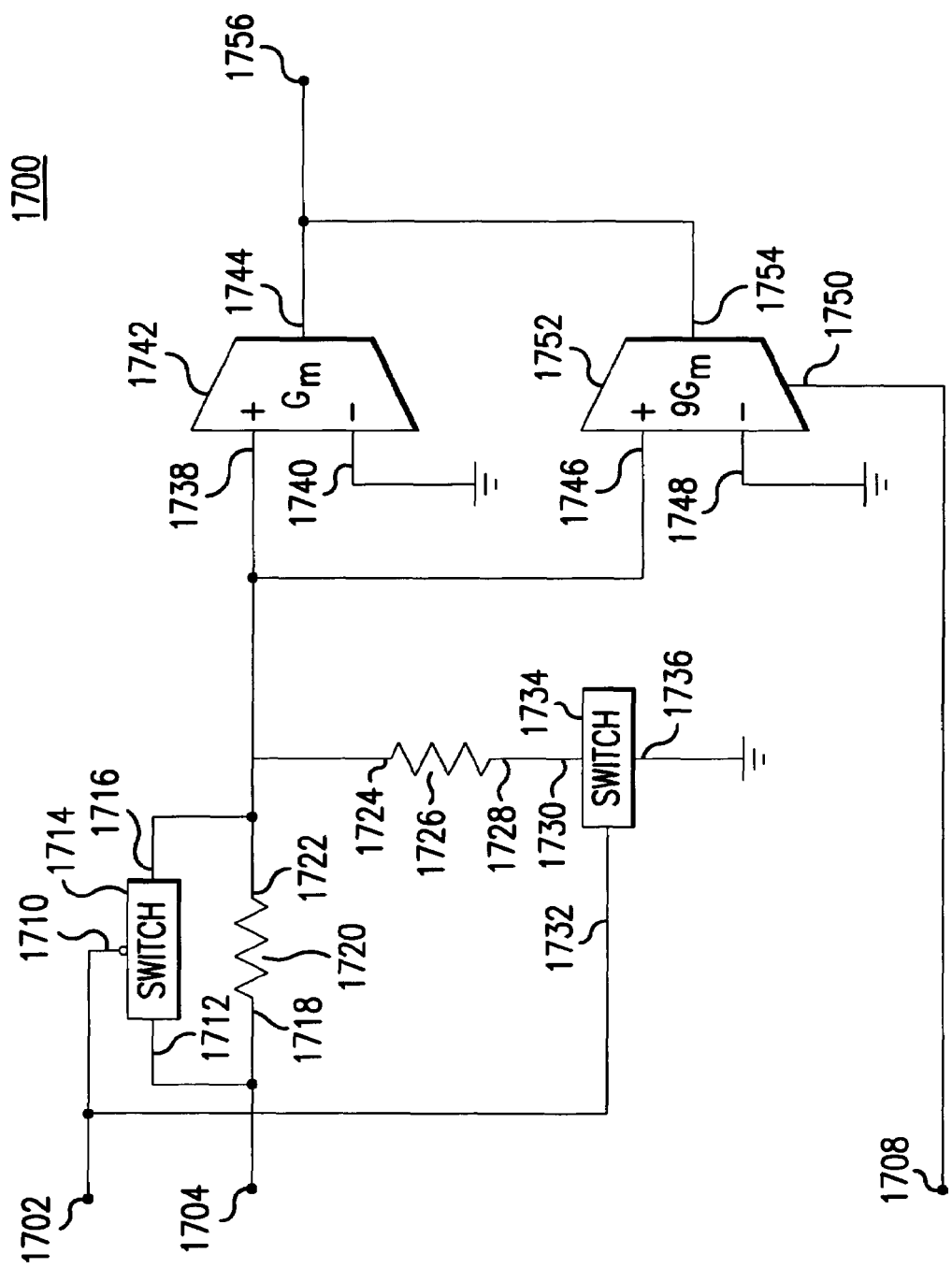
FIG. 17 is a circuit diagram illustrating a dynamic input scaling unit in accordance with the present invention.

In an exemplary embodiment, the dynamic input scaling unit 1518 can be the dynamic input scaling unit 1700 illustrated in FIG. 17. The input 1512 of the dynamic input scaling unit 1518 corresponds to input 1702 of the dynamic input scaling unit 1700, the input 1516 corresponds to an input 1708, the input 1510 corresponds to input 1704, and the output 1520 becomes an output 1756. The dynamic input scaling unit 1700 includes a first switch 1714, a second switch 1734, a first resistor 1720, a second resistor 1726, a first transconductor 1742, and a second transconductor 1752.

A signal received at the input 1702 of the dynamic input scaling unit 1700 is conveyed to an inverted switch control input 1710 of the first switch 1714, and an input 1732 of the second switch 1734; a signal received at the input 1704 is conveyed to one terminal 1718 of the first resistor 1720 and an input 1712 of the first switch 1714; and an input 1708 is conveyed to a switch input 1750 of the transconductor 1752. The first switch 1714 connects its input 1712 to its output 1716 if the signal received at the inverted switch control input 1710 is a logical zero. If the signal at the inverted switch-control input 1710 is a logical one, the first switch 1714 disconnects its input 1712 from its output 1716 resulting in an open circuit. The first resistor 1720 is connected between the input 1712 signal received at the input 1718 of the and the output 1716 of the first switch 1714. The output 1716 of the first switch 1714 and the other terminated 1722 of the first resistor 1720 are both connected to one terminal 1724 of the second resistor 1726, a positive input 1738 of the first transconductor 1742, and a positive input 1746 of the second transconductor 1752. The first switch 1714 and the first resistor 1720 form one half of a voltage divider, which is used to adapt a filter to be useful over a high effective range.

The other terminal 1728 of the second resistor 1726 corresponds to input 1730 of the second switch 1734. The second switch 1734 connects its input 1730 to its output 1736 if the signal received at the switch control input 1732 is a logical one. If the signal at the switch control input 1732 is a logical zero, the second switch 1734 disconnects its input 1730 from its output 1736 resulting in an open circuit. The second switch 1734 and the second resistor 1726 form the other half of the voltage divider used to adapt signal processing circuit 1500 to have a high effective range.

The first transconductor 1742 processes the difference between the signal received at its positive input 1738 and the signal received at its negative input 1740, which is connected to ground, and provides a signal at its output 1744. The signal at the output 1744 of the first transconductor 1742 is equal to the difference in the signal received by the positive input 1738 of the first transconductor 1742 and the signal received by its negative input 1740, scaled by a transconductance $G_m$ of the first transconductor 1742. The output 1744 of the first transconductor 1742 corresponds to output 1754 of the second transconductor 1752, and the output 1756 of the dynamic input scaling unit 1518. When the first switch 1714 is closed, the switch 1734 is open, and the second transconductor 1752 is off (as a result of a logical zero signal received at its control input 1750), the voltage output of the first transconductor 1742 adapts the signal processing circuit 1500 to a medium effective range.

If a logical one signal is received at the control terminal 1750 of the second transconductor 1752, it processes the difference between the signal received at its positive input 1746 and the signal received at its negative input 1748, which is connected to ground, and provides a signal at the output 1754. If the signal at its control input 1750 is a logical zero, the second transconductor 1752 acts as an open circuit between its input 1746 and its output 1754. If the signal at the control input 1750 is a logical one, the signal at the output 1754 of the second transconductor 1752 is equal to the difference in the signal received by its positive input 1746 and the signal received by its negative input 1748, scaled by a transconductance $9G_m$ of the second transconductor 1752. The output 1754 of the second transconductor 1752 is connected to the output 1744 of the first transconductor 1742, and to the output 1756 of the dynamic input scaling unit 1518. When the second transconductor 1752 is on, i.e. when the signal at its control input 1750 is a logical one, the voltage output of the transconductor 1752 combines with the voltage output of the transconductor 1742 to adapt a signal processing circuit to have a low effective range.

Figure 16:
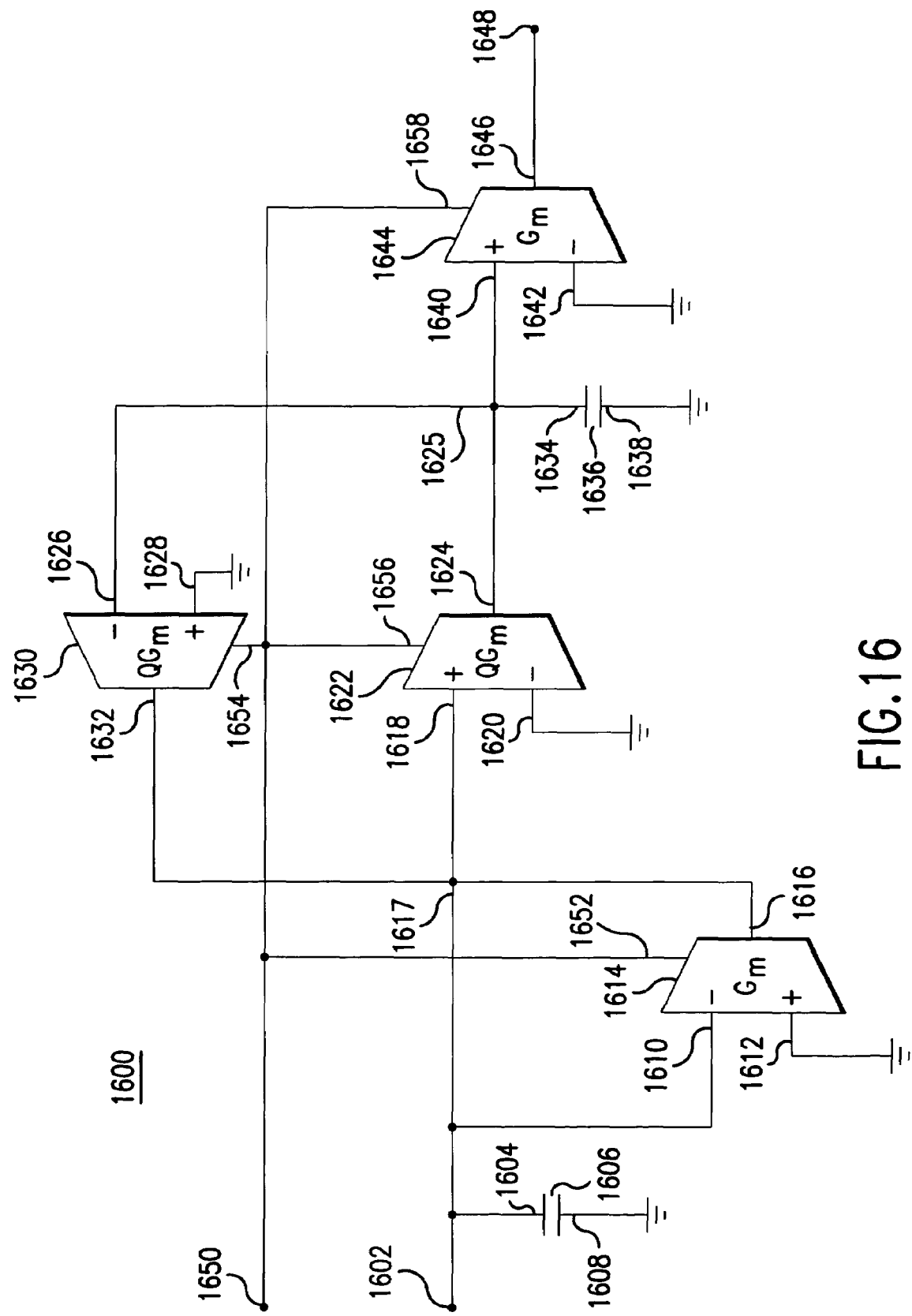
FIG. 16 is a circuit diagram illustrating a biquad in accordance with the present invention.

Referring again to FIG. 15, the biquad 1526 of the signal processing circuit 1500 can be the biquad 1600 illustrated in FIG. 16. Turning to FIG. 16, the biquad 1600 includes a first transconductor 1614, a second transconductor 1622, a third transconductor 1630, a fourth transconductor 1644, a first capacitor 1606, and a second capacitor 1636. The center frequency Wo of the biquad 1600 can be calculated equation (1). The absolute value of the transconductors and capacitors can be scaled by the same factor, i.e. impedance scaling, without affecting the transfer function of the biquad 1600, since the transfer function depends on the ratios between these values. Impedance scaling does not change the transfer function of the biquad 1600, however it does change the power dissipation and the noise level of the biquad 1600.

A signal received by the input 1602 of the biquad 1600 is conveyed to one terminal 1604 of the capacitor 1606, a negative input 1610 of the first transconductor 1614, an output 1616 of the first transconductor 1614, a positive input 1618 of the second transconductor 1622, and an output 1632 of the third transconductor 1630. These connections form a node 1617. The other terminal 1608 of the first capacitor 1606 is connected to ground. The first capacitor 1606 buffers the first node 1074 by being connected to ground through the capacitor 1606.

If its control input 1652 receives a logical one signal, the first transconductor 1614 processes the difference between the signal received at its positive input 1612, which is connected to ground, and the signal received at its negative input 1610, and provides a signal at its output 1616. The signal at the output 1616 is equal to the difference between the signal received by the positive input 1610 and the signal received by the negative input 1612, scaled by a transconductance $G_m$ of the first transconductor 1614 if the signal received at the control input 1652 is a logical one. If the signal received at the control input 1652 is a logical zero, the output 1616 of the first transconductor 1614 acts as an open circuit. The output 1616 of the transconductor 1614 is connected to one terminal 1604 of the first capacitor 1606, the negative input 1610 of the first transconductor 1614, the positive input 1618 of the second transconductor 1622, and the output 1632 of the third transconductor 1630. The transconductor 1614 forms a feedback loop at the node 1617.

If its control input 1656 receives a logical one signal, the transconductor 1622 processes the difference between the signal received at its positive input 1618 and the signal received at its negative input 1620, which is connected to ground, and outputs a signal at its output 1624. The signal at the output 1624 is equal to the difference between the signal received by the positive input 1618 and the signal received by the negative input 1620, scaled by a transconductance $QG_m$ of the second transconductor 1622 if the signal received at the control input 1656 is a logical one. If the signal received at the input 1656 is a logical zero, the output 1624 of the second transconductor 1622 acts as an open circuit. The output 1624 of the second transconductor 1622 is connected to one terminal second 1634 of the second capacitor 1636, the negative input 1626 of the third transconductor 1630, and the positive input 1640 of the fourth transconductor 1644. These connections form a node 1625. The other terminal 1638 of the capacitor 1636 is connected to ground so as to buffer node 1625.

If its second control input 1654 receives a logical one signal the third transconductor 1630 processes the difference between the signal received at its positive input 1628, which is connected to ground, and the signal received at its negative input 1626 and outputs a signal at its output 1632. The signal at the output 1632 is equal to the difference between the signal received by the positive input 1628 and the signal received by the negative input 1626, scaled by a transconductance $QG_m$ of the third transconductor 1630 if the signal received at the control input 1654 is a logical one. If the signal received at the input 1654 is a logical zero, the output 1632 of the third transcondutor 1630 acts as an open circuit. The output 1632 of the third transconductor 1630 is connected to one terminal 1604 of the capacitor 1606, the negative input 1610 of the first transconductor 1614, the output 1616 of the first transconductor 1614, and the positive input 1618 of the second transconductor 1622. The second and third transconductors 1622, 1630 form a feedback loop at the node 1617.

If its control input 1658 receives a logical one signal, the fourth transconductor 1644 processes the difference between the signal received at its positive input 1640 and the signal received at its negative input 1642, which is connected to ground, and provides a signal at its output 1646. The signal at the output 1646 is equal to the difference in the signal received by the positive input 1640 and the signal received by the negative input 1642 of the fourth transconductor 1644, scaled by a transconductance $QG_m$ of the fourth transconductor 1644 if the signal at its control input 1658 is a logical one. If the signal received at the control input 1658 is a logical zero, the output 1646 of the fourth transconductor acts as an open circuit. The output 1646 of the fourth transconductor 1644 corresponds to output 1648 of the biquad 1600.

In an exemplary embodiment, a first diode and a second diode are connected to the node 1617. The cathode of the first diode is connected to the node 1617, and the anode of the first diode is connected to ground. The anode of the second diode is connected to the node 1617, and the cathode of the second diode is connected to ground. The first and second diodes serve to limit the voltage swing at node 1617 to approximately ±0.7 v.

In an exemplary embodiment, a first diode and a second diode are connected to the node 1625. The cathode of the first diode is connected to the node 1625, and the anode of the first diode is connected to ground. The anode of the second diode is connected to the node 1625, and the cathode of the second diode is connected to ground. The first and second diodes serve to limit the voltage swing at node 1625 to approximately ±0.7 v.

Figure 18:
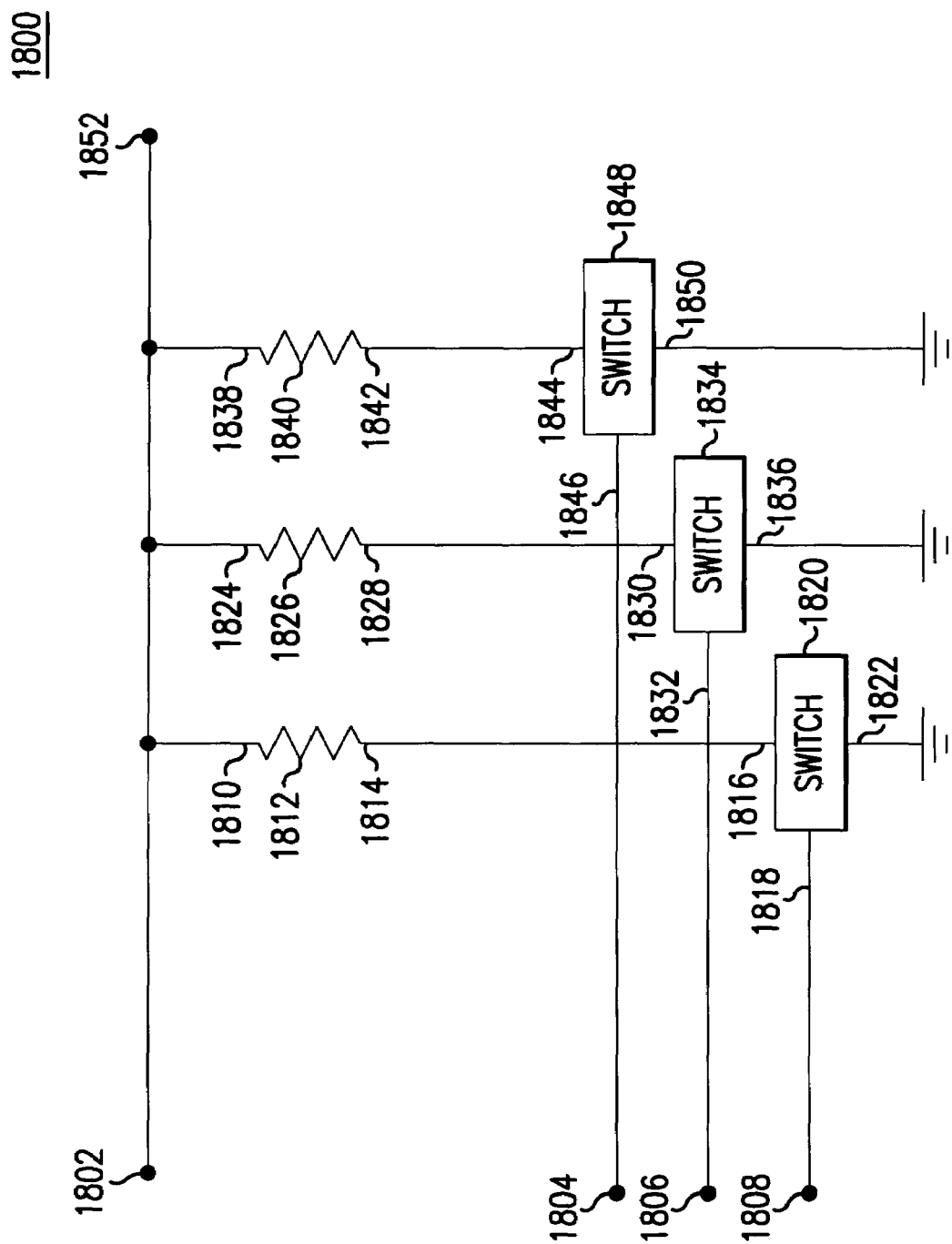
FIG. 18 is a circuit diagram illustrating a dynamic output scaling unit in accordance with the present invention.

In an alternative exemplary embodiment, the dynamic output scaling unit 1538 can be the dynamic output scaling unit 1800 illustrated in FIG. 18. The input 1530 of the dynamic output scaling unit 1538 corresponds to input 1802 of the dynamic output scaling unit 1800, the input 1532 corresponds to input 1804; the input 1534 corresponds to input 1806, the input 1536 corresponds to input 1808, and the output 1540 corresponds to output 1852. The dynamic output scaling unit 1800 includes a first resistor 1812, a first switch 1820, a second resistor 1826, a second switch 1834, a third resistor 1840, and a third switch 1848.

A signal received at the input 1802 of the dynamic output scaling unit 1800 is applied to one terminal 1810 of the first resistor 1812, one terminal 1824 of the second resistor 1826, and one terminal 1838 of the third resistor 1840. A signal received at the input 1804 is conveyed to a switch control input 1846 of the third switch 1848; a signal received at the input 1806 is conveyed to a switch control input 1832 of the second switch 1834; and a signal received at the input 1808 is conveyed to its terminal input 1818 of the first switch 1820. The first resistor 1812 couples the signal applied to its terminal 1810 to input 1816 of the first switch 1820. The first switch 1820 connects its input 1816 to its output 1822 if the signal received at the switch control input 1818 is a logical one. If the signal at the switch control input 1818 is a logical zero, the first switch 1820 disconnects its input 1816 from its output 1822 resulting in an open circuit between the input and its output. The output 1822 of the first switch 1820 is connected to ground. The resistor 1812 and the switch 1820 form an effective amplifier which provides a relatively small gain for the signal received at the input 1802, which is used to adapt the signal processor circuit 1500 to have a low effective range.

The second resistor 1826 couples the signal applied to its terminal 1824 to an input 1830 of the second switch 1834. The second switch 1834 connects its input 1830 to its output 1836 if the signal received at the switch control input 1832 is a logical one. If the signal at the switch control input 1832 is a logical zero, the switch 1834 disconnects its input 1830 from its output 1836 resulting in an open circuit between the input and the output. The output 1836 of the second switch 1834 is connected to ground. The resistor 1826 and the switch 1834 form an effective amplifier which provides a medium gain for the signal received at the input 1802, which is used to adapt the signal processing circuit 1500 to have a medium effective range.

The third resistor 1840 couples the signal applied to its terminal 1838 to the input 1844 of the third switch 1848. The switch 1848 connects its input 1844 to its output 1850 if the signal received at the switch control input 1846 is a logical one. If the signal at the switch control input 1846 is a logical zero, the third switch 1848 disconnects its input 1844 output 1850 resulting in an open circuit between the input and the output. The output 1850 of the third switch 1848 is connected to ground. The resistor 1840 and the switch 1848 form an effective amplifier which provides a relatively large gain for the signal received at the input 1802, which is used to adapt the signal processing circuit 1500 to have a high effective range.

Figure 21:
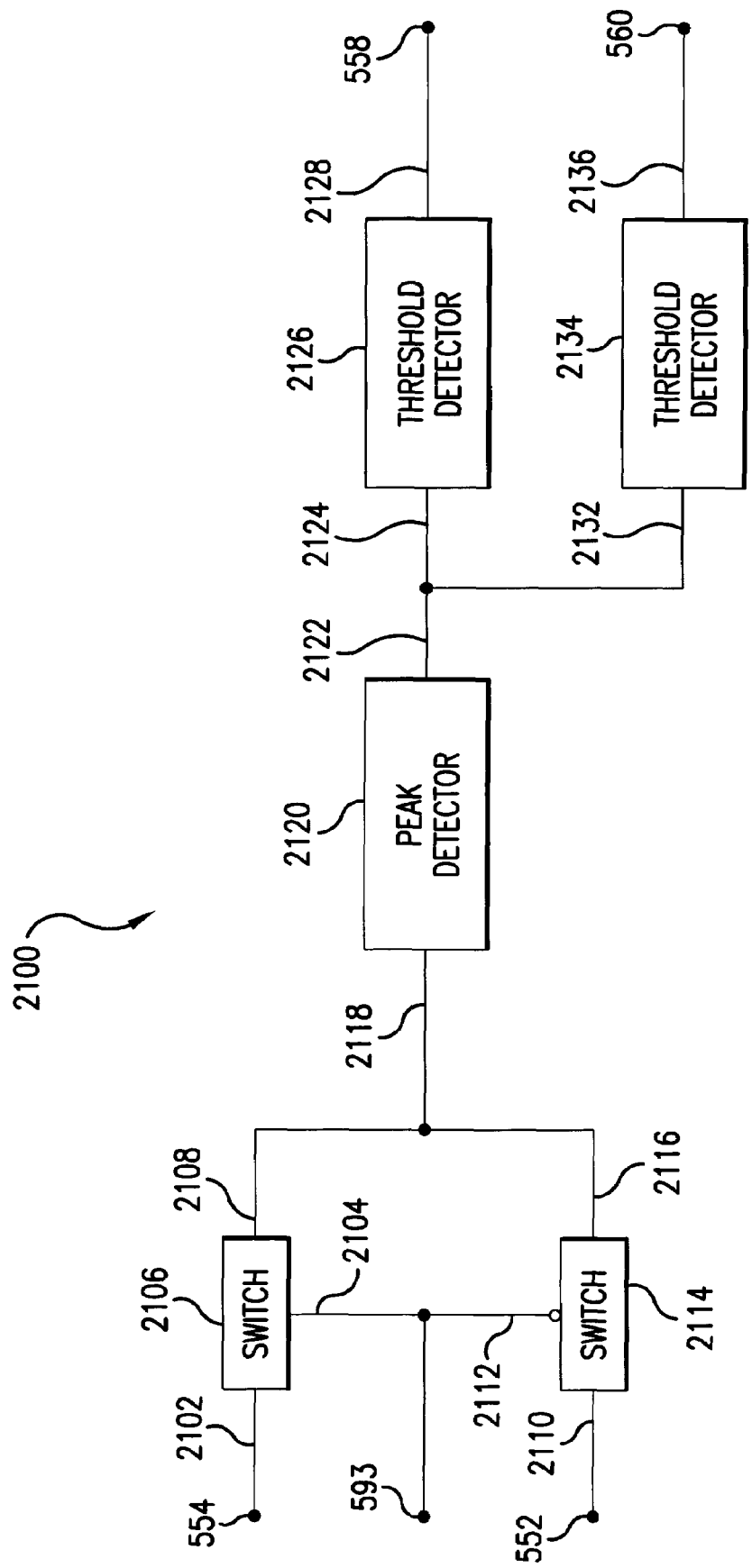
FIG. 21 is a block diagram illustrating a further additional signal strength detector in accordance with the present invention.

In an exemplary embodiment, the signal strength detector 556 of the signal processing circuit 1500 of FIG. 15 is described in FIG. 21 as signal strength detector 2100. The signal strength detector 2100 senses the voltage envelope of the selected input signal of the inputs 552, 554 (shown in FIG. 5), and selects an appropriate signal processing circuit 514, 530 based on a first and a second threshold limit. An input signal is selected when a first switch 2106 or a second switch 2114 is closed. The first threshold limit represents a point at which the signal received from the active signal processing circuit 514 or 530 is near its minimum tolerable signal to noise ratio. The second threshold limit represents a point at which the active signal processing circuit 514 or 530 is near saturation. The signal strength detector 2100 includes the first switch 2106, the second switch 2114, a peak detector 2120, a first threshold detector 2126, and a second threshold detector 2134. The peak detector 2120, the first threshold detector 2126, and the second threshold detector 2134 are described in more detail above in relation to FIG. 11.

A signal received at the input 554 is conveyed to the input 2102 of the first switch 2106; a signal received at the input 552 is conveyed to an input 2110 of the second switch 2114; and a signal received at the input 593 is conveyed to a switch control input 2104 of the first switch 2106 and an inverted switch control input 2112 of the second switch 2114. If the signal received at the input 593 is a logical one, the first switch 2106 closes connecting the signal received at its input 2102 to its output 2108 and the second switch 2114 opens. The output 2108 of the first switch 2106 is connected to the input 2118 of a peak detector 2120. If the signal received at the input 593 is a logical zero, the second switch 2114 closes connecting the signal received at its input 2110 and to its 2116, and the first switch 2106 closes. The output of the second switch 2114 is connected to the input 2118 of the peak detector 2120.

The peak detector 2120 processes the signal received at its input 2118 and provides a signal at its output 2122. The signal output at the output 2122 is conveyed to the input 2124 of a first threshold detector 2126 and the input 2132 of a second threshold detector 2134. The first threshold detector 2126 provides a logical one signal at its output 2128 if the signal at its input 2124 exceeds the first threshold limit, and provides a logical zero signal on its output 2128 if the signal at its input 2124 does not exceed the first threshold limit. The output 2128 of the first threshold detector 2126 is connected to the output 558 of the signal strength detector 2100. The second threshold detector 2134 provides a logical one signal on its output 2136 if the signal at its input 2132 exceeds the second threshold limit, and provides a logical zero signal on its output 2136 if the signal at its input 2132 does not exceed the second threshold limit. The output 2136 of the second threshold detector 2134 is connected to the output 560 of the strength detector 2100.

The first threshold detector 2126, which is similar to the first threshold detector 1175 shown in FIG. 11, is configured to detect the first limit. Referring to FIG. 11, the current source 1170 of the threshold detector 2126 produces a reference current that represents the first limit. The reference current provided by its current source 1170 of the first threshold detector 2126 can be 11 micro-amperes. The second threshold detector 2136, which is also similar to the first threshold detector 1175 shown in FIG. 11, is configured to detect the second limit. The current source 1170 of the threshold detector 2134 produces a reference current that represents the second limit. The reference current provided by the current source 1170 of the second threshold detector 2134 can be 110 micro-amperes.

Figure 19:
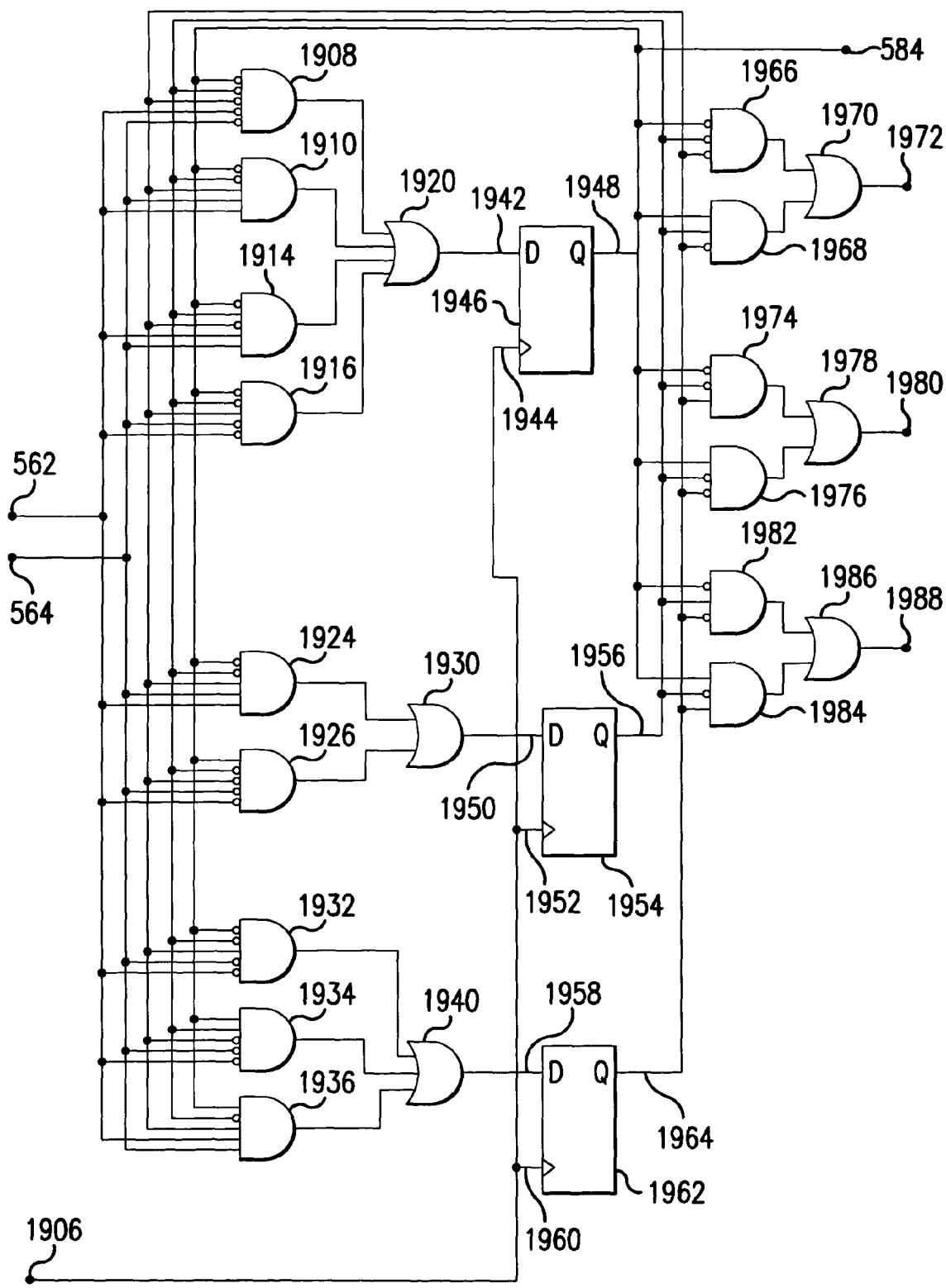
FIG. 19 is a circuit diagram illustrating a portion of a bias selector in accordance with the present invention.
Figure 20:
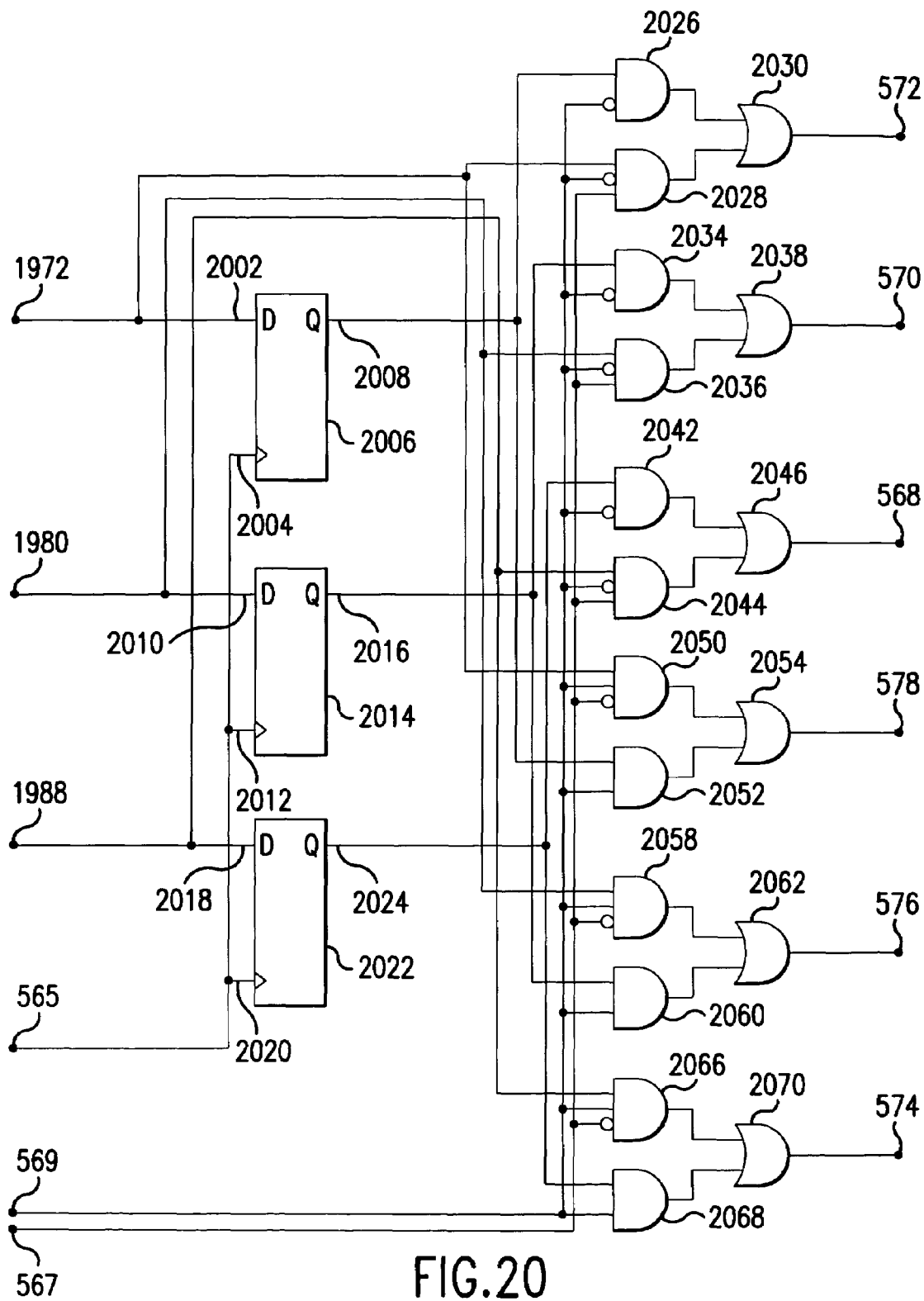
FIG. 20 is a circuit diagram illustrating a portion of a bias selector in accordance with the present invention.

In an exemplary embodiment, the bias selector 566 (shown in FIG. 5) can be the bias selector 1900 as described in FIGS. 19 and 20. The bias selector 1900 indicates the bias setting for the first and second signal processing circuits 514, 530, and when the timer 588 (shown in FIG. 5) should switch the active signal processing circuit from one signal processing circuit to the other signal processing circuit.

Referring to FIG. 19, signals received at the inputs 562, 564 are conveyed to an array of AND gates, and a signal received at the input 1906 is conveyed to the clock inputs 1944, 1952 and 1960 of positive edge triggered D-type flip flops 1946, 1954 and 1962, respectively. The data output 1948 of the positive edge triggered D-type flip flop 1946 is connected to the output 584 of the bias selector 566.

A five input AND gate 1908 processes the inverse of a signal from the data output 1948 of the positive edge triggered D-type flip flop 1946, the inverse of a signal from the data output 1956 of the positive edge triggered D-type flip flop 1954, the inverse of a signal from the data output 1964 of the positive edge triggered D-type flip flop 1962, the inverse of a signal by the input 562, and the inverse of a signal received by the input 564, and produces an output which is provided to a respective input of a four input OR gate 1920. A five input AND gate 1910 processes the inverse of the signal from the data output 1948 of the positive edge triggered D-type flip flop 1946, the inverse of the signal from the data output 1956 of the positive edge triggered D-type flip flop 1954, the signal from the data output 1964 of the positive edge triggered D-type flip flop 1962, the signal received by the input 562, and the signal by the input 564, and produces an output which is provided to a respective input of the four input OR gate 1920. A five input AND gate 1914 processes the inverse of the signal from the data output 1948 of the positive edge triggered D-type flip flop 1946, the signal from the data output 1956 of the positive edge triggered D-type flip flop 1954, the inverse of the signal from the data output 1964 of the positive edge triggered D-type flip flop 1962, the signal received by the input 562, and the signal received by the input 564, and produces an output which is provided to a respective input of the four input OR gate 1920. A five input AND gate 1916 processes the inverse of the signal from the data output 1948 of the positive edge triggered D-type flip flop 1946, the inverse of the signal from the data output 1956 of the positive edge triggered D-type flip flop 1954, the signal from the data output 1964 of the positive edge triggered D-type flip flop 1962, the inverse of the signal received by the input 562, and the inverse of the signal by the input 564, and produces an output which is provided to a respective input of the four input OR gate 1920. The four input OR gate 1920 processes the signals received at its inputs and produces an output which is provided to the data input 1942 of the positive edge triggered D-type flip flop 1946.

A five input AND gate 1924 processes the inverse of the signal from the data output 1948 of the positive edge triggered D-type flip flop 1946, the inverse of the signal from the data output 1956 of the positive edge triggered D-type flip flop 1954, the signal from the data output 1964 of the positive edge triggered D-type flip flop 1962, the signal received by the input 562, and the signal received by the input 564, and produces an output which is provided to a respective input of a two input OR gate 1930. A five input AND gate 1926 processes the signal from the data output 1948 of the positive edge triggered D-type flip flop 1946, the inverse of the signal from the data output 1956 of the positive edge triggered D-type flip flop 1954, the inverse of the signal from the data output 1964 of the positive edge triggered D-type flip flop 1962, the inverse of the signal by the input 562 and the inverse of the signal received by the input 564, and produces an output which is provided to a respective input of the two input OR gate 1930. The two input OR gate 1930 processes the signals received at its inputs and produces an output which is provided to the data input 1950 of the positive edge triggered D-type flip flop 1954.

A five input AND gate 1932 processes the inverse of the signal from the data output 1948 of the positive edge triggered D-type flip flop 1946, the inverse of the signal from the data output 1956 of the positive edge triggered D-type flip flop 1954, the signal from the data output 1964 of the positive edge triggered D-type flip flop 1962, the inverse of the signal by the input 562, and the inverse of the signal by the input 564, and produces an output which is provided to a respective input of a three input OR gate 1940. A five input AND gate 1934 processes the signal from the data output 1948 of the positive edge triggered D-type flip flop 1946, the signal from the data output 1956 of the positive edge triggered D-type flip flop 1954, the inverse of the signal from the data output 1964 of the positive edge triggered D-type flip flop 1962, the inverse of the signal received by the input 562, and the inverse of the signal received by the input 564, and produces an output which is provided to a respective input of the three input OR gate 1940. A five input AND gate 1936 processes the signal from the data output 1948 of the positive edge triggered D-type flip flop 1946, the inverse of the signal received from the data output 1956 of the positive edge triggered D-type flip flop 1954, the signal received from the data output 1964 of the positive edge triggered D-type flip flop 1962, the signal received by the input 562 and the signal received by the input 564, and produces an output which is provided to a respective input of the three input OR gate 1940. The three input OR gate 1940 processes the signals received at its inputs and produces an output which is provided to the data input 1958 of the positive edge triggered D-type flip flop 1960.

A three input AND gate 1966 processes the inverse of the signal from the data output 1948 of the positive edge triggered D-type flip flop 1946, the inverse of the signal from the data output 1956 of the positive edge triggered D-type flip flop 1954, and the inverse of the signal from the data output 1964 of the positive edge triggered D-type flip flop 1962, and produces an output which is provided to one input of a two input OR gate 1970. A three input AND gate 1968 processes the signal from the data output 1948 of the positive edge triggered D-type flip flop 1946, the signal from the data output 1956 of the positive edge triggered D-type flip flop 1954, and the inverse of the signal from the data output 1964 of the positive edge triggered D-type flip flop 1962, and produces an output which is provided to the other input of the two input OR gate 1970. The two input OR gate 1970 processes the signals received at its inputs and produces an output signal at its output 1972 which is provided to the data input 2002 of a positive edge triggered D-type flip flop 2006, shown in FIG. 20.

A three input AND gate 1974 processes the inverse of the signal from the data output 1948 of the positive edge triggered D-type flip flop 1946, the inverse of the signal from the data output 1956 of the positive edge triggered D-type flip flop 1954 and the signal from the data output 1964 of the positive edge triggered D-type flip flop 1962, and produces an output which is provided to one input of a two input OR gate 1978. A three input AND gate 1976 processes the signal from the data output 1948 of the positive edge triggered D-type flip flop 1946, the inverse of the signal from the data output 1956 of the positive edge triggered D-type flip flop 1954, and the inverse of the signal from the data output 1964 of the positive edge triggered D-type flip flop 1962, and produces an output which is provided to the other input of the two input OR gate 1978. The two input OR gate 1978 processes the signals received at its inputs and produces an output signal at its output 1980 which is provided to the data input 2010 of a positive edge triggered D-type flip flop 2014, shown in FIG. 20.

A three input AND gate 1982 processes the inverse of the signal from the data output 1948 of the positive edge triggered D-type flip flop 1946, the signal received from the data output 1956 of the positive edge triggered D-type flip flop 1954, and the inverse of the signal from the data output 1964 of the positive edge triggered D-type flip flop 1962, and produces an output which is provided to one input of a two input OR gate 1986. A three input AND gate 1984 processes the signal from the data output 1948 of the positive edge triggered D-type flip flop 1946, the inverse of the signal from the data output 1956 of the positive edge triggered D-type flip flop 1954 and the signal from the data output 1964 of the positive edge triggered D-type flip flop 1962, and produces an output which is provided to the other input of the two input OR gate 1986. The two input OR gate 1986 processes the signals received at its inputs and produces an output signal at its output 1988 which is provided to the data input 2018 of a positive edge triggered D-type flip flop 2022, shown in FIG. 20.

Referring now to FIG. 20, a signal received at an input 565 is conveyed to the clock input 2004 of the positive edge triggered D-type flip flop 2006, the clock input 2012 of the positive edge triggered D-type flip flop 2014, and a clock input 2020 of the positive edge triggered D-type flip flop 2006.

A two input AND gate 2026 processes the signal from the data output 2008 of the positive edge triggered D-type flip flop 2006, and the inverse of the signal received by the input 569 of the bias selector 566, and produces an output which is provided to one input of a two input OR gate 2030. A three input AND gate 2028 processes the signal from the output 1972 of the two input OR gate 1970 (shown in FIG. 19), the inverse of the signal received by the input 569 of the bias selector 566, and the signal received by the input 567 of the bias selector 566, and produces an output which is provided to the other input of the two input OR gate 2030. The two input OR gate 2030 processes the signals received at its inputs and produces an output signal at the output 572 of the bias selector 566.

A two input AND gate 2034 processes the signal from the data output 2016 of the positive edge triggered D-type flip flop 2014, and the inverse of the signal received by the input 569 of the bias selector 566, and produces an output which is provided to one input of a two input OR gate 2038. A three input AND gate 2036 processes the signal received from the output 1980 of the two input OR gate 1978 (shown in FIG. 19), the inverse of the signal received by the input 569 of the bias selector 566, and the signal received by the input 567 of the bias selector 566, and produces an output which is provided to the other input of the two input OR gate 2038. The two input OR gate 2038 processes the signals received at its inputs and produces an output signal at the output 570 of the bias selector 566.

A two input AND gate 2042 processes the signal from the data output 2024 of the positive edge triggered D-type flip flop 2022, and the inverse of the signal received by the input 569 of the bias selector 566, and produces an output which is provided to one input of a two input OR gate 2046. A three input AND gate 2044 processes the signal from the output 1988 of the two input OR gate 1986, the inverse of the signal received by the input 569 of the bias selector 566, and the signal received by the input 567 of the bias selector 566, and produces an output which is provided to the other input of the two input OR gate 2046. The two input OR gate 2046 processes the signals received at its inputs and produces an output signal at the output 568 of the bias selector 566.

A three input AND gate 2050 processes the signal from the output 1972 of the two input OR gate 1970, the signal received by the input 569 of the bias selector 566, and the inverse of the signal received by the input 567 of the bias selector 566, and produces an output which is provided to one input of the two input OR gate 2054. A two input AND gate 2052 processes the signal from the data output 2008 of the positive edge triggered D-type flip flop 2006, and the signal received by the input 569 of the bias selector 566, and produces an output which is provided to the other input of the two input OR gate 2054. The two input OR gate 2054 processes the signals received at its inputs and produces an output signal at the output 578 of the bias selector 566.

A three input AND gate 2058 processes the signal from the output 1980 of the two input OR gate 1982, the signal received by the input 569 of the bias selector 566 and the inverse of the signal received by the input 567 of the bias selector 566, and produces an output which is provided to one input of the two input OR gate 2062. A two input AND gate 2060 processes the signal from the data output 2016 of the positive edge triggered D-type flip flop 2014 and the signal received by the input 569 of the bias selector 566, and produces an output which is provided to the other input of the two input OR gate 2062. The two input OR gate 2062 processes the signals received at its inputs and produces an output signal at the output 576 of the bias selector 566.

A three input AND gate 2066 processes the signal from the output 1988 of the two input OR gate 1986, the signal received by the input 569 of the bias selector 566 and the inverse of the signal received by the input 567 of the bias selector 566, and produces an output which is provided to one input of the two input OR gate 2070. A two input AND gate 2068 processes the signal from the data output 2024 of the positive edge triggered D-type flip flop 2022 and the signal received by the input 569 of the bias selector 566, and produces an output which is provided to the other input of the two input OR gate 2070. The two input OR gate 2070 processes the signals received at its inputs and produces an output signal at the output 574 of the bias selector 566.

Figure 13:
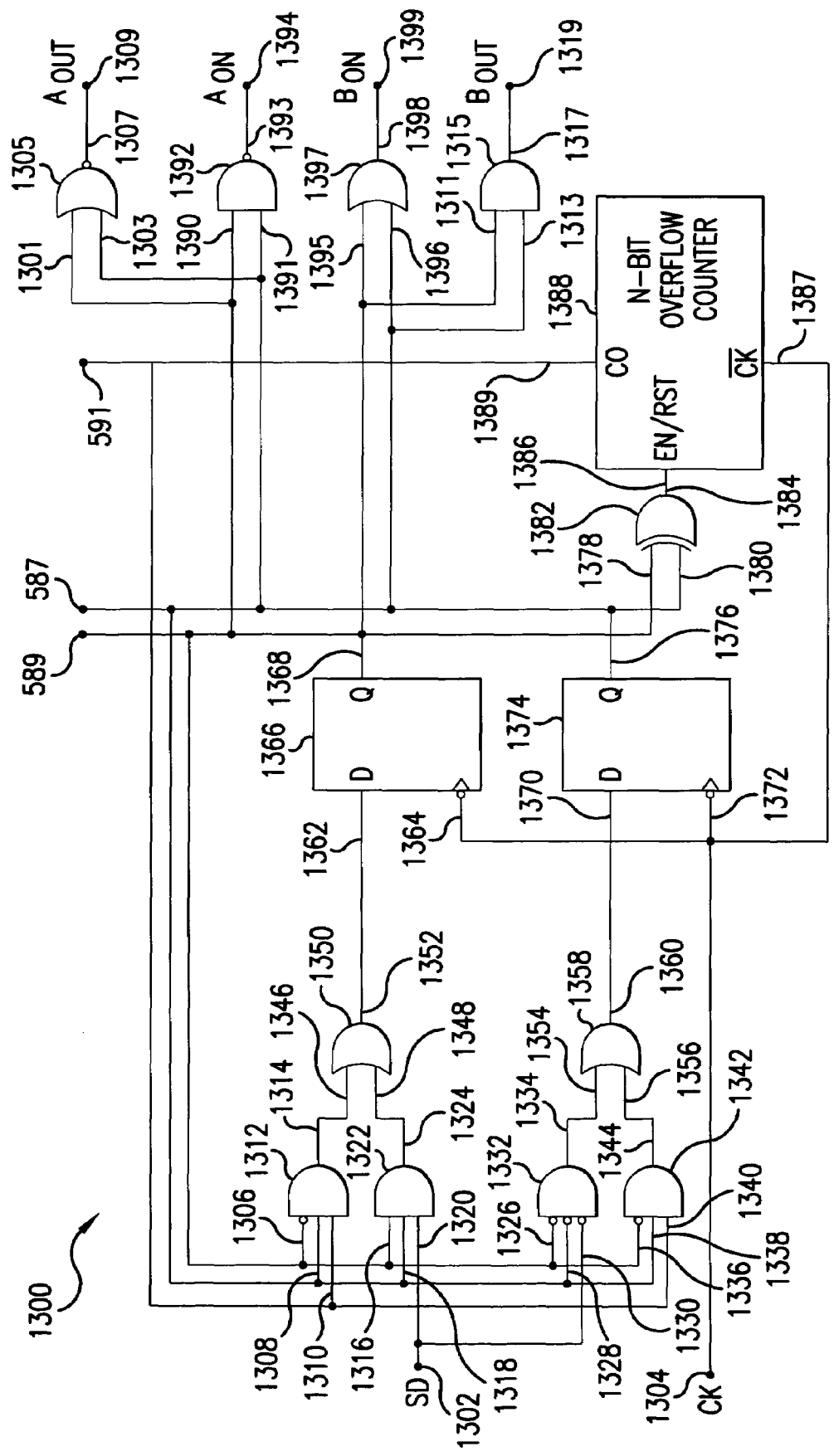
FIG. 13 is a circuit diagram illustrating a timer in accordance with the present invention.

In an exemplary embodiment, the timer 588 can be the timer 1300 illustrated in FIG. 13. The input 586 of the timer 588 corresponds to the input 1302 of the timer 1300, and the outputs 580, 582, 590, 592 of the timer 588 correspond to the outputs 1319, 1309, 1394, 1399, respectively, of the timer 1300. The timer 1300 provides outputs 1309, 1319, 1394 and 1399 that selectively connect and disconnect the first and second signal processing circuits 514, 530 to and from the input 502 and the output 594 of the signal processing system 500, and selectively turn the first and second signal processing circuits 514, 530 on and off. The timer 1300 includes a first three input AND gate 1312, a second three input AND gate 1322, a third three input AND gate 1332, a fourth three input AND gate 1342, a first three input OR gate 1350, a second three input OR gate 1358, a third three input OR gate 1397, a two input NAND gate 1392, a two input NOR gate 1305, a two input AND gate 1315, a first D-type flip-flop 1366, a second D-type flip-flop 1374, an XOR gate 1382, and an n-bit overflow counter 1388. The timer 1300 is provided with two inputs: a signal strength detector input 1302 and a clock input 1304.

The first three input AND gate 1312, the second three input AND gate 1322, and the first three input OR gate 1350 combine to produce the most significant bit for the next state of the state machine. The first three input AND gate 1312 includes an inverting input 1306, an input 1308, an input 1310, and an output 1314. The inverting input 1306 is connected to an input 1316 of the second three input AND gate 1322, an inverting input 1326 of the third three input AND gate 1332, an inverting input 1336 of the fourth three input AND gate 1342, the data output 1368 of the first D-type flip-flop 1366, the input 1378 of the two input XOR gate 1382, the input 1390 of the two input NAND gate 1392, the input 1301 of the two input NOR gate 1305, the input 1311 of the two input AND gate 1315, and the input 1395 of the third three input OR gate 1397 are each connected to the output 589 of the timer 588. The input 1308 of the first three input AND gate 1312, the input 1318 of the second three input AND gate 1322, the inverting input 1328 of the third three input AND gate 1332, the input 1338 of the fourth three input AND gate 1342, the data output 1376 of the second D-type flip-flop 1374, the input 1380 of the two input XOR gate 1382, the input 1391 of the two input NAND gate 1392, the input 1313 of the two input AND gate 1315, the input 1303 of the two input NOR gate 1305, and the input 1396 of the third three input OR gate 1397 are each connected to the output 587 of the timer 588. The input 1310 of the first three input AND gate 1312, the input 1340 of the fourth three input AND gate 1342, and the counter overflow output 1389 of the n-bit overflow counter 1388, are each connected to the output 591 of the timer 588. The input 1320 of the third three input AND gate 1322 and the inverting input 1330 of the fourth three input AND gate 1332 are connected to the input 1302 of the timer circuit 1300. The clock input 1361 of the first negative edge triggered D-type flip-flop 1366, the clock input 132 of the second negative edge triggered D-type flip-flop 1374 and the clock input 1387 of the n-bit overflow counter 1388 are each connected to the clock input 1304 of the timer 1300.

The first three input OR gate 1350 includes the input 1346, the input 1348 and an output 1352. The input 1346 is connected to the output 1314 of the first three input AND gate 1312. The input 1348 is connected to the output 1324 of the second three input AND gate 1322. And the output 1352 of the first three input OR gate 1350 is connected to a data input 1362 of the first D-type flip-flop 1366.

The third three input AND gate 1332, the fourth three input AND gate 1342, and the second three input OR gate 1358 combine to produce the least significant bit for the next state of the state machine.

The second three input OR gate 1358 includes the input 1354, the input 1356 and the output 1360. The input 1354 is connected to the output 1334 of the third three input AND gate 1332. The input 1356 is connected to the output 1344 of the fourth three input AND gate 1342. And the output 1360 of the second three input OR gate 1358 is connected to the data input 1370 of the second D-type flip-flop 1374.

The first D-type flip-flop 1366 holds the most significant bit of the current state of the timer 1300 until the next negative edge of the clock signal received at the clock input 1304 of the timer 1300. The second D-type flip-flop 1374 holds the least significant bit of the current state of the timer 1300 until the next negative edge of the clock signal received at the clock input 1304 of the timer 1300. The two input XOR gate 1382 produces the signal that enables and resets the n-bit overflow counter 1388. The output 1384 of the two input XOR gate 1382 is connected to the enable/reset enable/reset input 1386 of the n-bit overflow counter 1388.

The n-bit overflow counter 1388 provides a signal that indicates when a given period of time has elapsed. The period of time is adjustable within the n-bit counter 1388, by configuring the reset conditions of the n-bit counter 1388 such that the period of time can be altered. The n-bit overflow counter 1388 includes the enable/reset input 1386, the clock input 1387, and the counter overflow output 1389. If the enable/reset input 1386 is a logical zero, the n-bit overflow counter 1388 is reset to zero. If the enable/reset input 1386 is a logical one, the n-bit overflow counter 1388 begins to count by increments of one at every falling edge of the clock signal received at the clock input 1387. The counter overflow output 1389 outputs a logical zero after the n-bit overflow counter 1388 is reset, and continues to output a logical zero until the n-bit overflow counter 1388 overflows. After the n-bit overflow counter 1388 overflows, the counter overflow output 1389 outputs a logical one until the n-bit overflow counter 1388 is reset. The n-bit overflow counter 1388 can be configured or the clock rate can be adjusted to allow for enough time from reset to overflow for the transients in the outputs 518, 534 of the signal processing circuits 514, 530 to die out.

The two input NAND gate 1392 produces a signal at its output 1393 that indicates when a signal processing circuit, having a higher effective range, should be turned on and connected to the input of the signal processing system. The two input NAND gate 1392 includes the input 1390, the input 1391, and an output 1393. The input 1390 of the two input NAND gate 1392 is connected to the inverting input 1306 of the first three input AND gate 1312, the input 1316 of the second three input AND gate 1322, the inverting input 1326 of the third three input AND gate 1332, the inverting input 1336 of the fourth three input AND gate 1342, the output 1368 of the first D-type flip-flop 1366, the output 589 of the timer 588, the input 1378 of the two input XOR gate 1382, the input 1305 of the two input NOR gate 1305, the input 1311 of the two input AND gate 1315, and the input 1395 of the third three input OR gate 1397. The input 1391 of the two input NAND gate 1392 is connected to the input 1308 of the first three input AND gate 1312, the input 1318 of the second three input AND gate 1322, the inverting input 1328 of the third three input AND gate 1332, the input 1338 of the fourth three input AND gate 1342, the output 1376 of the second D-type flip-flop 1374, the output 587 of the timer 588, the input 1380 of the two input XOR gate 1382, the input 1313 of the two input AND gate 1315, the input 1303 of the two input NOR gate 1305, and an input 1396 of the third three input OR gate 1397. The output 1393 of the two input NAND gate 1392 is connected to the output 1394 of the timer 1300.

The third three input OR gate 1397 produces a signal that indicates when a signal processing circuit, having a lower effective range, should be turned on and connected to the input of the signal processing system. The two input OR gate 1397 includes the input 1395, the input 1396, and an output 1398. The input 1395 of the third three input OR gate 1397 is connected to the inverting input 1306 of the first three input AND gate 1312, the input 1316 of the second three input AND gate 1322, the inverting input 1326 of the third three input AND gate 1332, the inverting input 1336 of the fourth three input AND gate 1342, the output 1368 of the first D-type flip-flop 1366, the output 589 of the timer 588, the input 1378 of the two input XOR gate 1382, the input 1301 of the two input NOR gate 1305, the input 1311 of the two input AND gate 1315, and the input 1390 of the two input NAND gate 1392. The input 1395 of the third three input OR gate 1397 is connected to the input 1308 of the first three input AND gate 1312, the input 1318 of the second three input AND gate 1322, the inverting input 1328 of the third three input AND gate 1332, the input 1338 of the fourth three input AND gate 1342, the output 1376 of the second D-type flip-flop 1374, the output 587 of the timer 588, the input 1380 of the two input XOR gate 1382, the input 1303 of the two input NOR gate 1305, the input 1311 of the two input AND gate 1315, and the input 1391 of the two input NAND gate 1392. The output 1398 of the third three input OR gate 1397 is connected to the output 1399 of the timer 1300.

The two input NOR gate 1305 produces a signal that indicates when a signal processing circuit, having a higher effective range, should be connected to the output of a signal processing system. The two input NOR gate 1305 includes the input 1301, the input 1303, and an output 1307. The input 1301 of the two input NOR gate 1305 is connected to the inverting input 1306 of the first three input AND gate 1312, the input 1316 of the second three input AND gate 1322, the inverting input 1326 of the third three input AND gate 1332, the inverting input 1336 of the fourth three input AND gate 1342, the output 1368 of the first D-type flip-flop 1366, the output 589 of the timer 588, the input 1378 of the two input XOR gate 1382, the input 1390 of the two input NAND gate 1392, the input 1311 of the two input AND gate 1315, and the input 1395 of the third three input OR gate 1397. The input 1303 of the two input NOR gate 1305 is connected to the input 1308 of the first three input AND gate 1312, the input 1318 of the second three input AND gate 1322, the inverting input 1328 of the third three input AND gate 1332, the input 1338 of the fourth three input AND gate 1342, the output 1376 of the second D-type flip-flop 1374, the output 587 of the timer 588, the input 1380 of the two input XOR gate 1382, the input 1391 of the two input NAND gate 1392, the input 1313 of the two input AND gate 1315, and the input 1396 of the third three input OR gate 1397. The output 1307 of the two input NOR gate 1305 is connected to the output 1309 of the timer 1300.

The two input AND gate 1315 produces a signal that indicates when a signal processing circuit, having a lower effective range, should be connected to the output of a signal processing system. The two input AND gate 1315 includes the input 1311, the input 1313, and an output 1317. The input 1311 of the two input AND gate 1315 is connected to the inverting input 1306 of the first three input AND gate 1312, the input 1316 of the second three input AND gate 1322, the inverting input 1326 of the third three input AND gate 1332, the inverting input 1336 of the fourth three input AND gate 1342, the output 1368 of the first D-type flip-flop 1366, the output 589 of the timer 588, the input 1378 of the two input XOR gate 1382, the input 1390 of the two input NAND gate 1392, the input 1301 of the two input NOR gate 1305, and the input 1395 of the third three input OR gate 1397. The input 1313 of the two input AND gate 1315 is connected to the input 1308 of the first three input AND gate 1312, the input 1318 of the second three input AND gate 1322, the inverting input 1328 of the third three input AND gate 1332, the input 1338 of the fourth three input AND gate 1342, the output 1376 of the second D-type flip-flop 1374, the output 587 of the timer 588, the input 1380 of the two input XOR gate 1382, the input 1391 of the two input NAND gate 1392, the input 1303 of the two input NOR gate 1305, and the input 1396 of the third three input OR gate 1397. The output 1317 of the two input AND gate 1315 is connected to the output 1319 of the timer 1300.

Figure 5B:
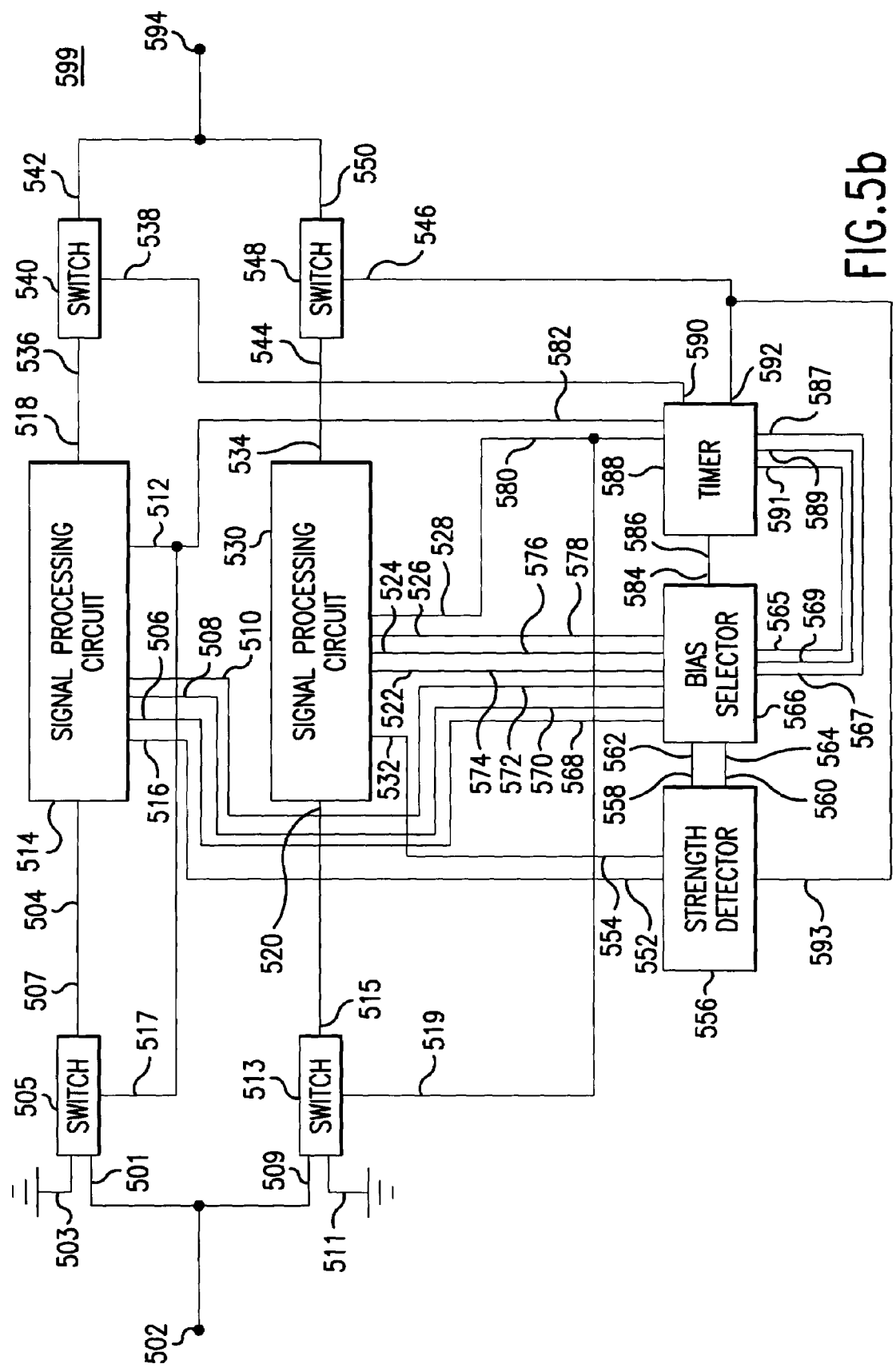
FIG. 5(b) is a block diagram illustrating an additional signal processing system in accordance with the present invention.

Referring to FIG. 5(b), there is shown a signal processing system 599 according to another exemplary embodiment of the present invention. Unlike the signal processing system 500, the signal processing system 599 includes the input switch 505, the input switch 513, and the outputs 580, 582 of the timer 588 are not only connected to the power control inputs 528, 512 of the signal processing circuits 530, 514, respectively, but also to switch control inputs 519, 517 of the input switches 513, 505, respectively. A signal received by the input 502 is connected to a signal input 501 of the input switch 505 and a signal input 509 of the input switch 513. The input switch 505 includes the signal input 501, a grounded input 503, a switch output 507, and a switch control input 517. The input switch 505 connects the signal input 501 to the switch output 507 if the signal received at the switch control input 517 is a logical one, and connects the switch output 507 to the grounded input 503 if the signal received at the switch control input 517 is a logical zero. The switch 513 includes the signal input 509, a grounded input 511, a switch output 515, and a switch control input 519. The switch 513 connects the signal input 509 to the switch output 515 if the signal received at the switch control input 519 is a logical one, and connects the switch output 515 to the grounded input 511 if the signal received at the switch control input 519 is a logical zero.

Figure 6:
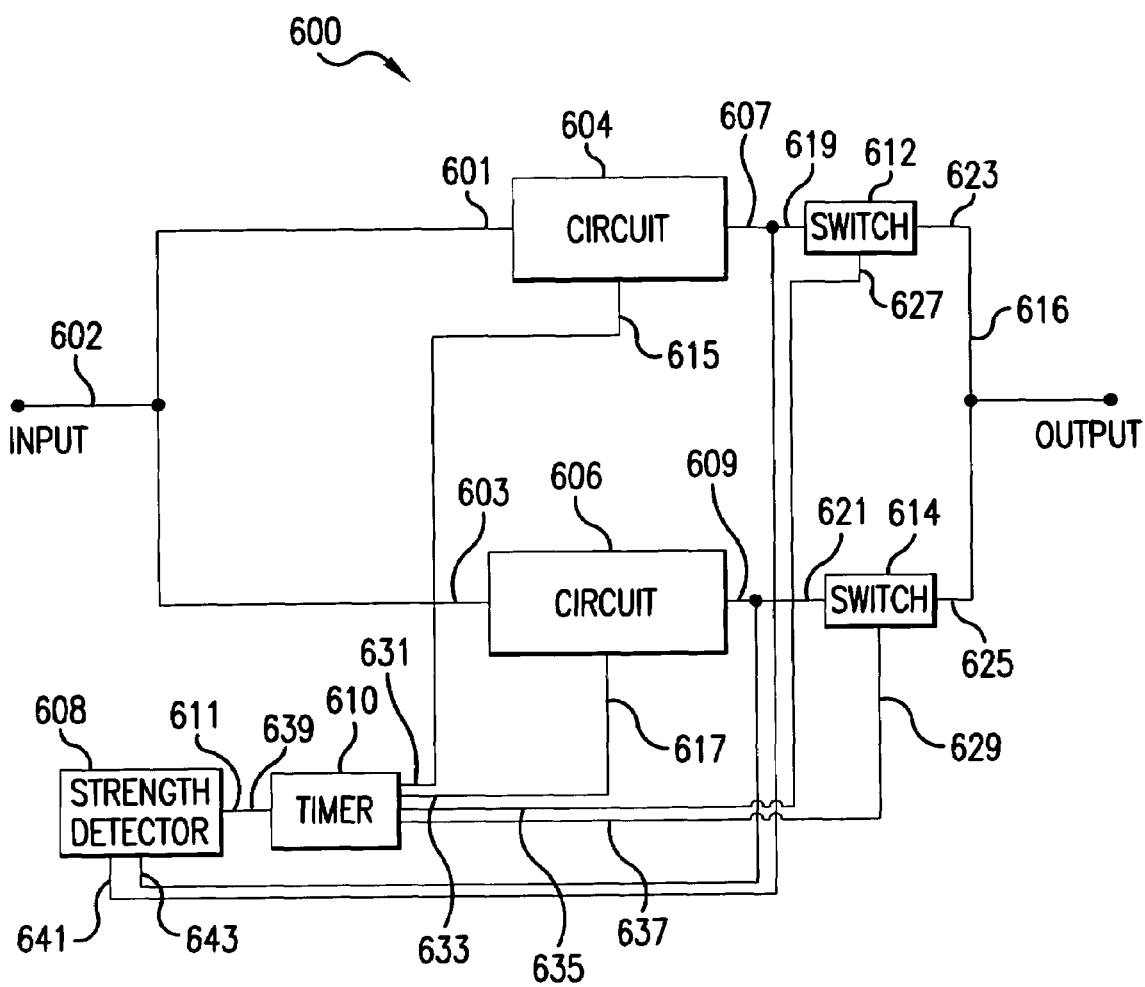
FIG. 6 is a block diagram illustrating a further additional signal processing system in accordance with the present invention.

FIG. 6 illustrates a further exemplary embodiment of a signal processing system 600 in accordance with the present invention. Whenever a large out-band component is present, relative to the in-band signal, in the signal at the input 602 of the signal processing system 600, a filter with a large signal-to-noise ratio (hereinafter "SNR") is needed to ensure that after the out-band component is filtered out of the signal the in-band component of the signal is still above the minimum tolerable signal to noise ratio of the filter. However, a filter with a large SNR consumes a relatively large amount of power during operation. When no large out-band component is present in the signal at the input of the signal processing system 600, a filter with a lower SNR can be used, which consumes a smaller amount of power.

A signal received at the input 602 of the signal processing system 600 corresponds to input 601 of a signal processing circuit 604, and an input 603 of a signal processing circuit 606. The signal processing circuit 604 processes the signal received at the input 602 and outputs a processed signal at the output 607. The signal processing circuit 604 can be turned on and off by applying an appropriate signal to a power control input 615. If the signal received at the power input 615 is a logical one, the signal processing circuit 604 is turned on. Conversely, if the signal received at the power input 615 is a logical zero, the signal processing circuit 604 is turned off. The signal processing circuit 604 can process signals with large out-band components because the signal processing circuit 604 has a high SNR. The signal processing circuit 604 therefore introduces low amounts of noise to the processed signal. The output 607 of the signal processing circuit 604 corresponds to input 619 of a switch 612 and an input 641 of the signal strength detector 608. The switch includes the input 619, a switch control input 627, and a switch output 623. The switch output 623 of the switch 612 is connected to the output 616 of the signal processing system 600, and an output 625 of a switch 614.

The signal processing circuit 606 processes the signal received at the input 603 and outputs a processed signal at the output 609. The signal processing circuit 606 can be turned on and off by applying an appropriate signal to a power control input 617. If the signal received at the power control input 617 is a logical one, the signal processing circuit 606 is turned on. Conversely, if the signal received at the power control input 617 is a logical zero signal, the signal processing circuit 606 is turned off. The signal processing circuit 606 has a lower SNR than the signal processing circuit 604, and therefore introduces higher amounts of noise to the processed signal. The output 609 of the signal processing circuit 606 corresponds to input 621 of a switch 614 and an input 643 of the signal strength detector 608. The switch 614 includes the input 621, a switch control input 629, and the switch output 625. The switch output 625 of the switch 614 is connected to the output 616 of the signal processing system 600, and the output 623 of the switch 612.

The signal strength detector 608 selects the filter bank that is the most suitable from the standpoint of SNR for processing the signal received by the input 602 of the signal processing system 600. The inputs 641, 643 of the signal strength detector 608 are connected to the outputs 607, 609 of the signal processing circuits 604, 606, respectively. The signal strength detector 608 can detect the voltage envelope of the signal at the input 641 of the strength detector 608 and the voltage envelope of the signal at the input 643 of the strength detector 608. A low-pass-filtered rectifier, well-known for use in many other applications, is one example of a circuit which can be used as an envelope detector. The signal strength detector 608 determines if the voltage envelope of the signal received at the input 641 exceeds a first limit, which represents a point near the minimum tolerable signal to noise ratio of the signal processing circuit 606, or if the voltage envelope of the signal received at the input 643 exceeds a second limit, which represents a point near the saturation point of the signal processing circuit 604. If the voltage envelope of the signal at the input 641 exceeds the first limit, or the voltage envelope of the signal at the input 643 exceeds the second limit, the strength detector 608 provides a logical one on its output 611. If the voltage envelope of the signal at the input 641 does not exceed the first limit, and the voltage envelope of the signal at the input 643 does not exceed the second limit, the strength detector 608 transmits a logical one on its output 611.

The timer 610 provides signals that selectively connect and disconnect the signal processing circuits 604, 606 to and from the output 616 of the signal processing system 600, and selectively turn the signal processing circuits 604, 606 on and off. The timer 610 includes the input 639, a first power control first power control output 631, an second power control output 633, an first switch control output 635, and an second switch control output 637. The outputs 631, 633 of the timer 610 are connected to the power control inputs 615, 617 of the first and second signal processing circuits 604, 606, respectively. The first and second switch control outputs 635, 637 of the timer 610 are connected to the switch control inputs 627, 629 of the switches 627, 629, respectively. The timer 610 provides signals that cause only one of the outputs 607, 609 of one of the signal processing circuits 604, 606 to be connected to the output 616 of the signal processing system 600 at any one time.

The timer 610 provides signals to the switches 612, 614 and the signal processing circuits 604, 606 that allow the signal processing system 600 to switch between the signal processing circuit 604 and the signal processing circuit 606 without causing transients to appear at the output 616 of the signal processing system 600. To switch from one signal processing circuit to the other signal processing circuit, the timer 610 provides respective signals at the power control outputs 631, 633 to turn on the signal processing circuit 604, 606 selected by the signal strength detector 608 and to turn off the signal processing circuit 604, 606 not selected by the signal strength detector 608. If the strength detector 608 selected the signal processing circuit 604, and the signal processing circuit 606 is connected to the output 616, the timer 610 turns on the signal processing circuit 604 by providing a logical one on the first power control output 631. If the strength detector 608 selected the signal processing circuit 606, and the signal processing circuit 604 is connected to the output 616, the timer 610 turns on the signal processing circuit 606 by providing a logical one on the second power control output 633.

After the signal processing circuit 604, 606 selected by the signal strength detector 608 is turned on, the timer 610 waits a length of time sufficient for transients at the output 607, 609 of the selected signal processing circuits 604, 606, to die out. After the length of time elapses, the timer 610 connects the output 607, 609 of the selected signal processing circuit 604, 606, indicated by the strength detector 608 to the output 616 of the signal processing system 600. If the strength detector 608 selected the signal processing circuit 606, the timer 610 closes the switch 614 by providing a logical one on the switch control second switch control output 637, and opens the switch 612 by providing a logical zero on the switch control first switch control output 635. After the signal processing circuit 614 is disconnected, the timer 610 provides a logical zero on its power control first power control output 631 to turn the disconnected circuit off. If the strength detector 608 selected the signal processing circuit 604, the timer 610 closes the switch 612 by providing a logical one on the switch control first switch control output 635, and opens the switch 614 by providing a logical zero on the switch control second switch control output 637.

In a further exemplary embodiment, the signal processing circuit 606, shown in FIG. 6, can be a sixth order bandpass Chebychev filter 1400, shown in FIG. 14(a), with a ripple of 0.25 dB, a bandwidth of 0.5 MHz. The sixth order bandpass Chebychev filter 1400 can have a center frequency of 1.25 MHz. The sixth order bandpass Chebychev filter 1400 is constructed by connecting three on-off Tow-Thomas biquads together in series. An on-off Tow-Thomas biquad is constructed in the same manner as the standard Tow-Thomas biquad 800, shown in FIG. 8, with the exception that the transconductors of the on-off Tow-Thomas biquad are capable of being turned on and off, as described below with reference to FIG. 22.

Referring to FIG. 14(a), a signal received by the input 1402 of the sixth order bandpass Chebychev filter 1400 is conveyed to an input 1404 of a first on-off Tow-Thomas biquad 1406. Assuming that it is turned on, the on-off Tow-Thomas biquad 1406 processes the signal received at the input 1404 and provides a signal at its output 1408. The first on-off Tow-Thomas biquad 1406 that is turned on advantageously has a transconductance $G_{in}$ for a transconductor 808 of 771 micro-amperes per volt, a transconductance $G_m$ for a transconductor 824 of 185 micro-amperes per volt, a transconductance $QG_m$ for transconductors 834 and 844 of 591 micro-amperes per volt, and a capacitance for capacitors 816, 854 of 77 picofarads. The output 1408 of the first on-off Tow-Thomas biquad 1406 is connected to the input 1410 of a second on-off Tow-Thomas biquad 1412.

Assuming that it is turned on, the second on-off Tow-Thomas biquad 1412 processes the signal received at the input 1410 and provides a signal at an output 1414. The second on-off Tow-Thomas biquad 1412 that is turned on advantageously has a transconductance $G_{in}$ for the transconductor 808 of 2312 micro-amperes per volt, a transconductance $G_m$ for the transconductor 824 of 185 micro-amperes per volt, a transconductance $QG_m$ for the transconductors 834 and 844 of 1210 micro-amperes per volt, and a capacitance for the capacitors 816, 854 of 196 picofarads. The output 1414 of the second on-off Tow-Thomas biquad 1412 corresponds to input 1416 of a third on-off Tow-Thomas biquad 1418.

Assuming that it is turned on, the third on-off Tow-Thomas biquad 1418 processes the signal received at the input 1416 and provides a signal at an output 1420. The third on-off Tow-Thomas biquad 1418 that is turned on advantageously has a transconductance $G_{in}$ for the transconductor 808 of 971 micro-amperes per volt, a transconductance $G_m$ for the transconductor 824 of 185 micro-amperes per volt, a transconductance $QG_m$ for the transconductors 834 and 844 of 1210 micro-amperes per volt, and a capacitance for the capacitors 816, 854 of 126 picofarads. The output 1420 of the third on-off Tow-Thomas biquad 1418 corresponds to output 1422 of the sixth order bandpass Chebychev filter 1400.

In a further exemplary embodiment, the signal processing circuit 604, shown in FIG. 6, can be a sixth order bandpass Chebychev filter 1450, shown in FIG. 14(b), with a ripple of 0.25 dB, a bandwidth of 0.5 MHz. The sixth order bandpass Chebychev filter 1450 can have a center frequency of 1.25 MHz. The sixth order bandpass Chebychev filter 1450 is constructed by connecting three on-off Tow-Thomas biquads together in series.

Referring to FIG. 14(b), a signal received by the input 1452 of the sixth order bandpass Chebychev filter 1450 is conveyed to an input 1454 of a first on-off Tow-Thomas biquad 1456. Assuming that it is turned on, the first on-off Tow-Thomas biquad 1456 processes the signal received at the input 1454 and provides a signal at an output 1458. The first on-off Tow-Thomas biquad 1456 that is turned on advantageously has a transconductance $G_{in}$ for a transconductor 808 of 72.9 micro-amperes per volt, a transconductance $G_m$ for a transconductor 824 of 70 micro-amperes per volt, a transconductance $QG_m$ for transconductors 834 and 844 of 223.5 micro-amperes per volt, and a capacitance for capacitors 816, 854 of 29 picofarads. The output 1458 of the first on-off Tow-Thomas biquad 1456 corresponds to input 1460 of a second on-off Tow-Thomas biquad 1462.

Assuming that it is turned on, the second on-off Tow-Thomas biquad 1462 processes the signal received at the input 1460 and provides a signal at an output 1464. The second on-off Tow-Thomas biquad 1462 that is turned on advantageously has a transconductance $G_{in}$ for the transconductor 808 of 114.4 micro-amperes per volt, a transconductance $G_m$ for the transconductor 824 of 70 micro-amperes per volt, a transconductance $QG_m$ for the transconductors 834 and 844 of 458 micro-amperes per volt, and a capacitance for the capacitors 816, 854 of 74 picofarads. The output 1464 of the second on-off Tow-Thomas biquad 1462 corresponds to the input 1466 of a third on-off Tow-Thomas biquad 1468.

Assuming that it is turned on, the on-off Tow-Thomas biquad 1468 processes the signal received at the input 1466 and provides a signal at an output 1470. The third on-off Tow-Thomas biquad 1468 that is turned on advantageously has a transconductance $G_{in}$ for the transconductor 808 of 283 micro-amperes per volt, a transconductance $G_m$ for the transconductor 824 of 70 micro-amperes per volt, a transconductance $QG_m$ for the transconductors 834 and 844 of 458 micro-amperes per volt, and a capacitance for the capacitors 816, 854 of 48 picofarads. The output 1470 of the third on-off Tow-Thomas biquad 1468 corresponds to output 1472 of the sixth order bandpass Chebychev filter 1450.

Figure 22:
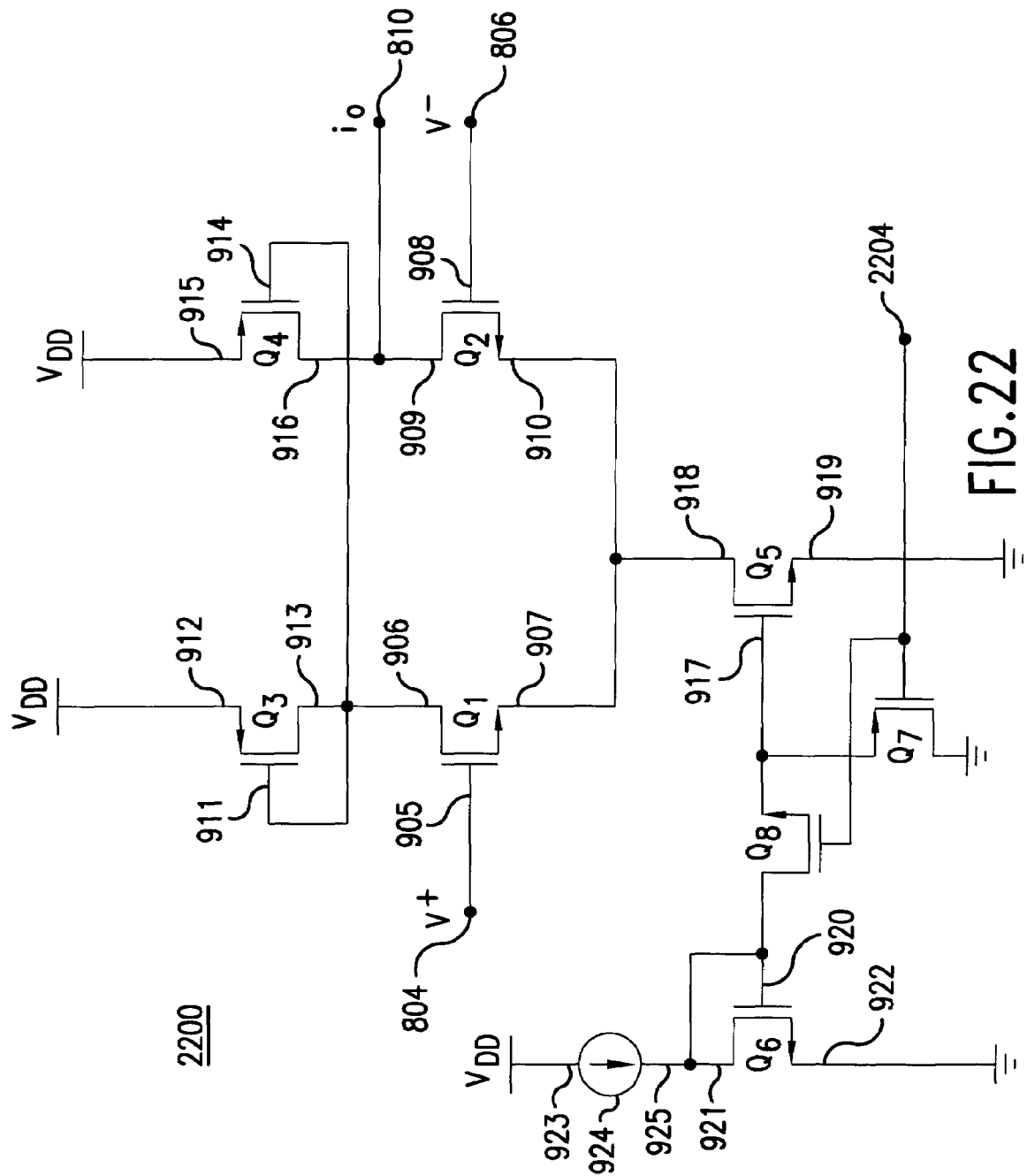
FIG. 22 is a circuit diagram illustrating an on-off transconductor in accordance with the present invention.

Referring to FIG. 22, there is shown an exemplary transconductor 2200 that may be used to implement the on-off Tow-Thomas biquads of FIGS. 14(*a*) and 14(*b*). The transconductor 2200 is identical to the transconductor 900 shown in FIG. 9, except for the addition of a PMOS transistor $Q_7$ and an NMOS transistor $Q_8$. The PMOS transistor $Q_7$ is connected in series between the gate 917 of the PMOS transistor $Q_5$ and ground. The NMOS transistor Q8 connected in series between the gate 920 of the NMOS transistor $Q_6$ and the gate 917 of the PMOS transistor $Q_5$. If the PMOS transistor $Q_7$ is turned off and the NMOS transistor $Q_8$ is turned on by the application of a logical one voltage to the gate terminal 2204, the transconductor 2200 operates in essentially the same manner as the transconductor 900 shown in FIG. 9. However, the PMOS transistor $Q_7$ is turned on and the NMOS transistor $Q_8$ is turned off by the application of a logical zero voltage to the gate terminal 2204, the transconductor 2200 is disabled and the output 810 of the transconductor 2200 acts as an open circuit. Each transconductor of the on-off Tow-Thomas biquad may have the configuration of the transconductor 2200, and the gate terminal 2204 of each transconductor may be connected together to provide a terminal for turning each of the Tow-Thomas biquads on or off.

In a further exemplary embodiment, the signal strength detector 608 is described in FIG. 12(*b*) as signal strength detector 1250. The input 641 of the signal strength detector 608 corresponds to the input 1252 of the signal strength detector 1250, the input 641 of the signal strength detector 608 corresponds to the input 1253 of the signal strength detector 1250, and the output 611 of the signal strength detector 608 corresponds to the output 1270 of the signal strength detector 1250.

A signal received by the input 1252 of the signal strength detector 1250 is conveyed to an input 1254 of a peak detector 1256, which is similar to the peak detector 1180 as shown in FIG. 11. The peak detector 1256 processes the signal received at the input 1254 and provides a signal at an output 1258. The output 1258 of the peak detector 1256 corresponds to input 1260 of a threshold detector 1262.

The threshold detector 1262 processes the signal received at the input 1260 and provides a signal at an output 1264. The threshold detector 1262, which is similar to the first threshold detector 1175 shown in FIG. 11, is configured by setting a reference current of a current source 1170 (shown in FIG. 11) to detect the first limit, which represents the minimum tolerable signal to noise ratio of the filter 604. The reference current representing the first limit for the threshold detector 1262 can be 30 micro-amperes. The threshold detector 1262 processes the signal at its input 1260 and transmits a signal at its output 1264. The output 1264 of the threshold detector 1262 is connected to an input 1266 of a two input OR gate 1268.

A signal received by the input 1253 of the signal strength detector 1250 is conveyed to an input 1255 of a peak detector 1257, which is similar to the peak detector 1180 as shown in FIG. 11. The peak detector 1257 processes the signal received at the input 1255 and provides a signal at an output 1259. The output 1259 of the peak detector 1257 corresponds to input 1261 of a threshold detector 1263.

The threshold detector 1263 processes the signal received at the input 1261 and provides a signal at an output 1265. The threshold detector 1263, which is similar to the first threshold detector 1175 shown in FIG. 11, is configured by setting a reference current of a current source 1170 (shown in FIG. 11) to detect the second limit, which represents the saturation point of the filter 605. The reference current representing the second limit for the threshold detector 1263 can be 7.7 micro-amperes. The threshold detector 1263 processes the signal at its input 1261 and transmits a signal at its output 1265. The output 1265 of the threshold detector 1263 is connected to an input 1267 of a two input OR gate 1268. The two input OR gate 1268 processes the signals received at its inputs and provides a signal to the output 1270 of the signal strength detector 1250.

In a further exemplary embodiment, the timer 610 can be the timer 1300 as shown in FIG. 13. The input 639 of the timer 610 corresponds to input 1302 of the timer 1300, and the outputs 635, 637, 631, 633, of the timer 610 correspond to outputs 1309, 1319, 1394, 1399, respectively, of the timer 1300. The n-bit overflow counter 1388 should be configured to allow a period of time to elapse that is at least as long as the longest amount of time it takes for transients at the output of a signal processor circuit after it is turned on to die out before the counter overflow output 1389 changes from a logical zero to a logical one. The outputs 587, 589, 591 are not connected when the timer 1300 is used with the system 600.

The invention claimed is:

1. A signal processing system comprises:
   a system input for receiving an input signal having an in-band component and an out-band component;
   a system output for providing a system output signal;
   a plurality of signal processing circuits each having an input coupled to the system input and an output for providing a respective output signal, each one of the signal processing circuits being adapted for optimal processing of input signals over a different range of in-band component to out-band component ratios;
   a plurality of switches each having a switch input coupled to the output of a respective one of the signal processing circuits, a switch output connected to the system output, and a switch control input responsive to a first switch control signal for connecting the switch input to the switch output and responsive to a second switch control signal for disconnecting the switch input from the switch output; and
   a signal strength detector having at least one input each coupled to the output of a preselected one of the signal processing circuits and a plurality of outputs each coupled to the switch control input of a respective one of the plurality of switches, the signal strength detector being responsive to a comparison of the strength of the output signal of each preselected one of the signal processing circuits with at least one limit for selecting a particular one of the signal processing circuits and for providing a first switch control signal to the switch control input of the switch having the switch input of said switch coupled to the output of the particular one of the signal processing circuit, the signal strength detector providing the second switch control signal to the switch control input of each one of the switches having the switch input of said switch coupled to the output of a respective one of the signal processing circuits not selected by the signal strength detector.

2. The signal processing system of claim 1, wherein each one of the signal processing circuits comprises a plurality of filters each having a filter input and a filter output, and a plurality of amplifiers each having an amplifier input and an amplifier output, the plurality of filters and amplifiers being connected alternatingly in series wherein the amplifier input of each amplifier is coupled to the filter output of a preceding filter and the amplifier output of each amplifier is coupled to the filter input of a succeeding filter, each signal processing circuit having a first filter, the filter input of the first filter being connected to the input of the signal processing circuit, and a last filter, the filter output of the last filter being the output of the signal processing circuit.

3. The signal processing system of claim 1, wherein the plurality of signal processing circuits comprises a first signal processing circuit and a last signal processing circuit, and each filter in the same position in the series of alternatingly connected amplifiers and filters in each one of the plurality of signal processing circuits have a respective common transfer function, and wherein the amplifiers of the first signal processing circuit each have a gain of approximately 10, and each amplifier of the last signal processing circuit have a gain of approximately 1.

4. The signal processing of claim 1, wherein each one of the signal processing circuits comprise a respective sixth order bandpass Chebychev filter.

5. The signal processing system of claim 4, wherein the sixth order bandpass Chebychev filter of each one of the signal processing circuits has a ripple of approximately 0.25 dB, a band width of approximately 0.5 MHz, and a different center frequency and quality factor.

6. The signal processing circuit of claim 5, wherein the sixth order bandpass Chebychev filter of each one of the signal processing circuits comprise three standard Tow-Thomas biquads connected in series.

7. The signal processing system of claim 6, wherein each one of the Tow-Thomas biquads comprise an input terminal, an output terminal, first, second, third and fourth transconductors each having a normal input and an inverting input and an output, a first capacitor and a second capacitor, the first transconductor having a transconductance $G_{in}$ and the normal input of said first transconductor connected to the input terminal, the inverting input of said first transconductor connected to ground and the output of said first transconductor connected to the output terminal, the second transconductor having a transconductance $G_m$ and the inverting input and output of said second transconductor connected to the output terminal and the normal input of said second transconductor connected to ground, the third transconductor having a transconductance $QG_m$ and the inverting input of said third transconductor connected to a first node, the normal input of said third transconductor connected to ground and the output of said third transconductor connected to the output terminal, the fourth transconductor having a transconductance $QG_m$ and the normal input of said fourth transconductor connected to the output terminal, the inverting input of said fourth transconductor connected to ground and the output of said fourth transconductor connected to the first node, the first capacitor being connected between the output terminal and ground, and the second capacitor being connected between the first node and ground.

8. The signal processing system of claim 1, wherein the signal strength detector comprises at least one peak detector each coupled to the output of a preselected one of the signal processing circuits and an output coupled to at least one threshold detector for comparing the output of the peak detector with a respective limit, and a combinatorial logic circuit responsive to the comparison made by each one of the at least one threshold detector for deriving switch control signals for the switch control inputs of respective ones of the plurality of switches.

9. A signal processing comprising:
a system input for receiving a signal having an in-band component and an out-band component;
an output for providing a system output signal;
a plurality of signal processing pathways each extending from the system input to a respective output of the signal processing pathway, the plurality of signal processing pathways including:
a main signal processing pathway comprising a plurality of filters each having a respective filter input and a respective filter output, and a plurality of amplifiers each having a respective amplifier input and a respective amplifier output, the amplifier input of each amplifier being connected to the filter output of a respective preceding filter, the amplifier output of each amplifier being connected to the filter input of a respective succeeding filter, the main signal processing pathway having a first filter and a last filter, the filter input of the first filter being connected to the system input the filter output of the last filter being the output of the main pathway; and
a plurality of auxiliary signal processing pathways each including at least one amplifier each having a respective amplifier input and a respective amplifier output, and at least one filter each having a respective filter input and a respective filter output, each one of the auxiliary pathways having a branch amplifier and a last filter, the amplifier input of the branch amplifier of each one of the auxiliary pathways being connected to the filter output of a respective preceding one of the filters, except the last filter of the main pathway, the amplifier output of the branch amplifier of each one of the auxiliary signal processing pathways being connected to the filter input of a respective succeeding filter, any additional amplifier or filter following the branch amplifier in each auxiliary pathway being connected in alternating sequence wherein the amplifier input of each additional amplifier being connected to the filter output of a respective succeeding filter and the amplifier output of each additional amplifier being connected to the filter input of a respective succeeding filter, each one of the pathways having the same number of filters and amplifiers, the filter output of the last filter of each one of the auxiliary pathways being the output of the auxiliary pathway, each one of the signal processing pathways being adapted for optimal processing of input signals over a different range of in-band component to out-band component ratios;
a plurality of switches each having a switch input connected to the output of a respective one of the signal processing pathways, a switch output coupled to the system output, and a switch control input responsive to a first switch control signal for connecting the switch input to the switch output and responsive to a second switch control signal for disconnecting the switch input from the switch output; and
a signal strength detector having at least one input each connected to the output of a preselected one of the signal processing pathways and a plurality of outputs each connected to the switch control input of a respective one of the switches, the signal strength detector being responsive to the output signal at the output of a previously selected one of the signal processing pathways having an output connected to the system output exceeding a first predetermined level for selecting another one of the signal processing pathways for processing the input signal and for providing the first switch control signal to the switch input of a respective one of the switches having the switch input of said switch connected to the output of the selected one of the signal processing pathways to thereby connect the output of the selected one of the signal processing pathways to the system output, the signal strength detector providing the second switch control signal to the switch control input of a respective one of the switches having a switch input connected to the output of the previously selected one of the signal processing pathways to thereby disconnect the output of the previously selected one of the signal processing pathways from the system output, the signal strength detector being responsive to the output signal at the output of the previously selected one of the signal processing pathways being below a second predetermined level for selecting a different one of the signal processing pathways for processing the input signal and for providing the first switch control signal to the switch control input of a respective one of the switches having the switch input of said switch connected to the output of the selected different one of the signal processing pathways to thereby connect the output of the selected different one of the signal processing pathways to the system output, the signal strength detector providing the second switch control signal to the switch control input of the respective one of the input switches having a switch input connected to the output of the previously selected one of the signal processing pathways to thereby disconnect the output of the previously selected one of the signal processing pathways from the system output.

10. A signal processing system comprising:
a system input for receiving an input signal and a system output for providing a system output signal;
a plurality of signal processing circuits each having an input coupled to the system input and an output for providing a respective output signal, each signal processor having a different saturation level and a different signal to noise ratio with respect to an input signal processed thereby;
a plurality of switches each having a switch input coupled to the output of a respective one of the signal processing circuits, a switch output coupled to the system output, and a switch control input responsive to a first switch control signal for connecting the switch input to the switch output and responsive to a second switch control signal for disconnecting the switch input from the switch output;
a signal strength detector having an input coupled to the system input and a plurality of outputs each corresponding to a respective one of the signal processing circuits, the signal strength detector being responsive to a comparison of the strength of the input signal received at the system input with at least one limit for selecting a particular one of the signal processing circuits having a respective saturation level and a respective signal to noise ratio with respect to an input signal processed thereby suitable for processing the input signal and for providing the first switch control signal to the switch control input of a respective one of the plurality of switches having the switch input of said switch coupled to the output of the selected one of the signal processing circuits and for providing the second switch control signal to the switch control inputs of respective ones of the switches having the switch input coupled to the output of respective ones of the signal processing circuits not selected by the signal strength detector.

11. The signal processing system of claim 10, wherein each of the signal processing circuits is a companding signal processor comprising:
a filter having a filter input and a filter output;
an input amplifier having an input coupled to the system input and an output coupled to the filter input of the filter, the input amplifier having a respective gain; and
an output amplifier having an input coupled to the filter output of the filter and an output coupled to the output of the signal processing circuit, the output amplifier having a gain which is the inverse of the gain of the input amplifier.

12. The signal processing system of claim 10, wherein the input amplifier of each companding signal processor is adapted to provide an output signal that is clamped so as to prevent saturation of the filter having a filter input connected to the output of the input amplifier.

13. The signal processing system of claim 11, wherein the signal processing system comprises a first, second and third companding signal processors, and the signal strength detector compares the strength of the input signal with a first limit and a second limit, the first limit being a signal strength level where the signal received at the system input is near a minimum required signal to noise ratio the noise floor of the second companding signal processor and the first companding signal processor is near saturation, the second limit being the signal strength level where the second companding signal processor is near saturation and the signal received at the system input is near the minimum required signal to noise ratio of the third companding signal processor, wherein the signal strength detector selects the first companding signal processor if the strength of the input signal does not exceed the first limit or the second limit, wherein the signal strength detector selects the second companding signal processor if the strength of the input signal exceeds the first limit but does not exceed the second limit, and wherein the signal strength detector selects the third companding signal processor if the strength of the input signal exceeds the first limit and the second limit.

14. The signal processing system of claim 11, wherein the filter of each one of the companding signal processors comprises a biquad having an input terminal, an output terminal, first, second, third, and fourth transconductors each having a normal input, an inverting input and an input, first and second capacitors and a resistor, the first transconductor having a transconductance $G_m$ and the inverting input of said first transconductor and output connected to the input terminal and the normal input of said first transconductor connected to ground, the second transconductor having a transconductance $QG_m$ and the inverting input of said second transconductor connected to a first node, the normal input of said second transconductor connected to ground and the output of said second transconductor connected to the input terminal, the third transconductor having a conductance $QG_m$ and the normal input of said third transconductor connected to the output terminal, the inverting input of said third transconductor connected to ground and the output of said third transconductor connected to the first node, the fourth transconductor having a transconductance $G_m$ and the normal input of said fourth transconductor connected to the first node, the inverting input of said fourth transconductor connected to ground and the output of said fourth transconductor connected to the output terminal, the first capacitor being connected between the input terminal and ground, the second capacitor being connected between the first node and ground, and the resistor being connected between the output terminal and ground.

15. A signal processing system comprising:
a system input for receiving an input signal;
a system output for providing a system output signal;
a first and a second signal processing circuit each having an input, an output, a power control input responsive to a first power control signal for causing the signal processing circuit to be in a powered up state and responsive to a second power control signal for causing the signal processing circuit to be in a powered down state, and at least one bias control input responsive to at least one bias control signal for biasing the signal processing circuit for optimal processing of a signal having a respective signal strength;
a plurality of output switches each having a switch input connected to the output of a respective one of the first and second signal processing circuits, a switch output coupled to the system output and a switch control input responsive to a first switch control signal for connecting the switch input to the switch output and being responsive to a second switch control signal for disconnecting the switch input from the switch output, wherein at any given time one of the first or second signal processing circuits is active by being in a powered up state, receiving at least one bias control signal at said at least one bias control input of said one of the first or second signal processing circuits and having the output of said one of the first or second signal processing circuits connected to the system output by a respective one of the output switches, and the other one of the first and second signal processing circuits is inactive by being in a powered down state and having the output of said other one of the first and second signal processing circuits disconnected from the system output by a respective one of the output switches;
a signal strength detector having a first and second input connected to respective internal nodes of the first and second signal processing circuits and at least one output for specifying at least one bias level change corresponding to at least one bias control signal, if any, to be applied to the at least one bias control input of an inactive one of the signal processing circuits, the signal strength detector being responsive to a comparison of the strength of a signal on the respective internal node of an active one of the signal processing circuits with at least one limit for determining whether at least one bias control signal is to be applied to the at least one bias control input of the inactive one of the signal processing circuits for changing the bias thereto, and for providing on the at least one output at least one signal specifying, if any, the at least one bias control signal to be applied to the bias control input of an inactive one of the signal processing circuits;
a bias selector circuit responsive to the at least one output signal provided on the at least one output of the signal strength detector for providing on at least one first output the at least one bias control signal specified by the at least one output of the signal strength detector to the at least one bias control input of the inactive one of the signal processing circuits and providing on a second output a signal indicating that at least one bias control signal has been applied to the inactive one of the signal processing circuits; and
a timer circuit responsive to the signal on the second output of the bias selector circuit for providing the first power control signal to the power control input of the inactive one of the signal processing circuits, and after a predetermined delay for applying the first switch control signal to the switch control input of the switch having the switch input of said switch coupled to the output of the inactive one of the signal processing circuits and applying the second switch control signal to the switch control input of the switch having the switch input of said switch connected to the output of the active one of the signal processing circuits and applying the second power control signal to the power control input of the active one of the signal processing circuits.

16. The signal processing system of claim 15, wherein the signal strength detector determines the at least one bias control signal to be applied to the at least one bias control input of the inactive one of the signal processing circuit based upon a first limit and a second limit, the first limit indicating that the signal-to-noise ratio of the signal on the respective internal node of the active one of the signal processing circuits is approaching a minimum required level and that the signal strength detector determines that a bias control signal corresponding to a next higher bias level is to be applied to the at least one bias control input of the inactive one of the bias control circuits, and the second limit indicates the onset of saturation of the active one of the signal processing circuits and that the signal strength detector determines a bias control signal corresponding to a next lower bias level be applied to the at least one bias control input of the inactive one of the signal processing circuits.

17. The signal processing system of claim 16, wherein each one of the first and second signal processing circuits comprises a dynamic input scaling circuit, a biquad and a dynamic output scaling circuit connected in series.

18. The signal processing system of claim 17, wherein the dynamic input scaling circuit comprises a first input terminal, a third input terminal, an output terminal, a first switch having a switch input, a switch output and an inverting switch control input, a second switch having a switch input, a switch output and a switch control input, a first resistor, a second resistor, a first transconductor having a transconductance $G_m$ and having a normal input, an inverting input and an output, and a second transconductor having a transconductance $9 G_m$ and having a normal input, an inverting input, a switch input responsive to a logical one signal for enabling the second transconductor and responsive to a logical zero signal for disabling the second transconductor, wherein the switch input of the first switch and one terminal of the first resistor are connected to the first input terminal, and the inverting switch control input of the first switch and the switch control input of the second switch are connected to the second input terminal, wherein the other terminal of the first resistor, one terminal of the second resistor, the normal input of the first transconductor and the normal input of the second transconductor are each connected to a first node, and the other terminal of the second resistor is connected to the switch input of the second switch, and wherein the switch output of the second switch, the inverting input of the first transconductor and the inverting input of the second transconductor are each connected to ground, the output of the first transconductor being connected to the output terminal and the third input terminal being connected to the on/off input of the second transconductor.

19. The signal processing system of claim 15, wherein the biquad comprises a first input terminal, a second input terminal, an output terminal, a first transconductor having a transconductance $G_m$ and having a normal input, an inverting input, an on/off input and an output, a second and third transconductor each having a transconductance $QG_m$ and each having a normal input, an inverting input, an on/off input and an output, a fourth transconductor having a transconductance $G_m$ and having a normal input, an inverting input, an on/off input and an output, a first capacitor and a second capacitor, wherein the on/off inputs of the first, second, third and fourth transconductors are responsive to a logical one signal for enabling the respective transconductor and responsive to a logical zero signal for disabling the respective transconductor, and one terminal of the first capacitor, the inverting input of the first transconductor, the output of the second transconductor, the normal input of the third transconductor are each connected to a first node, wherein the inverting input of the second transconductor, the output of the third transconductor, the normal input of the fourth transconductor and one terminal of the second capacitor are each connected to a second node, and the on/off inputs of the first, second, third and fourth transconductors are each connected to the second input terminal, and wherein the other terminal of the first capacitor, the normal input of the first transconductor, the normal input of the second transconductor, the inverting input of the third transconductor, the inverting input of the fourth transconductor and the other terminal of the second capacitor are each connected to ground, and the output of the fourth transconductor is connected to the output terminal.

20. The signal processing system of claim 15, wherein the dynamic output scaling circuit comprises first, second and third input terminals, an output terminal, first, second and third resistors, first, second and third switches each having a switch input, a switch output and a switch control input, wherein the switch inputs of the first, second and third switch are connected to the first, second and third input terminals, respectively, and one terminal of the first, second and third resistors are each connected to the output terminal, and wherein the other terminal of the first, second and third resistors are connected to the switch inputs of the first, second and third switches, respectively, and the output terminal of the first, second and third switches are each connected to ground.

21. The signal processing system of claim 20, wherein the signal strength detector is responsive to a comparison between the signal provided by the internal node signal output of the active one of the signal processing circuits with a first limit and a second limit, the first limit indicating that the signal-to-noise ratio of the signal from the internal node signal output of the active one of the signal processing circuits is approaching a minimum required level and that the signal strength detector determines that a bias control signal causing the next higher bias level be applied to the at least one bias control input of the inactive one of the signal processing circuit, and the second limit indicating that the inactive one of the signal processing circuits is near saturation and that the signal strength detector selects a bias control signal causing a next lower bias level be applied to the at least one bias control input of the inactive one of the signal processing circuits.

22. The signal processing system of claim 20, wherein each one of the first and second signal processing circuits comprises a dynamic input scaling circuit, a biquad and a dynamic output scaling circuit connected in series between the input and the output of the signal processing circuit.

23. A signal processing system comprising:
a system input for receiving an input signal;
a system output for providing a system output signal;
a first and a second signal processing circuit each having an input, an output, a power control input responsive to a first power control signal for causing the signal processing circuit to be in a powered up state and responsive to a second power control signal for causing the signal processing circuit to be in a powered down state, an internal node output for providing a signal on an internal node of the signal processing circuit, and at least one bias control input for receiving at least one bias control signal for optimizing the bias of the signal processing circuit to process a signal having a respective signal strength;
first and second input switches each having a first input connected to the system input, a second input connected to ground, an output coupled to the input of a respective one of the signal processing circuits, and a switch control input responsive to a first switch control signal for connecting the first input of the switch to the output of the switch and responsive to a second input switch control signal for connecting the second input of the switch to the output of the switch;
first and second output switches each having an input coupled to the output of a respective one of the signal processing circuits, an output connected to the system output, and a switch control input responsive to a first output switch control signal for connecting the input of the switch to the output of the switch and responsive to a second output switch control signal for disconnecting the input of the switch from the output of the switch, wherein at any given time one of the signal processing circuits is active in having an input connected to the system input, an output connected to the system output, a power control input receiving the first power control signal and at least one bias control input receiving at least one bias control signal, and the other one of the signal processing circuits being inactive in having an input disconnected from the system input, an output disconnected from the system output and a power control input receiving the second power control signal;
a signal strength detector having a first and second input each connected to a respective internal node signal output of the signal processing circuits, at least one output for providing at least one output signal specifying, if any, at least one bias control signal to be applied to the at least one bias control input of the inactive one of the signal processing circuits, the signal strength detector being responsive to a comparison of the signal provided by the internal node signal output of the active one of the signal processing circuits with at least one limit for selecting the at least one bias control signal to be applied to the at least one bias control input of the inactive one of the signal processing circuits and providing the at least one bias control signal, if any, on the at least one output;
a bias selector circuit responsive to the at least one bias control signal, if any, provided by the at least one output of the signal strength detector for providing on at least one first output the at least one bias control signal, if any, to the at least one bias control input of the inactive one of the signal processing circuits and providing on a second output a signal indicating that at least one bias control signal has been applied to the inactive one of the signal processing circuits; and a timer circuit responsive to the signal provided on the second output of the bias selector circuit for providing the first power control signal to the power control input of the inactive one of the signal processing circuits, providing a first switch control signal to the switch control input of the input switch having the output of said input switch coupled to the input of the inactive one of the signal processing circuits and providing after a predetermined delay a first switch control signal to the switch control input of the output switch having the input of said output switch coupled to the output of the inactive one of the signal processing circuits, providing a second switch control signal to the switch control input of the output switch having the input of said output switch coupled to the output of the active one of the signal processing circuits, providing the second power control signal to the power control input of the active one of the signal processing circuits and providing the second switch control signal to the switch control input of the input switch having the output of said input switch coupled to the input of the active one of the signal processing circuits.

24. A signal processing system comprising:

a system input for receiving an input signal having an in-band component and an out-band component, a system output for providing a system output signal;

a plurality of signal processing circuits each having an input coupled to the system input, an output for providing a respective output signal and a power control input responsive to a first power control signal for causing the signal processing circuit to be in a powered up state and responsive to a second power control signal for causing the signal processing circuit to be in a powered down state, each one of the plurality of signal processing circuits being adapted to have a different saturation level and signal to noise ratio for optimal processing of signals having a different range of in-band component to out-band component ratios;

a plurality of output switches each one having an input coupled to the output of a respective one of the plurality of signal processing circuits, an output connected to the system output and a switch control input responsive to a first switch control signal for connecting the input of the switch to the output of the switch and responsive to a second switch control signal for disconnecting the input of the switch from the output of the switch;

a signal strength detector having a first input connected to the system output, at least one output for providing a signal indicating a selected one of the plurality of signal processing circuits, the signal strength detector being responsive to a comparison of the strength of an output signal with at least one one limit for selecting one of the plurality of signal processing circuits for processing the input signal and providing at least one signal on the at least one output indicating the signal processing circuit selected by the signal strength detector; and a timer circuit having at least one one input each coupled to a respective one of the at least one output of the signal strength detector and a first plurality of outputs each one connected to the power control input of a respective one of the plurality of signal processing circuits and a second plurality of outputs each one connected to the switch control input of a respective one of the plurality of output switches, the timer circuit being responsive to at least one signal provided by the signal strength detector for providing the first power control signal to the power control input of the signal processing circuit selected by the signal strength detector and providing after a predetermined delay the first switch control signal to the switch control input of a respective one of the plurality of output switches having an input connected to the output of the signal processing circuit selected by the signal strength detector to thereby connect the output of the signal processing circuit selected by the signal strength detector to the system output and providing after the predetermined delay the second switch control signal to the switch control input of respective ones of the plurality of output switches each having a switch input connected to the output of a respective one of the plurality of signal processing circuits not selected by the signal strength detector to thereby disconnect the output of each one of the plurality of signal processing circuits not selected by the signal strength detector from the system output, the timer circuit being responsive to at least one signal provided by the signal strength detector for providing after the predetermined delay the second power control signal to the power control input of each one of the plurality of signal processing circuits not selected by the signal strength detector.

25. A method for processing an input signal received at a system input to derive an output signal at a system output comprising:

providing a plurality of signal processors each having an input coupled to the system input and an output, each one of the signal processors being adapted to process an input signal having a different range of in-band component to out-band component ratios without saturating and without having a signal-to-noise ratio approaching a minimum required level;

providing a plurality of switches, each one for controllably connecting and disconnecting the output of a respective one of the signal processors to the system output terminal;

detecting the strength of a respective output signal at each one of at least one selected output of the signal processors to compare the strength of the respective output signal with at least one limit to select one of the signal processors for optimal processing of the input signal; and causing a respective one of the switches to connect the output of the selected signal processors to the system output and causing other ones of the switches to disconnect the outputs of all other signal processors from the system output.

* * * * *

UNITED STATES PATENT AND TRADEMARK OFFICE
CERTIFICATE OF CORRECTION

PATENT NO.       : 7,274,760 B2
APPLICATION NO.  : 10/398195
DATED            : September 25, 2007
INVENTOR(S)      : Palaskas et al.

It is certified that error appears in the above-identified patent and that said Letters Patent is hereby corrected as shown below:

IN THE SPECIFICATION:
On Page 1, Column 1, line 16, please insert the following header and paragraph:

-- Statement Regarding Federally Sponsored Research or Development
This invention was made with government support under grant number CCR9902781 awarded by the National Science Foundation. The government has certain rights in the invention. --

Signed and Sealed this

Twenty-third Day of September, 2008

JON W. DUDAS
*Director of the United States Patent and Trademark Office*